(12) United States Patent
Darcius et al.

(10) Patent No.: US 11,366,621 B2
(45) Date of Patent: *Jun. 21, 2022

(54) PRINTING APPARATUS TO ACQUIRE PRINT DATA AND TRANSMITS A REQUEST TO AN EXTERNAL APPARATUS TO CLOSE WEBSOCKET COMMUNICATION WHEN PREDETERMINED TIME PERIOD ELAPSED

(71) Applicant: BIXOLON CO., LTD., Seongnam-si (KR)

(72) Inventors: Peter Sahaya Darcius, Seongnam-si (KR); Jae Hoon Jeong, Seoul (KR); Young Hwan Kwak, Hwaseong-si (KR); Sa Bin Son, Suwon-si (KR)

(73) Assignee: BIXOLON CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,574

(22) Filed: Oct. 9, 2020

(65) Prior Publication Data

US 2021/0026577 A1    Jan. 28, 2021

Related U.S. Application Data

(63) Continuation of application No. 15/654,453, filed on Jul. 19, 2017, now Pat. No. 10,846,029.

(30) Foreign Application Priority Data

Jun. 13, 2017   (KR) .................. 10-2017-0074197
Jun. 13, 2017   (KR) .................. 10-2017-0074198

(Continued)

(51) Int. Cl.
    *G06F 3/12*     (2006.01)
    *H04L 67/02*    (2022.01)
    (Continued)

(52) U.S. Cl.
    CPC .......... *G06F 3/1209* (2013.01); *G06F 3/1206* (2013.01); *G06F 3/1236* (2013.01);
    (Continued)

(58) Field of Classification Search
    None
    See application file for complete search history.

(56) References Cited

U.S. PATENT DOCUMENTS 9,224,138 B2 *  12/2015  Sugiyama ............... G07G 1/14
2010/0225966 A1   9/2010  Bailey et al.
(Continued)

FOREIGN PATENT DOCUMENTS

JP    2004-310517 A   11/2004
JP    2013-205968 A   10/2013
(Continued)

*Primary Examiner* — Haris Sabah
(74) *Attorney, Agent, or Firm* — Maschoff Brennan

(57) ABSTRACT

Disclosed are a printing method using websocket communication and a management method for a websocket communication channel. The printing method includes establishing, by a printing apparatus, a websocket channel for communicating with an external apparatus, requesting, by the printing apparatus, print data from the external apparatus through the websocket channel, determining, by the printing apparatus, whether a predetermined condition associated with an acquisition of the print data is satisfied in response to the request for the print data, and controlling, by the printing apparatus, a channel duration time of the websocket channel when the predetermined condition is satisfied.

10 Claims, 28 Drawing Sheets

(30) Foreign Application Priority Data

Jun. 13, 2017 (KR) ........................ 10-2017-0074199
Jun. 13, 2017 (KR) ........................ 10-2017-0074200

(51) Int. Cl.

| | | |
|---|---|---|
| *G07G 5/00* | (2006.01) | |
| *G07G 1/14* | (2006.01) | |
| *G06Q 20/20* | (2012.01) | |
| *H04N 1/333* | (2006.01) | |
| *H04N 1/32* | (2006.01) | |

(52) U.S. Cl.
CPC .......... *G06F 3/1247* (2013.01); *G06F 3/1294* (2013.01); *G06Q 20/208* (2013.01); *G06Q 20/209* (2013.01); *G07G 1/14* (2013.01); *G07G 5/00* (2013.01); *H04L 67/02* (2013.01); *G06F 3/122* (2013.01); *G06F 3/1228* (2013.01); *H04N 1/32614* (2013.01); *H04N 1/33353* (2013.01)

(56) References Cited

U.S. PATENT DOCUMENTS

| | | |
|---|---|---|
| 2012/0314251 A1 | 12/2012 | Yokoyama |
| 2013/0258384 A1 | 10/2013 | Kanoh |
| 2014/0025832 A1 | 1/2014 | Ito |
| 2014/0092418 A1* | 4/2014 | Kishimoto ......... H04N 1/00896 358/1.14 |
| 2015/0070725 A1 | 3/2015 | Monden |
| 2015/0124289 A1 | 5/2015 | Tajima et al. |
| 2015/0193762 A1* | 7/2015 | Sugiyama ................ G07G 5/00 358/1.15 |
| 2016/0092418 A1* | 3/2016 | Kraisler ................ G06F 40/166 715/255 |
| 2016/0142467 A1 | 5/2016 | Ban et al. |
| 2019/0278538 A1* | 9/2019 | Sousuke .................. H04N 1/00 |

FOREIGN PATENT DOCUMENTS

| | | |
|---|---|---|
| KR | 10-2015-0132272 A | 11/2015 |
| KR | 10-2016-0057873 A | 5/2016 |

* cited by examiner

PRINTING APPARATUS TO ACQUIRE PRINT DATA AND TRANSMITS A REQUEST TO AN EXTERNAL APPARATUS TO CLOSE WEBSOCKET COMMUNICATION WHEN PREDETERMINED TIME PERIOD ELAPSED

CROSS-REFERENCE TO RELATED APPLICATION

This application claims priority to and the benefit of Korean Patent Application Nos. 10-2017-0074197, 10-2017-0074198, 10-2017-0074199 and 10-2017-0074200, filed on Jun. 13, 2017, the disclosure of which is incorporated herein by reference in its entirety.

BACKGROUND

1. Field

The present disclosure relates to a printing method through a communication channel and a management method for the communication channel, and more particularly, to a printing method of communicating data using a websocket communication channel and a management method for efficiently operating a websocket communication channel.

2. Discussion of Related Art

As the use of smart devices and the number of functions executable by applications running on smart devices have increased, aspects of electronic commerce using smart devices have been diversified. In particular, as online transactions increase, some functions of a pre-existing point of sale (POS) system are being replaced and executed by smart devices.

A POS system refers to a system in which a POS host, a POS printer, a barcode reader, a card reader, and so on that are organically connected to each other to perform all data processing processes entailed in a typical transaction. In a conventional POS system, it is common for various apparatuses to be wired, integratedly installed at one point in a shop, and then used while being fixed. According to such a conventional POS system, when a large number of consumers want to perform a transaction or want to remotely request that a transaction be performed, it is physically difficult to smoothly perform a transaction.

Thus, in order to solve problems of the conventional POS system and keep pace with the trend of increasing electronic commerce using smartphones, there is a need for a solution to replace some functions of a POS system using a smartphone and simplify the POS system. In particular, the role of a platform for smartphones to handle data used in an existing conventional POS system is emerging.

Websocket communication, which is a communication protocol that supports duplex asynchronous communication between apparatuses, may be effectively used when rapid data transmission and reception are required because data can be simultaneously transmitted and received in real time.

SUMMARY

The present disclosure is directed to providing a printing method, system, and apparatus using websocket communication.

The present disclosure is also directed to providing an efficient communication method, system, and apparatus that simultaneously perform data transmission and reception.

The present disclosure is also directed to providing a method, system, and apparatus for controlling an establishment state of a communication channel according to data communication to efficiently operate the communication channel.

The present disclosure is also directed to providing a method, system, and apparatus for controlling a peripheral apparatus, which is connected to a printing apparatus, by using websocket communication.

The present disclosure is also directed to providing a method, system, and apparatus for distributing print data using websocket communication.

The objectives of the present disclosure are not limited to the aforementioned objectives, and other objectives which are not described herein should be clearly understood by those skilled in the art from the following detailed description and the accompanying drawings.

According to an aspect of the present disclosure, there is provided a printing method using websocket communication, performed by a printing apparatus, the printing method including establishing a websocket communication channel for communicating with an external apparatus; requesting print data for printing to the external apparatus; acquiring the print data from the external apparatus through the websocket communication channel in response to the requesting the print data; and performing a printing operation on the basis of the acquired print data, wherein the print data is generated by the external apparatus and written in a format processable by the printing apparatus.

The requesting print data may include requesting the print data after transmitting state information of the printing apparatus in response to the external apparatus requesting the state information.

The requesting print data may include transmitting state information of the printing apparatus, and the state information may indicate whether it is possible for the printing apparatus to perform the printing operation. The state information may include status information for at least one requirement for performing a printing operation. The state information may indicate whether or not at least one requirement for performing the printing operation is satisfied.

The format processable by the printing apparatus may be a format that is processable by the printing apparatus without a format conversion procedure. The format processable by the printing apparatus may be a command format that is specific to the printing apparatus to control the printing apparatus.

According to another aspect of the present disclosure, there is a method of managing a websocket communication channel, performed by a printing apparatus the method including establishing a websocket communication channel for communicating with an external apparatus; requesting print data for printing operation to the external apparatus through the websocket communication channel; determining whether a predetermined condition associated with an acquisition of the print data is satisfied in response to the request for the print data; and controlling a channel duration time of the websocket communication channel when the predetermined condition is satisfied.

The determining of whether a predetermined condition is satisfied may include determining whether the print data requested to be transmitted is received from the external apparatus. The determining of whether a predetermined condition is satisfied may include determining whether a predetermined time period has elapsed after the print data is requested and may further include determining whether the print data is received.

The controlling of a channel duration time of the websocket communication channel may include interrupting the websocket communication channel within a predetermined time period after the predetermined condition is satisfied.

The controlling of a channel duration time of the websocket communication channel when the predetermined condition is satisfied may include restricting the channel duration time of the websocket communication channel when the predetermined condition is satisfied. The websocket communication channel may remain established when the predetermined condition is not satisfied.

The requesting of print data to the external apparatus may include requesting the print data through the websocket communication channel.

The requesting of print data to the external apparatus may include requesting the print data through a data request websocket communication channel other than the websocket communication channel.

According to still another aspect of the present disclosure, there is a method of managing a websocket communication channel, the method including establishing a first websocket communication channel and a second websocket communication channel for communicating with an external apparatus; acquiring print data for controlling a printing operation of the printing apparatus from the external apparatus through the first websocket communication channel; acquiring control data for controlling a state of the printing apparatus from the external apparatus through the second websocket communication channel; and restricting a channel duration time of the first websocket communication channel.

The control data may include peripheral apparatus registration information for the printing apparatus controlling a peripheral apparatus connected to the printing apparatus.

The restricting of a channel duration time of the first websocket communication channel may include determining a closing time of the first websocket communication channel.

The restricting of a channel duration time of the first websocket communication channel may include interrupting the first websocket communication channel within a predetermined time period after the print data is acquired.

According to still another aspect of the present disclosure, there is a data management method of a printing apparatus, the data management method including establishing a websocket communication channel for communicating with an external apparatus; and acquiring control data for controlling an operation of the printing apparatus through the websocket communication channel, wherein when the control data is print data for controlling a printing operation of the printing apparatus, the acquiring of control data includes acquiring the print data in response to a request for the print data to the external apparatus.

According to still another aspect of the present disclosure, there is a printing apparatus including a communication unit configured to establish a communication channel for communicating with an external apparatus and perform data communication with the external apparatus; a printing unit configured to perform a printing operation; and a control unit configured to control the communication unit to establish a first websocket communication channel with the external apparatus, request print data for performing the printing operation to the external apparatus through the first websocket communication channel by means of the communication unit, acquire the print data from the external apparatus through the first websocket communication channel in response to the request for the print data by means of the communication unit, and perform the printing operation on the basis of the acquired print data by means of the printing unit, wherein the print data is generated by the external apparatus and written in a format processable by the printing apparatus.

When the control unit transmits a data request message, the control unit may acquire an event that requests state information of the printing apparatus from the external apparatus by means of the communication unit and may transmit a data request message including the state information of the printing apparatus in response to the event requesting the state information.

The control unit may determine whether a predetermined condition associated with the acquisition of the print data is satisfied and may control a channel duration time of the first websocket communication channel by means of the communication unit.

The control unit may establish a second websocket communication channel for communicating with the external apparatus by means of the communication unit and may acquire control data other than the print data as data for controlling a state of the printing apparatus through the second websocket communication channel.

The technical solutions of the present disclosure are not limited to the aforementioned solutions, and other technical solutions which are not described herein should be clearly understood by those skilled in the art from the following detailed description and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
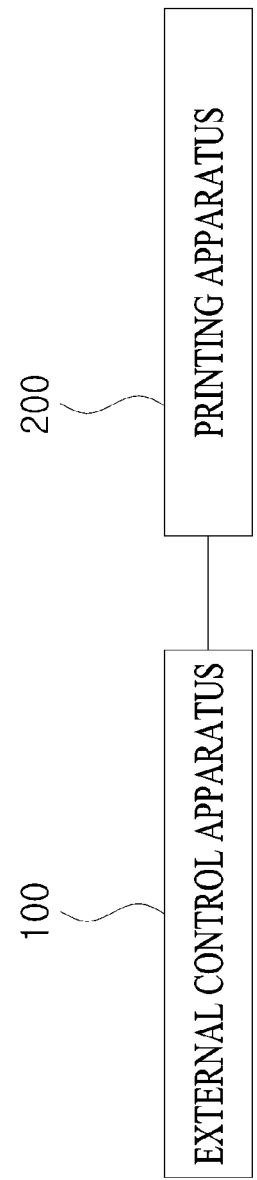
FIG. 1 briefly shows a first system according to the present disclosure.

Hereinafter, embodiments will be described in detail with reference to the accompanying drawings. However, the present disclosure is not restricted or limited to the embodiments. Also, like reference numerals in the drawings denote like elements.

In the drawings, the thickness of layers and regions may be exaggerated for clarity. Also, when it is mentioned that an element or layer is "on" another element or layer, the element or layer may be formed directly on another element or layer, or a third element or layer may be interposed therebetween. Like reference numerals refer to like elements throughout the specification.

Moreover, detailed descriptions about well-known functions or configurations associated with the present disclosure will be ruled out in order not to unnecessarily obscure the subject matter of the present disclosure. It should also be noted that, although ordinal numbers (such as first and second) are used in the following description, they are used only to distinguish similar components.

Hereinafter, an element according to the present disclosure will be described in detail with reference to the accompanying drawings. The suffixes "module" and "unit" for elements used in the following description are given or used interchangeably only for facilitation of preparing this specification, and thus they are not granted a specific meaning or function.

1. Overview

In this disclosure, a method, apparatus, and system for performing a printing operation through a bidirectional communication channel will be described. In detail, a method, apparatus, and system for performing the printing operation through a websocket communication channel will be described.

2. Data Communication Method

The printing method, apparatus, and system described herein may include an element for transmitting or receiving data. In this case, the data may be transmitted or received by a specific communication method.

The specific communication method may be a method of performing communication through a communication channel capable of duplex communication. The specific communication method may be a method of performing communication through a communication channel capable of asynchronous communication. The specific communication method may be a method of performing communication through a communication channel capable of duplex asynchronous communication (e.g., a websocket channel).

The communication methods will be described below.

2.1 Duplex Communication

In the printing method or the like of the present disclosure, data transmission and reception may be performed using a duplex communication method. In the printing method or the like of the present disclosure, bidirectional data communication may be performed using a single communication channel capable of duplex communication.

The duplex communication channel may be a full-duplex communication channel. The full-duplex communication channel may be a communication channel that allows bidirectional data transmission through a single communication channel. Accordingly, the duplex communication may refer to a communication method in which data may be transmitted bi-directionally and simultaneously.

The duplex communication method may enable real-time communication between two apparatuses connected through a duplex communication channel. Also, the duplex communication channel may accommodate a plurality of concurrent users, and data may be smoothly acquired through the duplex communication channel when printing requests are simultaneously received from a plurality of terminals.

2.2 Asynchronous Communication

In the printing method or the like of the present disclosure, data may be transmitted and received using an asynchronous communication method. In the printing method or the like of the present disclosure, when a first party transmits data to a second party through a communication channel capable of asynchronous communication, the first party may transmit the data to the second party without receiving a data request from the second party. In other words, when an asynchronous communication channel is used, the first party may transmit data to the second party at any time, and the transmission of data may be performed without a request from the second party.

2.3 Duplex Asynchronous Communication

2.3.1 Duplex Asynchronous Communication Method

In the printing method or the like of the present disclosure, data may be transmitted and received using a duplex asynchronous communication method. That is, the data transmission and reception may be performed through a communication channel having both of the above-described characteristics of the asynchronous communication channel and the duplex communication channel. In other words, the transmission of data may be bi-directionally performed through a single channel. The transmission of data may be performed without a request from a reception party at any time by a duplex asynchronous communication channel being used. For example, in the printing method or the like of the present disclosure, data may be transmitted and received using a websocket communication method.

2.3.2 Websocket Communication Method

According to an embodiment of the present disclosure, a communication channel used for the data transmission and reception may be a websocket communication channel.

Here, websocket refers to a communication specification that enables bi-directional data transmission and reception between a server and a client. The websocket communication channel refers to a logical communication path through which data is transmitted and received according to a websocket protocol. The websocket protocol may be a hypertext markup language (HTML) 5-based communication protocol for connecting a web browser and a web server.

The websocket communication may be a full-duplex communication protocol that provides complete duplex communication between devices connected to each other through the websocket channel. In other words, bi-directional transmission and reception between devices connected through the websocket channel may be simultaneously performed. The duplex communication using the websocket channel may support asynchronous data transmission.

Also, the data transmission and reception through the websocket channel may be performed in an asynchronous manner. In other words, the websocket channel may perform asynchronous data transmission and reception. For example, when a reception device for receiving data and a transmission device for transmitting data are connected through the websocket channel, data may be transmitted from the transmission device to the reception device without a request from the reception device. In other words, push-type data transmission and reception may be performed between the devices connected through the websocket channel. Accordingly, data may be transmitted at any time, and a time at which the transmission device transmits data and a time at which the reception device receives data may be different from each other. The asynchronous data transmission and reception through the websocket channel may be performed bidirectionally and simultaneously.

Establishment of the websocket channel may be initiated by a predetermined handshake. For example, when the websocket channel is established between a first device and a second device, the establishment of the websocket channel may be initiated by a handshake from the first device to the second device. The handshake may conform to the HyperText Transfer Protocol (HTTP) protocol. The handshake may denote that the first device transmits a handshake message to the second device. Generally, the handshake message may be implemented as a message only having a meaning of an apparatus requesting that another apparatus establish a websocket channel.

The websocket channel may have a characteristic of remaining established. When the websocket channel is established, the channel may remain established as long as a separate request that the channel be closed or interrupted is not generated by at least one terminal that is directly or indirectly connected to the channel.

The established websocket channel may be closed according to a channel closure request from an apparatus that is directly or indirectly connected to the websocket channel. The channel closure request may be implemented as a message through which one party requests that the other party close the channel.

A single apparatus may be connected to a plurality of websocket channel. When a single apparatus is connected to the plurality of websocket channels, two or more other apparatuses may be connected to the plurality of websocket channels. In this case, the plurality of websocket channels may transmit and receive data having a plurality of data formats. In other words, the plurality of websocket channels may include a first websocket channel for transmitting and receiving first format data and a second websocket channel for transmitting and receiving second format data. Specifically, the apparatus may include a plurality of websocket ports or sessions and establish a plurality of websocket channels.

Hereinafter, unless specially stated otherwise, bidirectional communication refers to websocket communication and a bidirectional communication channel refers to a websocket communication channel. However, the present disclosure is not limited thereto and can also be expansively applied to other communication methods that actually or virtually provide a duplex and/or asynchronous communication channel.

2.4 Data

The printing method or the like of the present disclosure may be performed using various kinds of data. The data used for the printing method or the like of the present disclosure may be transmitted or received using the above-described communication channels. Here, the type and format of data will be described.

2.4.1 Type of Data

The printing method according to the present disclosure may include processing control data for controlling an apparatus.

The control data may be control data for controlling the printing operation of an apparatus. The control data may be print data for controlling a printing operation. The print data may include information regarding a printing target, a printing environment, and a printing condition required for the apparatus to perform the printing operation.

The print data may be data regarding details of the printing. As an example, the data may include print document data to be printed. The print document data may be understood as data regarding a document displayed on printed matter acquired through the printing operation.

The control data may be data for controlling the printing apparatus. The data may include identification information of the printing apparatus. The data may include identification information of a port to which the printing apparatus is connected. As another example, the data may include designation information for designating the printing apparatus. The control data may be control command data specific to the printing apparatus.

The control data may be control data for controlling operation of a peripheral apparatus connected to the printing apparatus. The control data for controlling a peripheral apparatus may be control data for acquiring information by means of the peripheral apparatus. The control data for controlling a peripheral apparatus may be control data for controlling operation of the peripheral apparatus.

The printing method according to the present disclosure may include processing state data for acquiring state information of an apparatus.

The state data may be state data of the printing apparatus. For example, the data may include information regarding whether the printer apparatus is capable of performing the printing operation. The data may include information regarding a printing operation status of the printing apparatus or information regarding a printing operation result of the printing apparatus.

The state data may be state data of a peripheral apparatus connected to the printing apparatus. The state data may indicate a network state, a power state, an input reception state, or the like of the peripheral apparatus.

Data processed while printing according to the present disclosure is performed is not limited to the above-described examples and may include data that is directly or indirectly associated with embodiments described in the present disclosure. Also, the illustrated data is not an element that is independently handled. Data including one or more pieces of information or only a portion of the information may be used.

2.4.2 Format of Data

The printing method according to the present disclosure may include processing specific format data. The printing method according to the present disclosure may include converting a format of the data. The printing method according to the present disclosure may include processing data expressed in one or more formats.

The data may have a format understandable by some or all apparatuses associated with the printing method. The data may have a command format understandable by the printing apparatus. The data may have a command format understandable by a peripheral apparatus connected to an apparatus for performing the printing operation. The data may have a command format specific to an apparatus for ultimately controlling the data. The data may be written in a command format specific to a target apparatus.

The printing method according to the present disclosure may include processing data expressed in one or more layers. The data may be binary format data. The data may be text data.

The printing method according to the present disclosure may include processing data that is at least partially encrypted. The data may include plaintext.

The printing method according to the present disclosure may include processing data expressed in one or more languages.

Hereinafter, a format understandable by any apparatus may refers to a format processable by the apparatus or a format interpretable by the apparatus. Also, a format understandable by any apparatus may refers to a command format which is specific to the apparatus.

3. First Process: Web Printing

3.1 Performing Printing Operation According to First Printing Process

As an example of the printing process disclosed herein, a system, method, and apparatus for performing a printing operation through the above-described communication channel will be described below. Specifically, a system, method, and apparatus for transmitting and receiving data regarding the printing operation through a websocket communication channel will be described below.

3.1.1 System

3.1.1.1 First System

A printing method according to a first process described herein may be implemented by a system including an external control apparatus and a printing apparatus connected to the external control apparatus through a communication channel (i.e., a first system). The communication channel for connecting the external control apparatus and the printing apparatus may be the above-described websocket communication channel. The first system may be implemented as a point of sale (POS) system. In this case, the POS system may have a function of collectively managing data regarding transactions, collecting customer information, and enhancing transaction convenience at a retail store or the like where products are sold.

FIG. 1 briefly shows the first system according to the present disclosure. Referring to FIG. 1, the first system may include an external control apparatus 100 and a printing apparatus 200.

The first system may include the external control apparatus 100. The external control apparatus 100 may acquire a user input. The external control apparatus 100 may process and store data. The external control apparatus 100 may communicate with the printing apparatus 200 to transmit or receive data.

The external control apparatus 100 may acquire data regarding the printing operation. The external control apparatus 100 may acquire data from outside the system. The external control apparatus 100 acquiring data may include the external control apparatus 100 generating the data.

In the first system implemented as the POS system, the above-described external control apparatus 100 may be a POS host. The POS host may generate transaction data in consideration of a product number, a product name, a product price, etc. The POS host may transmit the transaction data to a POS printer. The POS host may be implemented in a PC-based environment.

The first system may include the printing apparatus 200. The printing apparatus 200 may establish a communication channel for communicating with an external apparatus to transmit or receive data. The printing apparatus 200 may establish the communication channel with the external apparatus. The communication channel may be established between the printing apparatus 200 and the external apparatus. The printing apparatus 200 may perform the printing operation.

The printing apparatus 200 may acquire control data from the external apparatus and operate on the basis of the acquired control data. The printing apparatus 200 may acquire print data and perform the printing operation on the basis of the acquired print data. The printing apparatus 200 may include a server unit. The printing apparatus 200 may provide a web application or a web page to the external apparatus.

In the first system implemented as the POS system, the above-described printing apparatus 200 may be a POS printer. The POS printer may print a transaction history on the basis of the transaction data received from the POS host.

The external control apparatus 100 and the printing apparatus 200 may transmit and receive data through the websocket communication channel. The external control apparatus 100 or the printing apparatus 200 may have a websocket communication server.

A plurality of websocket communication channels may be established between the external control apparatus 100 and the printing apparatus 200. The plurality of websocket communication channels may include a first channel and a second channel. A first time for which the first websocket communication channel is remained and a second time for which the second websocket communication channel is remained may be overlapped for at least some time period. The first channel and the second channel may be remained together for at least some time. The printing apparatus 200 may be connected to a plurality of external control apparatuses 100 through the websocket communication channels. The external control apparatus 100 may be connected to a plurality of printing apparatuses 200 through the websocket communication channels.

3.1.1.2 Second System

The printing method according to the first process described herein may be implemented by a system including a printing apparatus 200, an external control apparatus 100 connected to the printing apparatus 200 through a communication channel, and at least one peripheral apparatus connected to the printing apparatus 200 (i.e., a second system). Descriptions of the printing apparatus 200, the external control apparatus 100, and a connection relationship therebetween may be the same as those described above for the first system.

Figure 2:
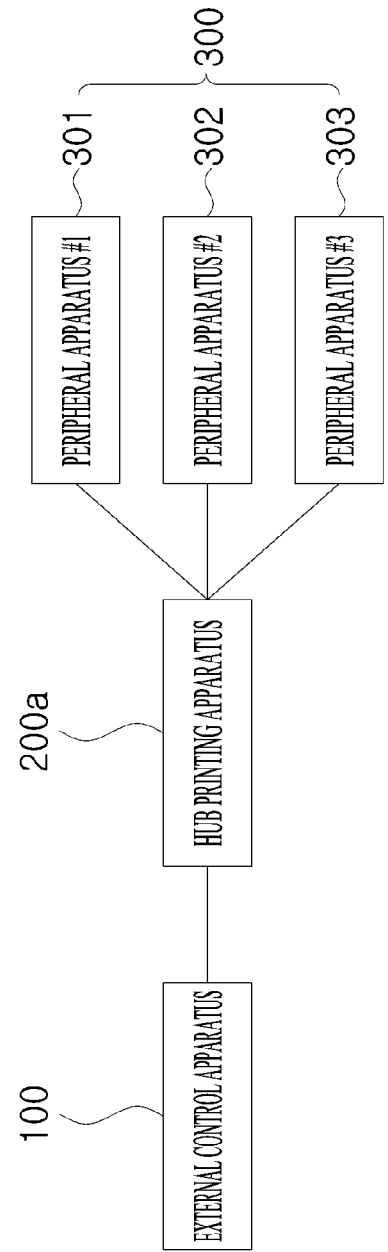
FIG. 2 briefly shows a second system according to the present disclosure.

FIG. 2 briefly shows the second system according to the present disclosure. Referring to FIG. 2, the second system may include an external control apparatus 100, a hub printing apparatus 200a, and a peripheral apparatus 300.

The above-described printing apparatus 200 may be implemented as the hub printing apparatus 200a. The hub printing apparatus 200a may be connected with the at least one peripheral apparatus 300 to perform a function of controlling the peripheral apparatus 300. The hub printing apparatus 200a may optionally have a function of performing a printing operation.

The hub printing apparatus 200a may acquire data from a control apparatus and may manage the peripheral apparatus 300 on the basis of the acquired data.

The hub printing apparatus 200a may be connected to a plurality of peripheral apparatuses 301 to 303. The hub printing apparatus 200a may acquire data from the external control apparatus 100 and transfer the data to at least some of the plurality of peripheral apparatuses 300.

The peripheral apparatus 300 connected to the hub printing apparatus 200a may be an input apparatus configured to receive an external input. The peripheral apparatus 300 may be an output apparatus configured to output data received from the hub printing apparatus 200a.

The peripheral apparatus 300 may be a secondary printing apparatus. The secondary printing apparatus may denote to a printing apparatus which receive print data from a hub apparatus. The secondary printing apparatus may acquire data from the hub printing apparatus 200a and may perform the printing operation on the basis of the acquired data. The peripheral apparatus 300 may include a plurality of secondary printing apparatuses. The secondary printing apparatus may be a legacy printer. The secondary printing apparatus may be a local printer which connected with local network.

The external control apparatus 100 may be connected to the hub printing apparatus 200a through the websocket channel to transmit and receive data. The external control apparatus 100 may generate data for controlling the hub printing apparatus 200a and at least one peripheral apparatus 300 connected to the hub printing apparatus 200a and transmit the generated data to the hub printing apparatus 200a.

The second system may be implemented as a POS system. In the second system implemented as the POS system, the above-described external control apparatus 100 may be a POS host. In the second system implemented as the POS system, the above-described hub printing apparatus 200a may be a POS printer. Detailed descriptions of the POS host and the POS printer may be understood as being similar to those described above for the first system.

In the second system implemented as the POS system, the above-described peripheral apparatus may be a POS peripheral apparatus. For example, the POS peripheral apparatus may include a barcode reader, a signature pad, a card reader, etc. A POS peripheral apparatus such as a barcode reader may receive sales information such as a product type, a product price, or the like and process sales data. The POS peripheral apparatus may receive transaction information such as a card number, a payment amount, or the like and process transaction data.

In the second system implemented as the POS system, the above-described secondary printing apparatus may be a secondary POS printer located in a business district that is managed by the POS printer or the POS system.

3.1.2 System Operation

Here, a method of the above-described first system and second system performing a printing operation according to a first printing process will be described. However, the printing operation according to the first printing process cannot be only implemented by the first system and the second system, and may be applied to a system to which another apparatus is added or from which some apparatuses are removed.

3.1.2.1 Operation of First System

The first printing process described herein may be implemented by a first printing system including the printing apparatus 200 and the external control apparatus 100. The first printing process implemented by the first printing system may include establishing a communication channel and transmitting data.

The establishing of a communication channel may include establishing a duplex asynchronous communication channel between the printing apparatus 200 and the external control apparatus 100. The establishing of a communication channel may include establishing a websocket communication channel between the printing apparatus 200 and the external control apparatus 100.

The establishing of a communication channel may include transmitting, by any one of the printing apparatus 200 and the external control apparatus 100, a handshake message. For example, the establishing of a communication channel may be initiated by the printing apparatus 200 transmitting the handshake message to the external control apparatus 100 or by the external control apparatus 100 transmitting the handshake message to the printing apparatus 200.

More specifically, the establishing of a communication channel may be achieved by the printing apparatus 200 transmitting a handshake request message to the external control apparatus 100, the external control apparatus 100 transmitting a handshake response message to the printing apparatus 200 in response to the handshake request message, and the printing apparatus 200 receiving the handshake response message. The establishing of a communication channel may be achieved by the external control apparatus 100 transmitting the handshake request message to the printing apparatus 200, the printing apparatus 200 transmitting the handshake response message to the external control apparatus 100, and the external control apparatus 100 receiving the handshake response message. In this case, the transmission and reception of the handshake request message or the handshake response message conform to the HTTP protocol.

The transmitting of data may include transmitting data through the duplex asynchronous communication channel. The transmitting of data may denote transmitting data through the websocket channel. Specifically, the transmitting of data may include the external control apparatus 100 transmitting data to the printing apparatus 200 through the connected communication channel. In this case, the transmitting of data may denote transmitting data generated or processed by the external control apparatus 100 to the printing apparatus 200. The transmitting of data may include transmitting data from the printing apparatus 200 to the external control apparatus 100 through the communication channel. In this case, the transmitting of data may denote transmitting data generated or processed by the printing apparatus 200 to the external control apparatus 100.

The transmitting of data may include a printing control apparatus transmitting data to the printing apparatus 200 through the communication channel. The external control apparatus 100 may transmit control data generated by the printing control apparatus and related to the printing operation to the printing apparatus 200.

The printing method according to this embodiment may further include performing a printing operation. The performing of a printing operation may denote that the printing apparatus 200 performs the printing operation on the basis of the received data. According to a format of the received data, the printing apparatus 200 may parse the received data optionally. The printing apparatus 200 may perform the printing operation on the basis of a result of the parsing. The performing of a printing operation may denote that a printing module performs the printing operation on the basis of the received signal or data.

3.1.2.2 Operation of Second System

The first printing process described herein may be implemented by a second printing system including the external control apparatus 100, the hub printing apparatus 200a, and the peripheral apparatus 300. The first printing process implemented by the second printing system may include establishing a communication channel, transmitting data, and transferring data.

The establishing of a communication channel may denote establishing a communication channel between the hub printing apparatus 200a and the external control apparatus 100. A detailed description of the establishing of a communication channel may be understood as being similar to that described above for the first system.

The transmitting of data may include the external control apparatus 100 transmitting data to the printing apparatus 200. A detailed description of the transmitting of data may be understood as being similar to that described above for the first system.

The transmitted data may include control information for controlling the peripheral apparatus 300, apparatus identification information for identifying n destination apparatus. The destination apparatus may be the destination of the data. The destination apparatus may acquire the data at last. The destination apparatus may be controlled by the control information included in the data. The data may be print data for controlling a printing operation when the peripheral apparatus 300 is n secondary printing apparatus, etc. A detailed description is the same as that described above for the second system.

The transferring of data may include the printing apparatus, that is, the hub printing apparatus 200a transferring the received data to the peripheral apparatus 300.

The transferring of data may denote that the hub printing apparatus 200a transfers the data to the peripheral apparatus 300 by a wired connection or over a wireless network.

When a plurality of peripheral apparatuses 300 are provided, the hub printing apparatus 200a may transmit the data to at least one of the peripheral apparatuses 300. In this case, the transferring of data may be performed on the basis of peripheral apparatus identification information included in the data. The transferring of data may denote transferring the data to the peripheral apparatus 300 determined by the hub printing apparatus 200a. In this case, the hub printing apparatus 200a may determine the peripheral apparatus 300 to receive the data on the basis of any one of a format, type, and content of the data.

When the peripheral apparatus 300 is a secondary printing apparatus, the data may be control data for controlling operation of the secondary printing apparatus.

In this case, the transferring of the data by the hub printing apparatus 200a may include acquiring identification information of the secondary printing apparatus from the data and transferring the data on the basis of the acquired identification information.

When the peripheral apparatus 300 includes a plurality of secondary printing apparatuses, the transferring of data may include the hub printing apparatus 200a transferring the received data to at least some of the plurality of secondary printing apparatuses.

When the peripheral apparatus 300 includes the plurality of secondary printing apparatuses, the transferring of data may include the hub printing apparatus 200a determining at least one of the plurality of secondary printing apparatuses to which the data is to be transferred. The determining of a secondary printing apparatus to which the data is to be transferred may include acquiring identification information of the peripheral apparatus 300 that will ultimately acquire the data from the data and transmitting the data to the peripheral apparatus 300 corresponding to the identification information. The determining of a secondary printing apparatus to which the data is to be transferred may include determining a secondary printing apparatus that will receive the data on the basis of any one of the format, type, and content of the data.

3.1.3 Configuration of Each Apparatus

Here, operations performed by the apparatuses constituting the above-described first system and second system will be described. However, the printing method or the like of the present disclosure is performed not only by the apparatuses, which will be described below, but it should be interpreted that each of the apparatuses may be replaced with other electronic apparatuses for performing its own function or similar functions or a combination thereof.

Also, the term "unit" used herein, which constitutes any apparatus, does not only refer to a physical element provided in the apparatus, but may also denote a software element executed in the apparatus.

3.1.3.1 External Control Apparatus

A printing operation according to the present disclosure may be controlled by a control apparatus. The control apparatus may be understood as being the external control apparatus in the above-described first and second systems. The external control apparatus may generate control data and transmit the control data to an external apparatus. The external control apparatus may communicate with a printing apparatus to perform a function of controlling the printing apparatus. In a POS system, the control apparatus may be implemented as a POS host.

Here, the external device may be a device configured to execute a web application. The external control apparatus may include a web browser configured to communicate with the printing apparatus through a web page provided by a web server. The external control apparatus may be an electronic device on which a web application provided by a web server is running or installed. The external control apparatus may be a mobile terminal such as a smartphone, a tablet PC, a laptop, a desktop, or the like.

Figure 3:
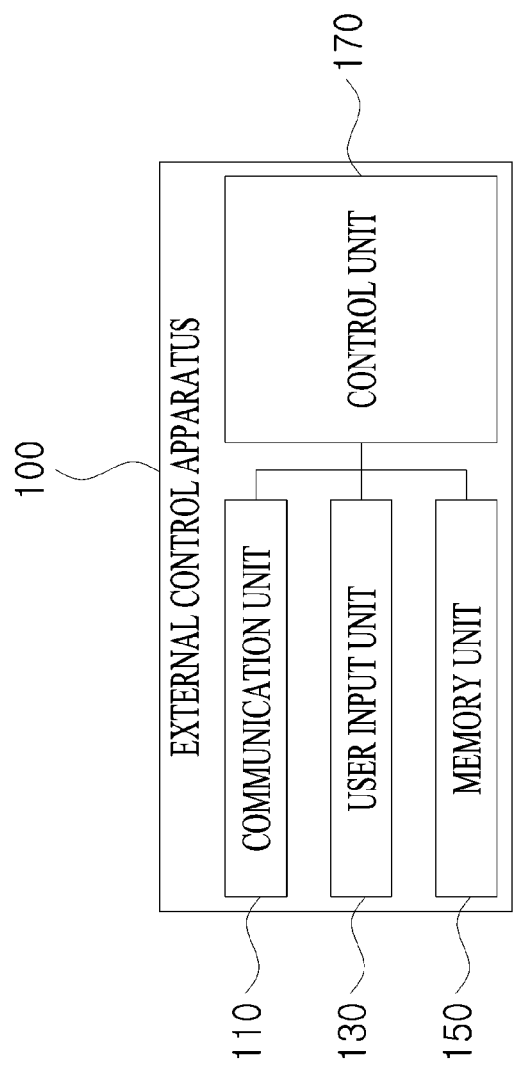
FIG. 3 briefly shows an external control apparatus according to an embodiment of the present disclosure.

FIG. 3 briefly shows the external control apparatus 100 according to an embodiment of the present disclosure. Referring to FIG. 3, the external control apparatus 100 may include a communication unit 110, a user input unit 130, a memory unit 150, and a control unit 170. The communication unit 110 or the like may be included in the external control apparatuses as a physical element. However, the present disclosure is not limited thereto. Alternatively, the communication unit 110 or the like may be implemented as a software element included in the external control apparatus 100.

The external control apparatus 100 may include the communication unit 110 configured to communicate with an external apparatus. The communication unit 110 may communicate with the external apparatus through a local area network (LAN), a wireless local area network (WLAN), WiFi, ZigBee, WiGig, Bluetooth, etc.

The communication unit 110 may establish a communication channel with the external apparatus and perform data communication with the external apparatus through the communication channel. The communication channel may be a duplex asynchronous communication channel. The communication channel may be a websocket communication channel.

The communication unit 110 may transfer data received from the control unit 170 or the user input unit 130 to the external apparatus, that is, a printing apparatus through the communication channel. The communication unit 110 may transfer data acquired from the external apparatus to the control unit 170 through the communication channel.

When the communication unit 110 establishes a duplex asynchronous communication channel with the external apparatus, the communication unit 110 may transmit data to the external apparatus at any time. The communication unit 110 may simultaneously transmit and receive data to and from the external apparatus. This can also be equally applied to a case in which the communication unit 110 transmits data to the external apparatus.

The communication unit 110 may perform a handshake operation to establish the websocket channel with the external apparatus. The communication unit 110 may start to establish the websocket channel by transmitting a handshake message to the external apparatus. The communication unit 110 may initiate establish the websocket channel by transmitting a handshake message to the external apparatus. When the communication unit 110 transmits a handshake message to the external apparatus, the communication unit 110 may function as a websocket client. The communication unit 110 may establish the websocket channel by receiving the handshake message from the external apparatus and transmitting a response message in response to the reception. When the communication unit 110 receives the handshake message, the communication unit 110 may function as a websocket server.

The external control apparatus 100 may include the user input unit 130 configured to acquire a user input. The user input unit 130 may acquire the user input to acquire data regarding the printing operation. The acquired data is obtained based on the acquired user input. For example, the user input unit 130 may acquire a touch input, a voice input, a keyboard input, or the like from a user.

The user input unit 130 may acquire a user input including information regarding control of the printing operation. The user input may at least partially include information regarding the printing operation, such as printed content, a printing format, and printing apparatus information. The user input unit 130 may transfer the acquired user input to the control unit 170 or the communication unit 110.

The external input apparatus may include the memory unit 150. The memory unit 150 may store data acquired from the outside, data generated by the external control apparatus 100, input data received from the user, etc.

The external control apparatus 100 may include the control unit 170.

The control unit 170 may receive the information from the user by means of the user input unit 130. The control unit 170 may establish a communication channel with an external apparatus by means of the communication unit 110 and may acquire data from the external apparatus or transmit data to the external apparatus. The control unit 170 may acquire data from the user input unit 130 or the communication unit 110.

The control unit 170 may generate control data for controlling the printing operation on the basis of a user input acquired from the user input unit 130. The control unit 170 may transfer the control data to the printing apparatus by means of the communication unit 110.

The control unit 170 may acquire data. The control unit 170 acquiring data includes the control unit 170 generating data.

The acquiring of the data by the control unit 170 may be implemented by processing data acquired from the outside. The processing of data may denote modifying the data or adding or combining additional data to the data. The acquiring of data may be performed by a data generation unit. The data generation unit may be provided separately from the control unit 170.

The external control apparatus 100 acquiring data may denote that the external control apparatus 100 parses pre-acquired base data to acquire the data. Specifically, the external control apparatus 100 may acquire any one of print data for controlling the printing operation of the printing apparatus, document data on which the print data is generated, and raw data of a document to be printed. The document data may be a basis of print data. The data generated by the external control apparatus 100 may be implemented in a language understandable by the printing apparatus.

The control unit 170 may convert the format of data. The converting of the format of data may include converting the data in a language that is interpretable (or processable) by a specific apparatus. The converting of data may be performed by a data acquisition unit that is provided separately from the control unit 170.

The converting of the format of data may denote converting the data into a format interpretable by the printing apparatus. When the printing apparatus is a hub printing apparatus, the converting of the format of data may denote converting the data into a format interpretable by at least some peripheral apparatuses connected to the printing apparatus. More specifically, the format of data may be converted into a format interpretable by a secondary printing apparatus connected to the hub printing apparatus.

3.1.3.2 Printing Apparatus

The data management according to an embodiment of the present disclosure may be performed by a printing apparatus. The printing apparatus may receive data from an external control apparatus. The printing apparatus may perform a printing operation on the basis of the data received from the external control apparatus. In a POS system, the printing apparatus may be implemented as a POS printer.

Figure 4:
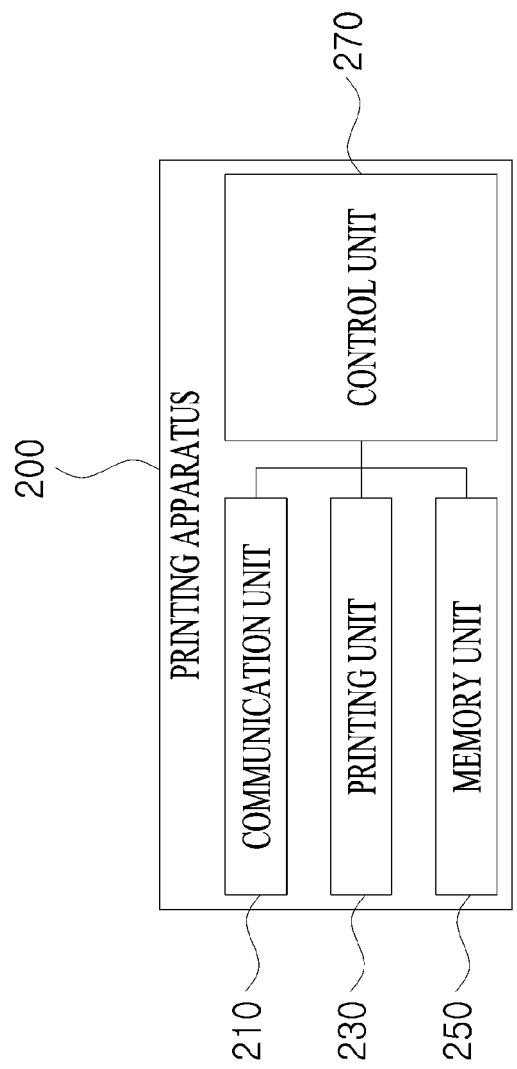
FIG. 4 briefly shows a printing apparatus according to an embodiment of the present disclosure.

FIG. 4 shows the printing apparatus 200 according to an embodiment of the present disclosure. Referring to FIG. 4, the printing apparatus 200 may include a communication unit 210, a printing unit 230, a memory unit 250, and a control unit 270.

The printing apparatus 200 may include the communication unit 210 configured to communicate with an external apparatus. The communication unit 210 may receive data from the external apparatus or transmit data to the external apparatus. The communication unit 210 may be connected to an external control apparatus over a network such as a LAN, a WLAN, WiFi, Zigbee, WiGig, and Bluetooth.

The communication unit 210 may establish a communication channel with the external apparatus. The communication unit 210 may establish a communication channel for communicating with the external apparatus. The communication channel may be a websocket communication channel. The communication unit 210 may be a websocket communication unit. The websocket communication unit may function as a websocket server or a websocket client. The websocket communication unit does not denote only a physical element, but includes a software element configured to manage establishment, closure, etc. of the websocket communication channel.

The printing apparatus 200 may include the printing unit 230 configured to perform the printing operation. The printing unit 230 may perform the printing operation on the basis of print data. According to a printing environment designated by the print data, the printing unit 230 may perform the printing operation on an object to be printed included in the print data. The print data that controls the printing operation of the printing unit 230 may be received from an external control apparatus through the communication unit 210 or may be acquired form an electronic device connected to the printing apparatus 200 in a wired or wireless manner.

The printing apparatus 200 may include the memory unit 250. The memory unit 250 may store print data for performing the printing operation.

The control unit 270 may acquire data from an external apparatus or transmit data to the external apparatus by means of the communication unit 210. The control unit 270 may perform the printing operation by means of the printing unit 230. The control unit 270 may provide a web application or the like to an external apparatus by means of a web server, which will be described below. The control unit 270 may manage at least one peripheral apparatus connected to the printing apparatus 200 by means of a peripheral apparatus control unit 290a, which will be described below.

The control unit 270 may establish a communication channel with an external control apparatus and receive data from the external control apparatus. The control unit 270 may control the printing operation on the basis of the received data. The control unit 270 may generate control data or convert the format of the received data on the basis of the received data. The control unit 270 may generate control data for controlling operation of the at least one peripheral apparatus connected to the printing apparatus 200.

According to an embodiment of the present disclosure, the printing apparatus 200 may include a web server. The web server may provide a web page, a web application, or the like to the external control apparatus. However, the web server does not necessarily have to be included in the printing apparatus 200 and may be provided by a server apparatus provided separately from the printing apparatus 200. The web server included in the printing apparatus 200 will be described below with reference to FIG. 5.

Figure 5:
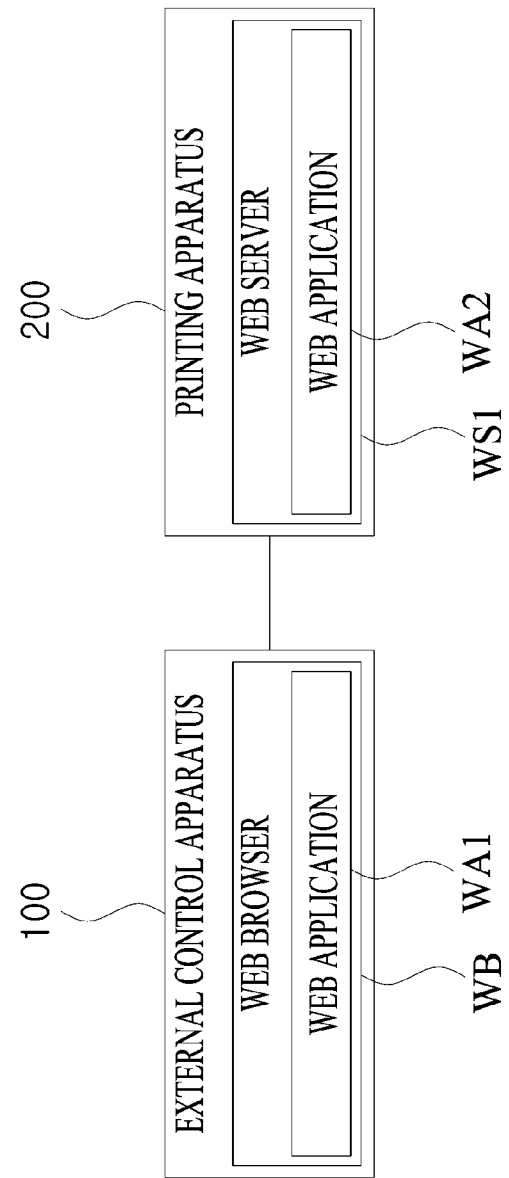
FIG. 5 shows a first system according to an embodiment of the present disclosure.

FIG. 5 shows a first system according to an embodiment of the present disclosure. Referring to FIG. 5, the external control apparatus 100 may include a web browser WB. The web browser WB may execute a web application WA1. The web application WA1 may be provided by the printing apparatus 200. The printing apparatus 200 may have a web server WS1 and may provide a web application WA2, which is stored in the web server WS1, to the external control apparatus 100. The web applications WA1 and WA2 may provide source code so that the external control apparatus 100 may control the printing apparatus 200 or may acquire information from the printing apparatus 200. The web applications WA1 and WA2 may include a user interface to acquire a control command from a user of the external control apparatus 100 or display a state of the printing apparatus 200 to the user.

Figure 6:
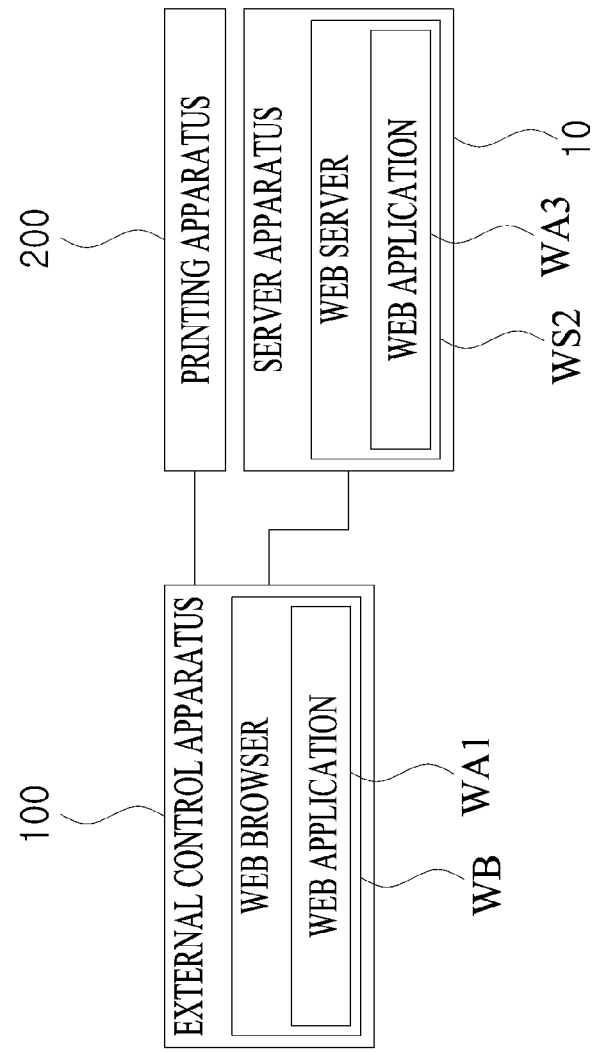
FIG. 6 shows a first system according to another embodiment of the present disclosure.

FIG. 6 shows a first system according to another embodiment of the present disclosure. Referring to FIG. 6, the first system may further include a server apparatus 10. In this case, the server apparatus 10 may have a web server WS2 and may provide a web application WA3, which is stored in the web server WS2, to the external control apparatus 100. The external control apparatus 100 may include the web browser WB and may execute the web application WA3 provided by the web server WS2 by means of the web browser WB.

In the above-described first system, the server apparatus 10 may denote a server apparatus 10 provided separately from the external control apparatus 100 and the printing apparatus 200. The server apparatus 10 may have the web server WS2 to store apparatus information of the printing apparatus, apparatus information of peripheral apparatuses connected to the printing apparatus, or the like as well as to provide the web application WA3 to the external control apparatus 100.

According to an embodiment of the present disclosure, the printing apparatus 200 may be implemented as a hub printing apparatus. The hub printing apparatus may relay data between apparatuses. Unless specially stated otherwise, the hub printing apparatus may be implemented similarly to the printing apparatus.

The hub printing apparatus may be connected to at least one peripheral apparatus to transmit data to the at least one peripheral apparatus or acquire data from the peripheral apparatus.

The hub printing apparatus may manage a peripheral apparatus. The managing of a peripheral apparatus by the hub printing apparatus includes controlling an operation or state of the peripheral apparatus on the basis of peripheral apparatus control data acquired from the outside or generated by the printing apparatus.

Figure 7:
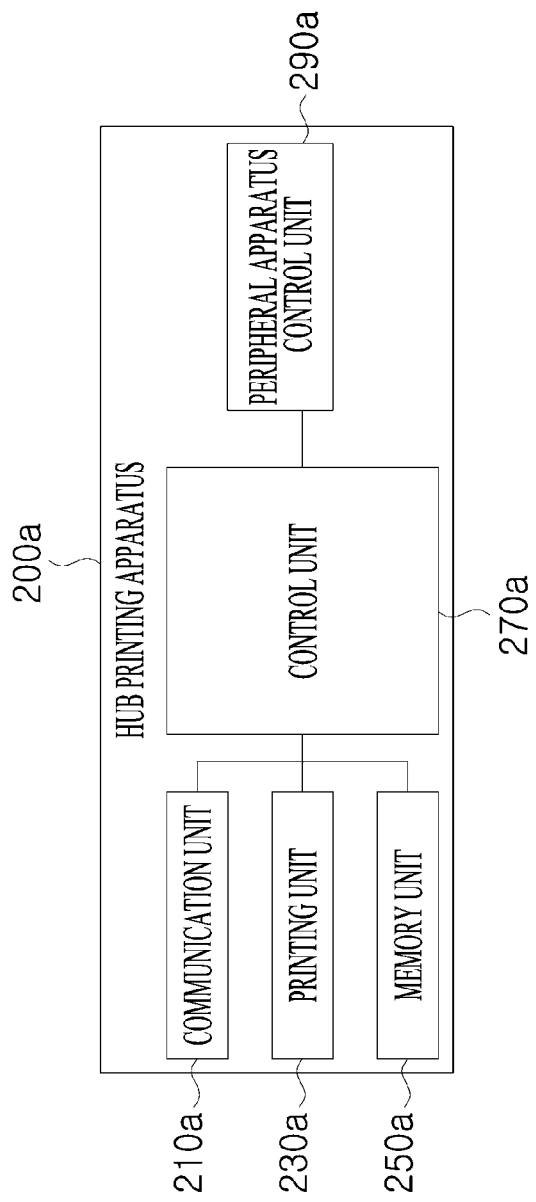
FIG. 7 briefly shows a hub printing apparatus according to an embodiment of the present disclosure.

FIG. 7 briefly shows the hub printing apparatus 200a according to an embodiment of the present disclosure. Referring to FIG. 7, the hub printing apparatus 200a may have a communication unit 210a, a memory unit 250a, a control unit 270a, and a peripheral apparatus control unit 290a.

The communication unit 210a may establish a communication channel with an external apparatus and may transmit data to the external apparatus or acquire data from the external apparatus. The communication unit 210a may perform data communication with the peripheral apparatus.

The hub printing apparatus 200a may have the memory unit 250a to store data. The memory unit 250a may store data for controlling the hub printing apparatus 200a or the peripheral apparatus 300 connected to the hub printing apparatus 200a.

The control unit 270a may communicate with a control apparatus and the peripheral apparatus by means of the communication unit 210a. The control unit 270a may control or manage at least one peripheral apparatus 300 connected to the hub printing apparatus 200a by means of the peripheral apparatus control unit 290a, which will be described below.

The hub printing apparatus 200a may include the peripheral apparatus control unit 290a. The peripheral apparatus control unit 290a may transmit data to the at least one peripheral apparatus 300 or acquire data from the peripheral apparatus 300. The hub printing apparatus 200a does not separately include the peripheral apparatus control unit 290a and may perform a function of the peripheral apparatus control unit 290a by means of the control unit 270a.

When a plurality of peripheral apparatuses 300 are provided, the peripheral apparatus control unit 290a may determine a peripheral apparatus to which the data is to be transmitted.

The determining of a peripheral apparatus to which the data is to be transmitted may be performed on the basis of peripheral apparatus identification information included in the data. The peripheral apparatus identification information may be provided as port information of the printing apparatus to which the peripheral apparatus or the secondary printing apparatus is connected.

The determining of a peripheral apparatus to which the data is to be transmitted may be performed in consideration of the format of the received data. The hub printing apparatus 200a may transmit the data to an apparatus that may understand the received data.

The determining of a peripheral apparatus to which the data is to be transmitted may be performed in consideration of the type of the received data. When the control data is control data for acquiring an image, the hub printing apparatus 200a may transfer the control data to a peripheral apparatus configured to capture an image.

The determining of a peripheral apparatus to which the data is to be transmitted may be performed in consideration of states of the plurality of peripheral apparatuses. For example, when the peripheral apparatus control unit 290a determines a peripheral apparatus to which print data is to be transmitted, the peripheral apparatus control unit 290a may transmit the print data to a secondary printing apparatus that is not performing a printing operation.

The determining of a peripheral apparatus to which the data is to be transmitted by the hub printing apparatus 200a may conform to a predetermined priority. The priority may be designated by a user. The priority may be determined in consideration of a network connection state of the peripheral apparatuses, a distance from the hub printing apparatus 200a, etc.

The hub printing apparatus 200a may optionally have a printing unit 230a. When the hub printing apparatus 200a does not have the printing unit 230a and receives print data, the hub printing apparatus 200a may transfer the print data to a secondary printing apparatus connected to the hub printing apparatus 200a.

In other words, the hub printing apparatus 200a may receive data from an external apparatus and transfer the received data to at least one peripheral apparatus connected to the hub printing apparatus 200a. For example, the hub printing apparatus 200a may acquire print data from an external control apparatus and transmit the print data to an appropriate secondary printing apparatus.

When a plurality of peripheral apparatuses are provided, the plurality of peripheral apparatuses may include a plurality of secondary printing apparatuses. In this case, the hub printing apparatus 200a may transmit data to the plurality of secondary printing apparatuses. The hub printing apparatus 200a may acquire identification information (or destination information) for designating a secondary printing apparatus to perform the printing operation from the data acquired from the external control apparatus and may transmit the data to the corresponding secondary printing apparatus on the basis of the identification information.

When the plurality of peripheral apparatuses include a plurality of secondary printing apparatuses, the hub printing apparatus 200a may transmit data to the secondary printing apparatus in consideration of the type of the data. When the data is print data, the hub printing apparatus 200a may transfer the data to the secondary printing apparatus.

3.1.3.3 Peripheral Apparatus

Data management according to an embodiment of the present disclosure may be performed by a peripheral apparatus connected to the printing apparatus. The peripheral apparatus may have a communication unit and a control unit.

The communication unit may receive data from a connected hub printing apparatus or transmit data to the printing apparatus.

The control unit may perform data communication with the printing apparatus by means of the communication unit. The peripheral apparatus may be connected to the hub printing apparatus by a wired connection or over a wireless network and may acquire data from the hub printing apparatus or transfer data to the hub printing apparatus. The network may be a local network. The wired connection may be a USB connection.

The peripheral apparatus may receive a control command from the hub printing apparatus. The peripheral apparatus may transmit state data to the hub printing apparatus.

The control unit may acquire data from the printing apparatus connected thereto and perform an operation corresponding to the data. The control unit may acquire state information of the peripheral apparatus and transfer the state information to the external apparatus.

The peripheral apparatus may receive data from the printing apparatus connected thereto and operate on the basis of the received data. The data received by the peripheral apparatus may be control data regarding an operation or an operational environment of the peripheral apparatus.

The peripheral apparatus may transfer the acquired data to the printing apparatus. The data acquired by the peripheral apparatus and transferred to the printing apparatus may be state information of the peripheral apparatus. The state information of the peripheral apparatus may indicate an operation status, an operational availability (For example, whether or not the printing operation can be performed at a specific point in time), etc. of the peripheral apparatus.

The peripheral apparatus may optionally have an input unit. The input unit may receive electronic information from a user. The peripheral apparatus may acquire product information, payment card information, etc. The input unit may receive information from the user on the basis of visual information, auditory information, tactile information, etc. Specifically, the peripheral apparatus may have a voice input unit, a touch input unit, an image recognition unit, etc.

In the above-described POS system, a peripheral apparatus having such an input unit may be implemented as a barcode reader, a card reader, a signature pad, an electronic transaction device, or the like.

The peripheral apparatus may optionally have an output unit. The output unit may visually or audibly output information to provide the information to the user on the basis of the data acquired from the hub printing apparatus. In the above-described POS system, a peripheral apparatus having such an output unit may be implemented as a cash drawer, a transaction history display device, or the like.

3.1.3.4 Secondary Printing Apparatus

The printing operation according to an embodiment of the present disclosure may be performed by a secondary printing apparatus. Here, it can be understood that the secondary printing apparatus refers to a printing apparatus that is connected to the hub printing apparatus but does not have a direct connection (such as network channel) with a control apparatus. The secondary printing apparatus may be connected to the printing apparatus or the hub printing apparatus to receive print data and perform a printing operation on the basis of the print data.

According to an embodiment of the present disclosure, the secondary printing apparatus may include a communication unit, a control unit, and a printing unit.

The communication unit may acquire print data from a printing apparatus (i.e., the hub printing apparatus). The communication unit may transmit data to the hub printing apparatus. The data transmitted to the hub printing apparatus by the communication unit may be state information of the secondary printing apparatus. The state information of the secondary printing apparatus may include information regarding a result of performing operation of the secondary printing apparatus, information regarding printing availability of the secondary printing apparatus, etc.

The control unit may acquire a printing control command on the basis of the print data acquired from the hub printing apparatus and transfer the control command to the printing unit.

The printing unit may perform the printing operation on the basis of the print data.

In the above-described POS system, the secondary printing apparatus may be a printing apparatus that is directly or indirectly connected to the control apparatus of the POS system. The printing apparatus may be provided and used in a sales store associated with the POS system and may be provided plurally.

3.2 Data Request

In the printing method or the like of the present disclosure, a duplex asynchronous communication channel or the like may be used as described above. More specifically, data communication may be performed using a websocket communication channel A transmission time of data when the data is transmitted using the websocket communication channel will be described below.

3.2.1 Data Transmission in Response to Requesting

In the printing method or the like of the present disclosure, when the data communication channel is a websocket communication channel, data may be transmitted from a transmission device to a reception device without a request from the reception device. When the data is transmitted without a request from the reception device, a data processing load of the reception device is increased. Generally, since the reception device has a smaller data processing capacity than the transmission device, confusion may occur due to the arbitrary data transmission from the transmission device.

According to an embodiment of the present disclosure, the data transmission may be performed due to a request from the reception device. When the data transmission is performed due to the request from the reception device, the reception device may systematically manage data. Specifically, when a data communication channel is established and the transmission device acquires data to be transmitted to the reception device, the transmission device may not transmit the data until a data request is received from the reception device. When the transmission device receives a data request message from the reception device, the transmission device may transmit data to the reception device on the basis of the data request message.

Hereinafter, the transmitting of the data request message, which is defined herein, may be understand as an action of the reception device requesting that the transmission device transmit data and does not necessarily conform to a conventional concept of a data request that is commonly used in data communication.

In this specification, the reception device acquiring data transmitted on the basis of the data request message may be understood as the reception device acquiring the data in response to requesting transmission of the data. In this case, the acquiring of data in response to the request for the transmission of the data may denotes that the reception device acquires data transmitted due to the data request and does not necessarily denote that the reception device receives a response message that is commonly used in general data communication.

A system, apparatus, and method for transmitting and managing data according to a data transmission request from a reception device will be described below.

3.2.2 System Operation

A data management method according to an embodiment of the present disclosure may be performed by a system including a first apparatus and a second apparatus. The data management method according to an embodiment of the present disclosure may include establishing a communication channel between the first apparatus and the second apparatus, transmitting, by the second apparatus, a data request message to the first apparatus through the communication channel, and transmitting, by the first apparatus, data to the second apparatus on the basis of the data request message.

The establishing of a communication channel between the first apparatus and the second apparatus may include establishing the above-described duplex asynchronous communication channel. Detailed descriptions of the channel and the establishment of the channel may be understood as being similar to those described above for the first printing process.

According to an embodiment of the present disclosure, all parts of the communication channel between the first apparatus and the second apparatus may be websocket channel. Some parts of the communication channel between the first apparatus and the second apparatus may be websocket channel and other parts of the communication channel may not be websocket channel. Some parts of the connection between the first apparatus and the second apparatus may be wired network connection. A communication channel established between the first apparatus and the second apparatus may be connected with both of apparatuses directly. The communication channel may be connected at least one of the apparatuses indirectly.

In other words, even when the first apparatus and a third apparatus are directly connected to the communication channel and the second apparatus is connected to the third apparatus, the communication channel may be regarded as established between the first apparatus and the second apparatus.

The second apparatus may transmit the data request message to the first apparatus through the communication channel. The transmitting of the data request message may be performed through a websocket communication channel. However, the present disclosure is not limited thereto, and the data request message may be transmitted by other means.

The second apparatus may transmit a data request message to the first apparatus in response to receiving a data notification message from the first apparatus. In other words, when the first apparatus acquires data to be transmitted to the second apparatus, the first apparatus may transmit a notification message indicating that the data is acquired to the second apparatus. The second apparatus may receive the notification message and transmit the data request message on the basis of the notification message. The second apparatus may transmit the data request message in consideration of a state of the second apparatus.

The second apparatus may repeatedly transmit the data request message to the first apparatus. The data request message may be repeatedly generated a predetermined number of times. For example, the data request message may be transmitted at first transmission intervals during a first time period and at second transmission intervals during a second time period. In this case, it is possible to prevent a waste of resources due to an excessive data request action by setting the second transmission interval to be longer than the first transmission interval.

When the first apparatus and the second apparatus are directly connected to the communication channel, the data request message may be transmitted from the second apparatus to the first apparatus. When the first apparatus and the second apparatus are indirectly connected through the third apparatus, that is, when a communication channel is established between the first apparatus and the third apparatus, the data request message may be transmitted from the second apparatus to the first apparatus via the third apparatus. In this case, the data request message may be transferred from the first apparatus to the second apparatus via the third apparatus to which the communication channel is connected.

The transmitting of the data on the basis of the data request message may denote transmitting the data from the first apparatus to the second apparatus through the communication channel. When the first apparatus is connected to the third apparatus through the communication channel, the transmitting of the data may denote transmitting the data from the first apparatus to the second apparatus via the third apparatus. In this case, the second apparatus and the third apparatus may be connected through a local network. When the second apparatus is connected to the third apparatus through the communication channel, the transmitting of the data may denote transferring the data from the first apparatus to the second apparatus via the third apparatus. In this case, the first apparatus and the third apparatus may be connected through a local network.

The transmitting of the data on the basis of the data request message may denote transmitting the data in consideration of matters affecting a printing operation, such as apparatus state information, etc. which are included in the data request. The transmitting of the data on the basis of the data request message may denote transmitting the data in consideration of apparatus identification information.

The data transmitted to the second apparatus on the basis of the data request message may be data for controlling operation of the second apparatus or a peripheral apparatus connected to the second apparatus. The data may include print data for controlling a printing operation of the second apparatus. The data may include setting information for managing apparatus settings of the second apparatus, identification information for identifying the second apparatus, identification information of a user terminal having authority to access the second apparatus, etc.

3.2.2.1 First System

A data management method according to an embodiment of the present disclosure may be performed by the above-described first system, that is, a system including a printing apparatus and a control apparatus.

The data management method according to an embodiment of the present disclosure may include establishing a communication channel between the printing apparatus and the control apparatus, transmitting, by the printing apparatus, a data request message to the control apparatus, and transmitting, by the control apparatus, data to the printing apparatus on the basis of the data request message.

The establishing of a communication channel between the printing apparatus and the control apparatus may denote establishing a duplex asynchronous communication channel A detailed description of the channel may be understood as being similar to that described above.

The establishing of a websocket communication channel may be initiated by the control apparatus transmitting a websocket handshake message to the printing apparatus. In this case, the printing apparatus may serve as a websocket server, and the control apparatus may serve as a websocket client.

The establishing of a websocket communication channel may be initiated by the printing apparatus transmitting a websocket handshake message to the control apparatus. In this case, the control apparatus may serve as a websocket server, and the printing apparatus may serve as a websocket client.

The printing apparatus transmitting a data request message to the control apparatus may comprises that the printing apparatus transmitting the data request message through the websocket communication channel A general description of the data request message may be understood as being similar to that described above.

The data request message may include identification information of the printing apparatus. The data request message may be a request for control data for controlling operation of the printing apparatus. The data request message may be a message that requests print data for controlling a printing operation of the printing apparatus.

The printing apparatus may receive a notification message indicating that data to be provided to the printing apparatus is acquired from the control apparatus and may transmit the data request message to the control apparatus on the basis of the notification message. The transmitting of the data request message may be performed in consideration of a state of the printing apparatus.

The notification message may be transmitted with a state data request message regarding the printing apparatus. The printing apparatus may transmit both of the data request message and state data to the control apparatus in response to a message originating from the control apparatus. It is possible to realize efficient data communication by simultaneously performing a data request and a data transmission, as described above.

The control apparatus transmitting the data may denote that the control apparatus transmits the data through the websocket channel. A general description of the transmitting of the data on the basis of the data request message may be understood as being similar to that described above.

The transmitting of the data on the basis of the data request message may be performed in consideration of identification information of the printing apparatus, a state of the printing apparatus, etc. The data may be print data for controlling a printing operation of the printing apparatus. The print data may include control information associated with the printing operation such as printed content, a printed paper, a printing environment, a printing time, etc. The transmitted data may be provided in a format understandable by the printing apparatus.

The data management method according to an embodiment of the present disclosure may include establishing a communication channel between the printing apparatus and the control apparatus, transmitting, by the control apparatus, a data request message to the printing apparatus, and transmitting, by the printing apparatus, data to the control apparatus on the basis of the data request message. In this embodiment, the establishing of a communication channel may be understood as being similar to those described in the above embodiments.

The control apparatus may transmit the data request message to the printing apparatus through the websocket channel A general description of the transmitting of a data request message may be understood as being similar to that described above.

The data request message transmitted to the printing apparatus by the control apparatus may be a message that requests state information of the printing apparatus. The data request message may be a message that requests information regarding whether to perform a printing operation of the printing apparatus or information regarding a result of performing the printing operation of the printing apparatus.

The control apparatus transmitting the data request message to the printing apparatus may denote that the control apparatus receives a notification message indicating that data to be provided to the control apparatus is acquired from the printing apparatus and transmits the data request message to the printing apparatus in response to the notification message.

When the printing apparatus transmits the notification message to the control apparatus, the printing apparatus may also transmit a control data request message. In this case, the control apparatus may transmit both of the data request message and the control data to the printing apparatus in response to the message.

The data request message may be transmitted from the control apparatus to the printing apparatus directly or via a separate server apparatus.

The printing apparatus may transmit data to the control apparatus through the websocket channel.

The data transmitted from the printing apparatus to the control apparatus may include state information of the printing apparatus. The data may include information regarding a printing operation status or a printing operation result of the printing apparatus. The transmitted data may be provided in a format understandable by the printing apparatus. The transmitted data may be provided in a format understandable by the control apparatus.

The data may be transmitted from the printing apparatus to the control apparatus directly or via a separate server apparatus.

3.2.2.2 Second System

A data management method according to an embodiment of the present disclosure may be performed by the above-described second system. That is, the data management method may be implemented by a system including a printing apparatus, a control apparatus, and a peripheral apparatus. The peripheral apparatus may be a secondary printing apparatus.

The data management method according to an embodiment of the present disclosure may include establishing a communication channel between the printing apparatus and the control apparatus, transmitting, by the printing apparatus, a data request message to the control apparatus, transmitting, by the control apparatus, data to the printing apparatus, and transmitting, by the printing apparatus, data to the peripheral apparatus.

The establishing of a communication channel between the printing apparatus and the control apparatus, the transmitting, by the printing apparatus, of a data request message to the control apparatus, and the transmitting, by the control apparatus, of data to the printing apparatus may be understood as being similar to those described above for the first system.

The printing apparatus transmitting a data request message to the control apparatus may denote that the printing apparatus receives a notification message indicating that control data for the peripheral apparatus is acquired from the control apparatus and then transmits the data request message in response to the notification message.

The notification message may be transmitted with a message that requests state data of the peripheral apparatus. In this case, the printing apparatus may transmit both of a message that requests control data of the peripheral apparatus and the state data to the control apparatus in response to the message.

The data request message transmitted from the printing apparatus to the control apparatus may include identification information of the peripheral apparatus. The data request message may include identification information of the secondary printing apparatus.

The data transmitted from the control apparatus to the printing apparatus may be data for controlling the peripheral apparatus. The data may be data for controlling the secondary printing apparatus.

The data management method according to an embodiment of the present disclosure may include establishing a communication channel between the printing apparatus and the control apparatus, transmitting, by the control apparatus, a data request message to the printing apparatus, and transmitting, by the printing apparatus, data to the control apparatus.

The establishing of a communication channel between the printing apparatus and the control apparatus, the transmitting, by the control apparatus, of a data request message to the printing apparatus, and the transmitting, by the printing apparatus, of data to the control apparatus may be mostly understood as being similar to those described above for the first system.

The transmitting, by the printing apparatus, of data to the control apparatus may include the printing apparatus acquiring data from the peripheral apparatus connected thereto and transmitting the acquired data to the control apparatus.

The data request message transmitted from the control apparatus to the printing apparatus may be a message that requests state data of the peripheral apparatus. The data request message may be a message that requests state data of the secondary printing apparatus.

The data transmitted from the printing apparatus to the control apparatus may be state data of the peripheral apparatus. The data may be state data of the secondary printing apparatus. The state data may be operation state information, network connection state information, operation availability information, etc. of the peripheral apparatus or the secondary printing apparatus.

Operation of the printing apparatus, the control apparatus, and the peripheral apparatus will be described below in detail.

3.2.3 Operation of Each Apparatus

3.2.3.1 Control Apparatus

The data management method according to an embodiment of the present disclosure may be performed by a control apparatus. The data management method of the control apparatus according to an embodiment of the present disclosure may include establishing a communication channel with an external apparatus, transmitting a data request message to the external apparatus, and receiving data from the external apparatus.

The control apparatus may be understood as being implemented similarly to the external control apparatuses of the above-described first and second systems, unless specially stated otherwise.

A detailed description of the control apparatus establishing a communication channel with the external apparatus may be understood as being similar to that described above for the first printing process. The control apparatus establishing a communication channel with the external apparatus may denote that the control apparatus establishes a websocket communication channel. The establishing of a websocket communication channel may be initiated by the control apparatus transmitting a handshake message to the external apparatus. In this case, the control apparatus may function as a websocket client. The establishing of a websocket communication channel may be initiated by the control apparatus receiving a handshake message from the external apparatus. In this case, the control apparatus may function as a websocket server.

The control apparatus transmitting a data request message to the external apparatus may denote that the control apparatus transmits the data request message through the websocket communication channel. A detailed description of the data request message may be understood as being similar to that described above.

The control apparatus transmitting a data request message to the external apparatus may denote that the control apparatus receives a data acquisition notification message from the external apparatus and transmits the data request message in response to the data acquisition notification message. The transmitting of a data request message may denote transmitting the data request message in consideration of a state of the control apparatus. The transmitting of a data request message may denote transmitting a message that requests state information of a peripheral apparatus connected to the external apparatus. However, the present disclosure is not limited thereto, and the control apparatus may transmit the data request message to the external apparatus without receiving the data acquisition notification message.

For example, the control apparatus transmitting a data request message to the external apparatus may denote that the control apparatus transmits a message that requests state data of the printing apparatus or the peripheral apparatus to the printing apparatus. The transmitting of a data request message may denote receiving a notification message indicating that state data of the printing apparatus or the peripheral apparatus is acquired from the printing apparatus and transmitting the data request message in response to the notification message.

The receiving of data from the external apparatus may denote receiving data transmitted on the basis of the data request message from the external apparatus. The data may be state data of the external apparatus transmitted on the basis of the message that requests state data.

The state data may include state information of the printing apparatus or state information of the peripheral apparatus connected to the printing apparatus. The state data may include connection information, available information, network connection information, operation performing information, etc. of the printing apparatus or the peripheral apparatus.

The data management method of the control apparatus according to an embodiment of the present disclosure may include establishing a communication channel with an external apparatus, receiving a data request message from the external apparatus, and transmitting data to the external apparatus.

A detailed description of the establishing of a communication channel may be understood as being similar to those described in the above embodiments.

The control apparatus acquiring a data request message from the external apparatus may denote that the control apparatus receives the data request message through the websocket communication channel A detailed description of the data request message may be understood as being similar to that described above.

The data management method according to this embodiment may further include acquiring, by the control apparatus, control data for controlling the external apparatus and transmitting, by the control apparatus, an acquisition notification message of the control data to the external apparatus before the receiving, by the control apparatus, of the data request message.

The control apparatus acquiring a data request message from the external apparatus may denote that the control apparatus transmits a data acquisition notification message to the external apparatus and acquires the data request message in response to the data acquisition notification message. However, the present disclosure is not limited thereto, and the control apparatus may acquire the data request message without transmitting the data acquisition notification message.

The data request message may be a control data request message for requesting a control data to control the external apparatus or a peripheral apparatus connected to the external apparatus. The data request message may include identification information of the external apparatus, operation state information of the external apparatus, etc.

For example, the data request message may be a control data request message for requesting a control data to control a controlling operation of the printing apparatus. The control apparatus acquiring the control data request message from the printing apparatus may denote acquiring control data to be transmitted to the printing apparatus, transmitting a control data acquisition notification message to the printing apparatus, and acquiring the control data request message in response to the control data acquisition notification message.

As another example, the data request message may be a control data request message of controlling operation of the peripheral apparatus. The control apparatus acquiring a peripheral apparatus control data request message from the printing apparatus may denote that the control apparatus acquires peripheral apparatus control data, transmits a peripheral apparatus control data acquisition notification message to the printing apparatus, and acquires the peripheral apparatus control data request message in response to the peripheral apparatus control data acquisition notification message.

The control data request message may include identification information of the printing apparatus, identification information of peripheral apparatus connected to the printing apparatus, identification information of the secondary printing apparatus, operation state information of the printing apparatus, operation state information of the peripheral apparatus, etc.

The control data may include control information for controlling the printing apparatus or the peripheral apparatus. The control data may include print data for controlling a printing operation of the printing apparatus or the secondary printing apparatus. The control data may control the peripheral apparatus or the like to acquire an external input.

The control apparatus transmitting data to the external apparatus may denote that the control apparatus transmits the data on the basis of the data request message acquired from the external apparatus. The transmitting of the data on the basis of the data request message may be performed in consideration of state information of the external apparatus, identification information of the external apparatus, etc., which are included in the data request message. For example, when the external apparatus is in a state capable of receiving an external input, the control apparatus may transmit control data for controlling the external apparatus to receive the external input to the external apparatus.

More specifically, the transmitting of the data may denote transmitting the control data on the basis of the control data request message acquired from the printing apparatus. The transmitting of the control data on the basis of the control data request message may be performed in consideration of identification information of the printing apparatus, identification information of a peripheral apparatus, for example, a secondary printing apparatus connected to the printing apparatus, operation state information of the printing apparatus, operation state information of the peripheral apparatus, etc. which are included in the control data request message.

For example, when the printing apparatus is in a state capable of performing the printing operation, the control apparatus may transmit control data indicating the printing operation to the printing apparatus. As another example, the control apparatus may transmit control data indicating an appropriate printing operation to the printing apparatus in consideration of the identification information of the printing apparatus or the secondary printing apparatus.

Like the above-described external control apparatus, the control apparatus may include a communication unit, a control unit, and an input reception unit.

The control apparatus may transmit a data request message to the printing apparatus by means of the communication unit. The control apparatus may receive the data request message from the printing apparatus by means of the communication unit.

The control apparatus may transmit a data acquisition notification message to the printing apparatus by means of the communication unit. The control apparatus may acquire the data acquisition notification message from the printing apparatus by means of the communication unit.

The control unit may perform the above-described data management by means of the input reception unit, the communication unit, the control unit, etc.

The control unit may establish a communication channel with an external apparatus by means of the communication unit, transmit a data request message to the external apparatus, and receive data from the external apparatus. The control unit may establish a communication channel with an external apparatus by means of the communication unit, receive a data request message from the external apparatus, and transmit data to the external apparatus.

The data management method of the control unit may be similar to that described above.

3.2.3.2 Printing Apparatus

The data management method according to an embodiment of the present disclosure may be performed by a printing apparatus. The data management method of the printing apparatus according to an embodiment of the present disclosure may include establishing a communication channel with an external apparatus, transmitting a data request message to the external apparatus, and receiving data from the external apparatus.

The printing apparatus may receive data from the external apparatus and may perform a printing operation or process the data. In a POS system, the printing apparatus may be a POS printer configured to receive information from a POS host and perform the printing operation. The external apparatus may be a peripheral apparatus connected to the printing apparatus. The external apparatus may be a secondary printing apparatus connected to the printing apparatus.

The printing apparatus may be a hub printing apparatus to which at least one peripheral apparatus is connected. The peripheral apparatus may be a secondary printing apparatus. The hub printing apparatus may acquire control data from an external apparatus and transfer the acquired control data to the peripheral apparatus. The hub printing apparatus may transmit data to the peripheral apparatus or perform the printing operation.

The printing apparatus establishing a communication channel with an external control apparatus may be understood as being similar to those described in the above described embodiments. The printing apparatus may establish a websocket communication channel with the external control apparatus.

The printing apparatus transmitting a data request message to the external control apparatus may denote that the printing apparatus transmits the data request message through the websocket channel. A detailed description of the data request message may be understood as being similar to that described above.

The printing apparatus transmitting a data request message to the external control apparatus may denote that the printing apparatus receives a data acquisition notification message from the external control apparatus and transmits the data request message in response to the data acquisition notification message. The printing apparatus may transmit a data request message to the external control apparatus in consideration of a state of the printing apparatus or a peripheral apparatus connected to the printing apparatus.

For example, the data request message transmitted to the external control apparatus by the printing apparatus may be a message that requests print data for controlling a printing operation of the printing apparatus. The printing apparatus transmitting a data request message may denote receiving a print data acquisition notification message from the external control apparatus and transmitting a print data request message in response to the print data acquisition notification message.

As another example, the data request message transmitted to the external control apparatus by the printing apparatus may be a message that requests control data for controlling operation of the peripheral apparatus connected to the printing apparatus. The printing apparatus transmitting a peripheral apparatus control data request message may denote that the printing apparatus receives an acquisition notification message of data for controlling the peripheral apparatus from the external control apparatus and transmits the peripheral apparatus control data request message in response to the acquisition notification message. The control data request message and the control data may be understood as being similar to those described in the above embodiments.

The printing apparatus receiving the data may denote that the printing apparatus receives the data transmitted on the basis of the data request message. The data may be control data for controlling the printing apparatus or a peripheral apparatus connected to the printing apparatus according to the control data request message.

The printing apparatus may be a hub printing apparatus. When the printing apparatus is a hub printing apparatus, the data request message may be a message that requests the control data for controlling the peripheral apparatus. The data may be the control data for controlling the peripheral apparatus.

A data management method of the printing apparatus according to another embodiment of the present disclosure may include establishing a communication channel with an external apparatus, acquiring a data request message from the external apparatus, and transmitting data to the external apparatus. The external apparatus may be an external control apparatus. For example, the external control apparatus may be a POS host.

The printing apparatus establishing a communication channel with an external control apparatus may be understood as being similar to those described in the above described embodiments.

The printing apparatus acquiring a data request message from the external control apparatus may be understood as being similar to those described in the above described embodiments.

The printing apparatus acquiring a data request message from the external control apparatus may denote that the printing apparatus transmits a data acquisition notification message to the external control apparatus and acquires the data request message in response to the data acquisition notification message. The printing apparatus transmitting a data acquisition notification message to the external control apparatus may denote that printing apparatus transmits a state data acquisition notification message to the external control apparatus when the printing apparatus acquires state data of the print data or a peripheral apparatus connected to the printing apparatus.

For example, the printing apparatus acquiring a data request message from the external control apparatus may denote that the printing apparatus acquires state data of the printing apparatus or a peripheral apparatus connected to the printing apparatus, transmits the state data acquisition notification message to the external control apparatus, and receives the state data request message from the external control apparatus in response to the state data acquisition notification message.

Detailed descriptions of the state data and the state data request message may be understood as being similar to those described in the above embodiments.

The printing apparatus transmitting data to the external control apparatus may denote that the printing apparatus transmits the data on the basis of the data request message. The transmitting of the data on the basis of the data request message may denote transmitting the data in consideration of state information of the printing apparatus or a peripheral apparatus connected to the printing apparatus. The transmitting of the data on the basis of the data request message may be performed in consideration of state information of an apparatus indicated by the data request message, external input information acquired from the peripheral apparatus or the like.

The printing apparatus may be a hub printing apparatus. When the printing apparatus is a hub printing apparatus, the hub printing apparatus may acquire a data request message from the external control apparatus and transmit peripheral apparatus data to the external control apparatus. More specifically, the hub printing apparatus may acquire peripheral apparatus data from the peripheral apparatus, identify the peripheral apparatus data according to the data request message, and transmit the identified peripheral apparatus data to the external control apparatus.

When the printing apparatus is a hub printing apparatus, the data request message may be a message that requests state information of the peripheral apparatus. The data request message may be a message that requests information that is received by the peripheral apparatus.

When the printing apparatus is a hub printing apparatus, the data is data acquired from the peripheral apparatus and may be peripheral apparatus state data, peripheral apparatus input data, or the like.

The printing apparatus may include a communication unit, a control unit, a memory unit, and a printing unit.

The communication unit may establish a communication channel with an external apparatus and perform data communication. The printing apparatus may transmit a data request message to the control apparatus by means of the communication unit. The printing apparatus may receive a data request message from the control apparatus by means of the communication unit.

The printing apparatus may transmit a data acquisition notification message to the control apparatus by means of the communication unit. The printing apparatus may acquire a data acquisition notification message from the control apparatus by means of the communication unit.

The printing apparatus may perform the printing operation by means of the printing unit. The printing apparatus may perform a printing operation by means of the printing unit on the basis of the acquired print data. In this case, the print data may be generated by the external apparatus and written in a format interpretable by the printing apparatus. The print data may be provided in a format processable by the printing apparatus.

The control unit may perform the above-described data management by means of the communication unit, the control unit, the memory unit, the printing unit, etc.

The control unit may establish a communication channel with an external apparatus by means of the communication unit, transmit a data request message to the external apparatus, and receive data from the external apparatus. The control unit may establish the communication channel with the external apparatus by means of the communication unit, acquire a data request message from the external apparatus, and transmit data to the external apparatus.

The data management method of the control unit may be similar to that described above.

For example, the control unit may control the communication unit to establish a websocket communication channel with the external apparatus, request the print data for printing to the external apparatus through the websocket communication channel by means of the communication unit, acquire the print data from the external apparatus through the websocket communication channel in response to the requesting the print data by means of the communication unit, and perform a printing operation on the basis of the acquired print data by means of the printing unit.

The control unit transmitting the data request message may denote that the control unit acquires an event for requesting state information of the printing apparatus from the external apparatus by means of the communication unit and transmits a data request message including the state information of the printing apparatus in response to the event for requesting state information.

The control unit may establish a second websocket communication channel with the external apparatus by means of the communication unit and acquire control data other than the print data as data for controlling a state of the printing apparatus through the second websocket communication channel.

3.2.3.3 Peripheral Apparatus

The data management method according to an embodiment of the present disclosure may be performed by a peripheral apparatus. The data management method according to an embodiment of the present disclosure may include transmitting, by the peripheral apparatus, a data request message to an external apparatus and acquiring, by the peripheral apparatus, data from the external apparatus.

The peripheral apparatus may receive control data from the external apparatus and perform operation on the basis of the control data. The peripheral apparatus may acquire state information and transmit the acquired state information to the external apparatus. The peripheral apparatus may acquire an external input.

In the above-described POS system, the peripheral apparatus may be a peripheral apparatus connected to the POS system. The peripheral apparatus may include a barcode reader, a card reader, a microphone, a signature pad, etc.

The peripheral apparatus transmitting a data request message may denote that the peripheral apparatus receives a data acquisition notification message from the external apparatus and transmits the data request message in response to the data acquisition notification message. The acquiring of an acquisition notification message of the control data may denote acquiring the acquisition notification message of the control data generated by the external control apparatus via a hub apparatus for relaying data (e.g., a hub printing apparatus).

The peripheral apparatus acquiring data from the external apparatus may denote that the peripheral apparatus acquires the control data. The peripheral apparatus acquiring data from the external apparatus may denote that the peripheral apparatus acquires the data via the printing apparatus from an external control apparatus connected to the printing apparatus through a communication channel. The acquiring of data from the external apparatus may denote that the peripheral apparatus transmits a data request message including identification information of the peripheral apparatus to the printing apparatus and receives control data allocated to the peripheral apparatus in response to the data request message.

A data management method of the peripheral apparatus according to an embodiment of the present disclosure may include receiving a data request message from an external apparatus and transmitting data to the external apparatus on the basis of the data request message.

The peripheral apparatus receiving a data request message from the external apparatus may denote that the peripheral apparatus transmits a data acquisition notification message to the external apparatus and receives a data request message transmitted in response to the data acquisition notification message. The peripheral apparatus may transmit the data acquisition notification message through a hub apparatus for relaying the data.

The peripheral apparatus transmitting data to the external apparatus may denote that the peripheral apparatus transmits state data of the peripheral apparatus to the external apparatus. The transmitting of state data may denote determining a requested state item on the basis of the data request message received from the external apparatus, acquiring state information of the determined item, and transmitting the state information to the external apparatus. The peripheral apparatus may transmit data to the external apparatus through the hub apparatus for relaying data.

The data management method according to this embodiment may further include acquiring, by the peripheral apparatus, state data before the receiving, by the peripheral apparatus, of a data request message. The state data may include operational status data, operation progress data indicating a completion rate of the operation or the like of the peripheral apparatus.

The data management method may further include transmitting, by the peripheral apparatus, a state data acquisition notification message to the external apparatus on the basis of the acquired state data before the receiving, by the peripheral apparatus, of a data request message. In this case, the acquiring of the data request message may denote acquiring a state data request message transmitted in response to the state data acquisition notification message.

The external apparatus may be a printing apparatus (i.e., a hub printing apparatus). The printing apparatus may provide control data to the peripheral apparatus. The printing apparatus may transfer control data acquired from the outside to the peripheral apparatus.

The peripheral apparatus may have a communication unit to communicate with the external apparatus. The peripheral apparatus may have a control unit to acquire data from the external apparatus, process the data, and control operation of the peripheral apparatus.

The peripheral apparatus may have a touch input unit to acquire a touch input. The peripheral apparatus may have a voice recognition unit to acquire a voice signal. The peripheral apparatus may have an image acquisition unit to capture an image. The peripheral apparatus may transfer the obtained data to the hub printing apparatus.

The peripheral apparatus may have a control unit. The control unit may transmit the data request message to the external apparatus by means of the communication unit and acquire data from the external apparatus. The control unit may acquire a data request message from the external apparatus by means of the communication unit and transmit data to the external apparatus.

The peripheral apparatus may have a barcode recognition module. The peripheral apparatus may have a voice recognition module. The peripheral apparatus may have a camera module. The peripheral apparatus may have a touch input module. The peripheral apparatus may have an image output module. The peripheral apparatus may have a card information acquisition module. The peripheral apparatus may transfer the data obtained by means of above-mentioned modules to the hub printing apparatus.

3.2.3.4 Secondary Printing Apparatus

The data management method according to an embodiment of the present disclosure may be performed by a secondary printing apparatus. The data management method according to an embodiment of the present disclosure may include transmitting, by the secondary printing apparatus, a data request message to an external apparatus and acquiring, by the secondary printing apparatus, data from the external apparatus.

The secondary printing apparatus transmitting a data request message may denote that the secondary printing apparatus receives a data acquisition message from the external apparatus and transmits the data request message in response to the data acquisition message. For example, the secondary printing apparatus transmitting a data request message may denote that the secondary printing apparatus acquires an acquisition notification message of print data for controlling the secondary printing apparatus from the external apparatus and transmits the data request message in response to the acquisition notification message. The acquiring of an acquisition notification message of the print data may denote acquiring the acquisition notification message of the print data generated by the external control apparatus.

The secondary printing apparatus acquiring data from the external apparatus may denote that the secondary printing apparatus acquires printing control data from the external apparatus. The peripheral apparatus acquiring data from the external apparatus may denote that the peripheral apparatus acquires data generated by the control apparatus via the external apparatus from a control apparatus connected to the external apparatus through a communication channel. The acquiring of data from the external apparatus may denote that the secondary printing apparatus transmits a data request message including identification information of the secondary printing apparatus to the external apparatus or the control apparatus and receives printing control data allocated to the secondary printing apparatus in response to the data request message.

The data management method according to an embodiment of the present disclosure may include receiving, by the secondary printing apparatus, a data request message from an external apparatus and transmitting, by the secondary printing apparatus, data to the external apparatus.

The secondary printing apparatus receiving a data request message from the external apparatus may denote that the peripheral apparatus transmits a state data acquisition notification message to the external apparatus and receives a state data request message transmitted in response to the state data acquisition notification message. The secondary printing apparatus may receive a data acquisition notification message from the external apparatus through a hub apparatus for relaying data.

The secondary printing apparatus transmitting data to the external apparatus may denote that the secondary printing apparatus transmits state data of the secondary printing apparatus to the external apparatus. The transmitting of state data may denote determining a requested state item on the basis of the data request message, acquiring state information of the determined item, and transmitting the state information to the external apparatus. The secondary printing apparatus may transmit data to the external apparatus through the hub apparatus.

The data management method according to this embodiment may further include acquiring, by the peripheral apparatus, state data before the receiving, by the peripheral apparatus, of a data request message. The state data may include operational status data or the like of the peripheral apparatus.

The data management method may further include transmitting, by the peripheral apparatus, a state data acquisition notification message to the external apparatus on the basis of the acquired state data before the receiving, by the peripheral apparatus, of a data request message. In this case, the acquiring of the data request message may denote acquiring a state data request message transmitted in response to the state data acquisition notification message.

The external apparatus may be a printing apparatus (i.e., a hub printing apparatus). The printing apparatus may provide control data to the peripheral apparatus. The printing apparatus may transfer control data acquired from the outside to the peripheral apparatus.

The secondary printing apparatus may receive printing control data from the external apparatus and perform a printing operation on the basis of the data. The secondary printing apparatus may acquire state data and transmit the acquired state data to the external apparatus.

The secondary printing apparatus may have a communication unit to communicate with the external apparatus. The secondary printing apparatus may have a printing unit to perform the printing operation.

The secondary printing apparatus may have a control unit. The control unit may transmit the data request message to the external apparatus by means of the communication unit and acquire data from the external apparatus. The control unit may acquire a data request message from the external apparatus by means of the communication unit and transmit data to the external apparatus.

3.2.4 EMBODIMENTS

3.2.4.1 First Embodiment

Figure 8:
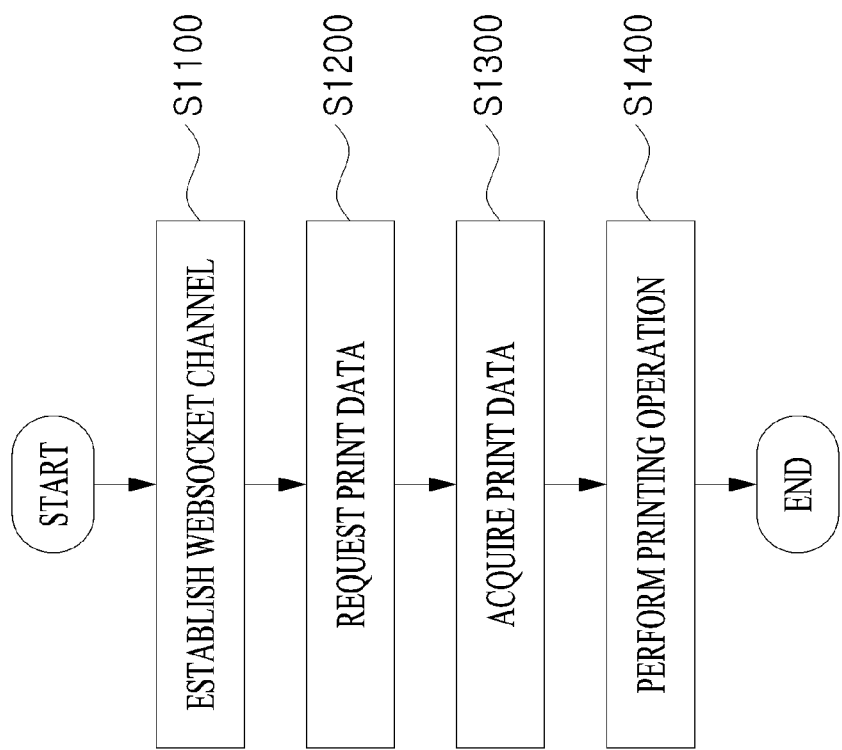
FIG. 8 shows a flowchart illustrating a printing method according to an embodiment of the present disclosure.

FIG. 8 shows a flowchart illustrating a printing method according to an embodiment of the present disclosure. Referring to FIG. 8, the printing method performed by a printing apparatus according to an embodiment of the present disclosure includes establishing a websocket channel (S1100), requesting print data (S1200), acquiring, the print data (S1300), and performing a printing operation (S1400).

The printing apparatus establishing a websocket channel (S1100) may denote that the printing apparatus transmits a handshake message for establishing the websocket channel to an external apparatus and establishes the websocket channel for communicating with the external apparatus in response to transmitting the message.

The printing apparatus requesting print data (S1200) may denote that the printing apparatus requests print data for printing to the external apparatus through the websocket channel.

The printing apparatus requesting the print data from the external apparatus may denote that the printing apparatus requests the print data through the websocket channel. Alternatively, the printing apparatus requesting the print data from the external apparatus may denote that the printing apparatus requests the print data through a data request websocket channel other than the websocket channel.

The printing apparatus requesting print data (S1200) may denote that the printing apparatus transmits state information of the printing apparatus in response to the external apparatus requesting the state information and requests the print data.

In this case, the requesting of print data may include transmitting state information of the printing apparatus, and the state information may indicate whether the printing apparatus can perform the printing operation. The state information may indicate whether it is possible for the printing apparatus to perform the printing operation. The state information indicates status information for at least one requirement for performing a printing operation.

The printing apparatus acquiring the print data (S1300) may denote that the printing apparatus acquires the print data from the external apparatus through the websocket channel in response to the printing apparatus requesting the print data.

The printing apparatus performing a printing operation (S1400) may denote that the printing apparatus performs the printing operation on the basis of the acquired print data.

The print data may be generated by the external apparatus and written in a format processable by the printing apparatus. The format processable by the printing apparatus may refer to a format that is processable by the printing apparatus without a format conversion procedure. The format processable by the printing apparatus may refer to a command format specific to the printing apparatus to control the printing apparatus.

3.2.4.2 Second Embodiment

Figure 9:
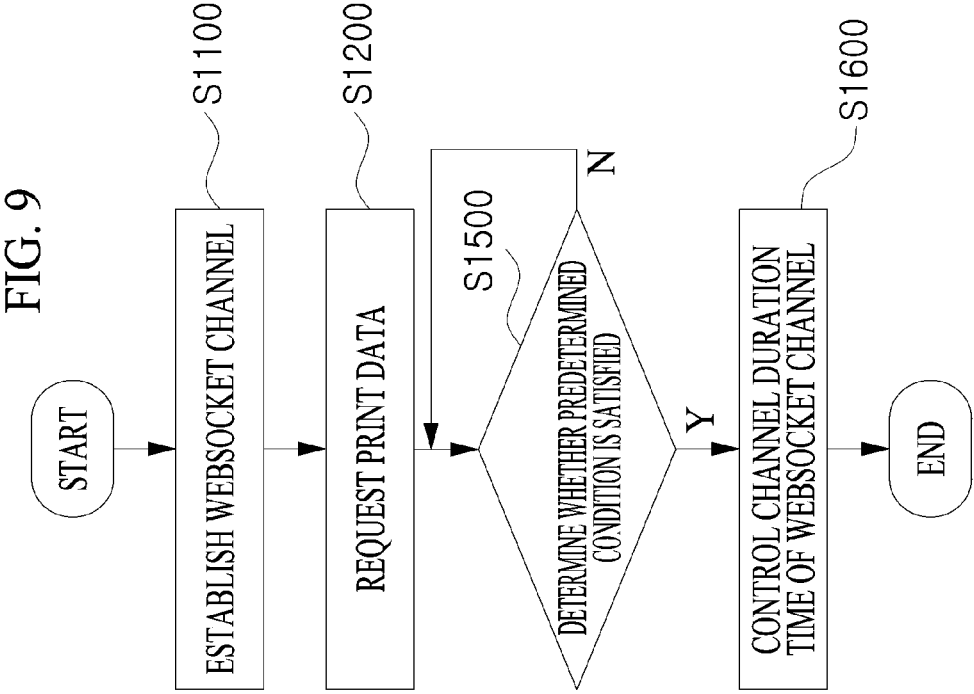
FIG. 9 shows a flowchart illustrating a management method for a websocket communication channel according to an embodiment of the present disclosure.

FIG. 9 shows a flowchart illustrating a management method for a websocket communication channel according to an embodiment of the present disclosure. Referring to FIG. 9, the management method, performed by a printing apparatus, for a websocket communication channel according to an embodiment of the present disclosure includes establishing a websocket channel (S1100), requesting print data (S1200), determining whether a predetermined condition is satisfied (S1500), and controlling a channel duration time of the websocket channel (S1600).

The establishing of a websocket channel (S1100) and the requesting print data (S1200) may be performed similarly to those described above with reference to FIG. 8.

The determining of whether a predetermined condition is satisfied (S1500) may denote that the printing apparatus determines that a predetermined condition associated with the acquisition of the print data is satisfied in response to the printing apparatus requesting the print data.

The determining of whether a predetermined condition is satisfied may include determining whether the print data requested to be transmitted is received from the external apparatus. The determining of whether a predetermined condition is satisfied may include determining whether a predetermined time period has elapsed after the print data is requested and may further include determining whether the print data is received.

The controlling of a channel duration time of the websocket channel (S1600) may denote that the printing apparatus controls the channel duration time of the websocket channel when the predetermined condition is satisfied.

The controlling of a channel duration time of the websocket channel (S1600) may denote interrupting the websocket communication channel within a predetermined time period after the predetermined condition is satisfied.

Figure 10:
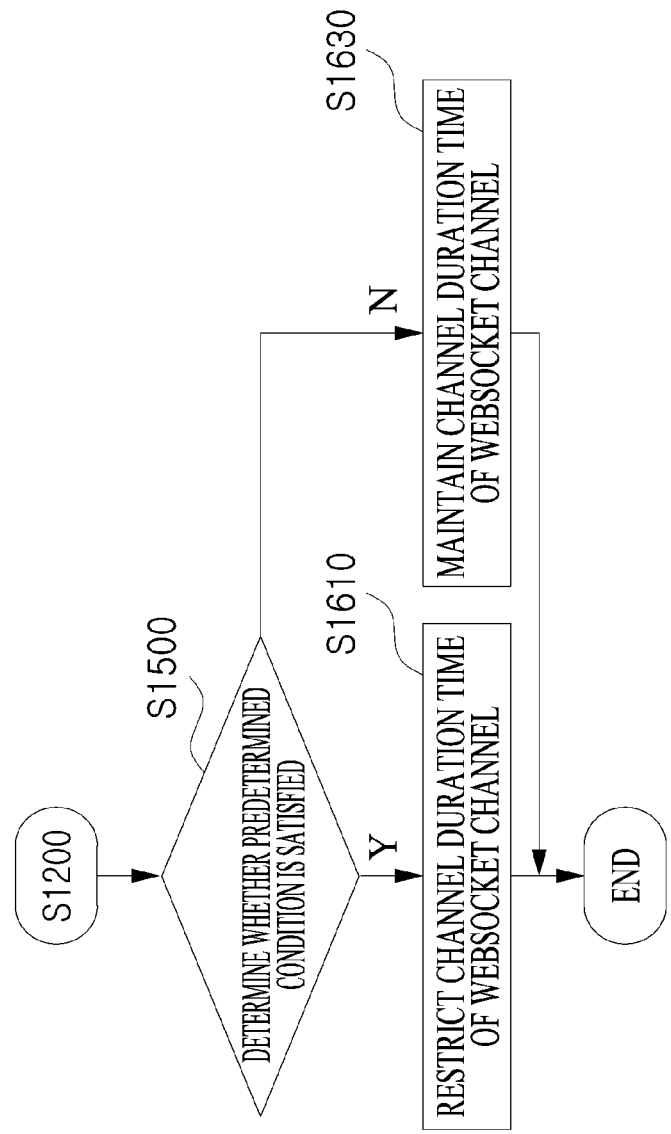
FIG. 10 is a flowchart showing an operation of controlling a channel duration time of a websocket channel in a management method for a websocket communication channel in detail according to an embodiment of the present disclosure.

FIG. 10 is a flowchart showing an operation of controlling a channel duration time of a websocket channel in a management method for a websocket communication channel in detail according to an embodiment of the present disclosure.

When the predetermined condition is satisfied in the management method for a websocket communication channel according to an embodiment of the present disclosure, the printing apparatus controlling a channel duration time of the websocket channel (S1600) may denote that the printing apparatus limits the channel duration time of the websocket channel when the predetermined condition is satisfied (S1610). When the predetermined condition is not satisfied, the websocket channel may remain established (S1620).

3.2.4.3 Third Embodiment

A management method for a websocket communication channel according to an embodiment of the present disclosure may include establishing, by a printing apparatus, a websocket channel for communicating with an external apparatus and requesting, by the printing apparatus, print data for printing to the external apparatus through the websocket channel. In this case, the websocket channel may have a channel duration time controllable by the external apparatus. The external apparatus may be implemented to determine whether a predetermined condition associated with an acquisition of the print data is satisfied in response to receiving a request for the print data and control the channel duration time depending on whether the predetermined condition is satisfied.

In other words, the management method for the websocket communication channel according to an embodiment of the present disclosure may include establishing, by an electronic apparatus, a websocket channel for communicating with a printing apparatus, determining, by the electronic apparatus, whether a predetermined condition associated with the request for print data for performing a printing operation is satisfied when the print data is requested by the printing apparatus through the websocket channel, and controlling, by the electronic apparatus, a channel duration time of the websocket channel when the predetermined condition is satisfied.

3.2.4.4 Fourth Embodiment

A data management method according to an embodiment of the present disclosure may be implemented by a system including a control apparatus, a hub printing apparatus, and a peripheral apparatus wired to the hub printing apparatus. In particular, a case in which the peripheral apparatus is a secondary printing apparatus and data management is performed by the printing apparatus will be described below.

The data management method of the hub printing apparatus according to this embodiment includes connecting to the secondary printing apparatus, establishing a websocket channel for communicating with the control apparatus, acquiring a header from the control apparatus, requesting state information from the secondary printing apparatus, acquiring the state information and a print data request message from the secondary printing apparatus, transmitting a data request message to the control apparatus on the basis of the print data request message, acquiring print data from the control apparatus, and transferring the print data to the secondary printing apparatus.

When the hub printing apparatus connects to the secondary printing apparatus, the hub printing apparatus may perform the connection by transmitting a message indicating that the connection of the hub printing apparatus is complete to the secondary printing apparatus and acquiring an ACK message from the secondary printing apparatus. This may be a process of enabling the secondary printing apparatus to recognize that the secondary printing apparatus is connected to the hub printing apparatus.

The printing apparatus acquiring a header from the control apparatus may denote that the printing apparatus acquires the header in response to requesting an operation command from the control apparatus.

The state information requested from the secondary printing apparatus by the hub printing apparatus is intended to check whether the secondary printing apparatus can perform a printing operation. In other words, the state information may include information to be considered to transmit the print data to the secondary printing apparatus. For example, the state information may include information regarding whether there is an operation that is currently performed by the secondary printing apparatus, information regarding whether a printing environment is established, and information regarding when an operation being performed will be complete. When the secondary printing apparatus satisfies a condition to perform the printing operation or has a state capable of performing the printing operation, the secondary printing apparatus may transfer a purpose for requesting the state information and the print data to the hub printing apparatus.

Messages for requesting the state information and the print data transmitted from the secondary printing apparatus to the hub printing apparatus may be transmitted as independent data or may be consecutively transmitted together in one unit data (e.g., data packet) that is transmitted.

The data management method of the printing apparatus according to the above embodiment may further include requesting state information from the secondary printing apparatus, acquiring state information of the secondary printing apparatus from the secondary printing apparatus in response to the request for the state information, and transferring the acquired state information to the control apparatus.

The data management method according to this embodiment may further include closing the websocket channel after transferring the state information to the control apparatus or transferring the print data to the secondary printing apparatus. The closing of the websocket channel may be intended to prevent inefficiency caused by maintaining the channel even when a purpose of establishing the channel is accomplished.

The above-described data management method may be understood as performing a printing operation using the secondary printing apparatus. When the websocket channel is closed as described above while the printing operation is performed using the secondary printing apparatus, the above-described operations may be repeatedly performed to perform the printing operation using the secondary printing apparatus again.

A data management method implemented by a system including the control apparatus, the hub printing apparatus, and the secondary printing apparatus connected to the hub printing apparatus, which have been described above, may be similarly implemented even when the secondary printing apparatus is networked to the hub printing apparatus.

When the secondary printing apparatus is networked to the hub printing apparatus, the data management method according to the above embodiment may further include checking establishment of a network port with the secondary printing apparatus and acquiring an ACK message for the establishment of the network port from the secondary printing apparatus after a print data request message is acquired.

3.3 Control of Channel Duration Time

When the printing method or the like according to the present disclosure is performed, data communication may be performed using the above-described websocket communication channel. In this case, the handling of the communication channel when data is transmitted using the websocket communication channel or when there is no data to be transmitted will be described below.

3.3.1 Control Process for Channel Duration Time

In a case in which data is transmitted through a communication channel in the printing method or the like according to the present disclosure, there is an issue about the handling of the communication channel after the data is transmitted. In this regard, for the above-described duplex asynchronous communication channel, for example, a websocket channel, it is common for data to be transmitted at any time and for the communication channel to remain established even after the data transmission. In this case, the maintenance of the communication channel even when no data is moved may cause waste of resources.

It is possible to efficiently operate the communication channel by controlling an interruption time point of the communication channel. In particular, when data having a relatively low need for continuous communication data is handled, it may be efficient for a communication channel to be closed after the data is transmitted and re-established when data to be transmitted is generated. To this end, the interruption time point of the communication channel may be appropriately determined. The interruption time point of the communication channel may refer to a time point at which the communication channel is closed or a time point at which the communication channel closure massage sent.

A communication channel management method for efficiently operating a communication channel when no data transmission is predicted will be described below.

3.3.2 System Operation

The communication channel management method according to an embodiment of the present disclosure may be performed by a system including a first apparatus and a second apparatus. The communication channel management method according to an embodiment of the present disclosure may include establishing a communication channel between the first apparatus and the second apparatus, transmitting, by the second apparatus, a data request message to the first apparatus, and controlling, by the second apparatus, a channel duration time of the communication channel.

The establishing of a communication channel between the first apparatus and the second apparatus may be understood as being similar to those described in the above embodiments. The communication channel may be a websocket communication channel. The establishment of the communication channel may be initiated by the first apparatus or the second apparatus transmitting a handshake message.

The transmitting, by the second apparatus, of transmitting a data request message to the first apparatus may be understood as being similar to those described in the above embodiments. The second apparatus transmitting the data request message may denote that the second apparatus receives a data acquisition notification message from the first apparatus and transmits the data request message to the first apparatus in response to the data acquisition notification message. The data request message may be transmitted multiple times.

The second apparatus controlling a channel duration time of the communication channel may denote that the second apparatus control a closing time point (or an interruption time point) of the communication channel. The controlling of a closing time point may include determining a reference time point for controlling the channel duration time and a reference time period, which is a time period from the reference time point to a time point at which the communication channel is closed. The second apparatus controlling a channel duration time of the communication channel may denote that the second apparatus controls a retention time of the communication channel.

The controlling, by the second apparatus, of a channel duration time of the communication channel may include determining whether a predetermined condition is satisfied and restricting the channel duration time of the communication channel when the condition is satisfied. The restricting the channel duration time may refers to limiting the channel duration time. The restricting or limiting the channel duration time can be understood to determining the closing timing of the channel. The closing timing of the channel may be determined in consideration of the open timing of the channel.

The determining of whether a predetermined condition is satisfied may denote that the second apparatus determines whether reception of data from the first apparatus is complete in response to the data request message. When the second apparatus finishes receiving data from the first apparatus, the second apparatus may restrict the channel duration time of the communication channel. The determining of whether reception of data from the first apparatus is complete may be performed according to a conventional method. For example, the determining of whether reception of data from the first apparatus may be performed by identifying an end packet included in the data received from the first apparatus.

The determining of whether a predetermined condition is satisfied may denote that the second apparatus determines whether a certain time has elapsed after the second apparatus transmits the data request message to the first apparatus. In this case, when a certain time has elapsed after the second apparatus transmits the data request message, the second apparatus may restrict the channel duration time of the communication channel.

When the second apparatus repeatedly transmits the data request message to the first apparatus, the determining of whether a predetermined condition is satisfied may denote that the second apparatus determines whether the number of times the second apparatus transmits the data request messages to the first apparatus exceeds a reference number. In this case, when the number of times the second apparatus transmits the data request message to the first apparatus exceeds the reference number, the second apparatus may restrict the channel duration time of the communication channel.

The restricting of the channel duration time of the communication channel when the condition is satisfied may include closing the communication channel. The closing of the communication channel may be performed by the second apparatus transmitting a closure request for closing the communication channel to the first apparatus.

The closing of the communication channel may denote closing the communication channel after a certain time has elapsed after the condition is satisfied.

The restricting of the channel duration time of the communication channel may denote closing the communication channel for a certain time and then resuming the communication channel. In other words, when any one of the above-described conditions is satisfied, the second apparatus may determine that a possibility that data will be transmitted from the first apparatus is low. When the possibility that data will be transmitted from the first apparatus is low, the second apparatus may interrupt the establishment of the communication channel for a certain time. The possibility that data will be transmitted from the first apparatus may be determined in consideration of the time elapsed after the second apparatus requesting the data to the first apparatus.

The channel management method according to an embodiment of the present disclosure may include establishing a communication channel between the first apparatus and the second apparatus, transmitting, by the second apparatus, a data request message to the first apparatus, and controlling, by the first apparatus, a channel duration time of the communication channel.

The establishing of a communication channel between the first apparatus and the second apparatus may be understood as being similar to those described in the above embodiments. The communication channel may be a websocket communication channel. The transmitting, by the second apparatus, of transmitting a data request message to the first apparatus may be understood as being similar to those described in the above embodiments.

The controlling, by the first apparatus, of a channel duration time of the communication channel may include determining whether a predetermined condition is satisfied and controlling the channel duration time of the communication channel when the condition is satisfied.

The determining of whether a predetermined condition is satisfied may denote that the first apparatus determines whether data to be transmitted to the second apparatus is acquired on the basis of the data request message received from the second apparatus. In this case, when no data to be transmitted to the second apparatus is acquired, the second apparatus may restrict the channel duration time of the communication channel.

The determining of whether data to be transmitted to the second apparatus is acquired may denote acquiring identification information of the second apparatus from the data request message and performing the determination in consideration of the identification information of the second apparatus. The determining of whether data to be transmitted to the second apparatus is acquired may denote determining a requested data type from the data request message and determining whether data of the requested data type is acquired.

The determining of whether a predetermined condition is satisfied may denote restricting the channel duration time of the communication channel when the first apparatus receives the data request message a reference number of times or more while the first apparatus transmits the data request message to the second apparatus multiple times.

The controlling of the channel duration time of the communication channel may be understood as being similar to those described in the above embodiments. The controlling of the channel duration time of the communication channel may include closing the communication channel. The closing of the communication channel may denote closing the websocket communication channel. The restricting of the channel duration time of the communication channel may denote closing the communication channel for a certain time and then resuming the communication channel.

3.3.2.1 First System

A communication channel management method according to an embodiment of the present disclosure may be performed by the above-described first system. The communication channel management method according to an embodiment of the present disclosure may include establishing a communication channel between a control apparatus and a printing apparatus, transmitting, by the printing apparatus, a data request message to the control apparatus, and controlling, by the printing apparatus, a channel duration time of the communication channel.

The establishing of a communication channel between a control apparatus and a printing apparatus and the transmitting, by the printing apparatus, of a data request message to the control apparatus may be implemented similarly to those described in the above embodiments. The printing apparatus may receive a data acquisition notification message from the control apparatus and transmit the data request message. The printing apparatus may transmit the data request message to the control apparatus multiple times.

The controlling, by the printing apparatus, of a channel duration time of the communication channel may include determining whether a predetermined condition is satisfied and restricting the channel duration time of the communication channel when the condition is satisfied.

The determining of whether a predetermined condition is satisfied may denote that the printing apparatus determines whether reception of data from the control apparatus is complete in response to the data request message. When the reception of data is complete, the printing apparatus may restrict the channel duration time of the communication channel. The determining of whether the reception of data is complete may be performed according to a conventional technique.

The determining of whether a predetermined condition is satisfied may denote that the printing apparatus determines whether a certain time has elapsed after the printing apparatus transmits the data request message to the control apparatus. When a reference time has elapsed after the printing apparatus transmits the data request message, the printing apparatus may restrict the channel duration time of the communication channel. The determining of whether a certain time has elapsed may be implemented by determining whether a certain time has elapsed without receiving a response message regarding the data request message after the printing apparatus transmits the data.

When the printing apparatus transmits the data request message to the control apparatus multiple times, the determining of whether a predetermined condition is satisfied may include the printing apparatus determining whether the number of times the printing apparatus transmits the data request messages to the control apparatus exceeds a reference number. When the number of times the printing apparatus transmits the data request message to the control apparatus exceeds the reference number, the printing apparatus may restrict the establishment of the communication channel.

The restricting of the channel duration time of the communication channel when the predetermined condition is satisfied may include closing the communication channel. A description of the closing of the communication channel may be understood as being similar to that described in the above embodiment. The closing of the communication channel may be performed by the printing apparatus transmitting a communication channel closure request message to the control apparatus.

A communication channel management method according to an embodiment of the present disclosure may include establishing a communication channel between a control apparatus and a printing apparatus, transmitting, by the printing apparatus, a data request message to the control apparatus, and controlling, by the control apparatus, a channel duration time of the communication channel.

The establishing of a communication channel between a control apparatus and a printing apparatus and the transmitting, by the printing apparatus, of a data request message to the control apparatus may be understood as being similar to those described in the above embodiments.

The controlling, by the control apparatus, of a channel duration time of the communication channel may include determining whether a predetermined condition is satisfied and controlling the channel duration time of the communication channel when the condition is satisfied.

The determining of whether a predetermined condition is satisfied may denote that the control apparatus determines whether data to be transmitted to the printing apparatus is acquired on the basis of the data request message received from the printing apparatus. When no data to be transmitted to the printing apparatus is acquired, the control apparatus may restrict the channel duration time of the communication channel.

The control apparatus determining whether data to be transmitted to the printing apparatus is acquired may denote that the control apparatus acquires identification information of the printing apparatus from the data request message and performs the determination in consideration of the identification information of the printing apparatus. The control apparatus determining whether data to be transmitted to the printing apparatus is acquired may denote that the control apparatus determines a requested data type from the data request message and determines whether data of the requested data type is acquired.

More specifically, the control apparatus may receive the data request message and acquire identification information, state information, environmental setting information, configuration setting information, etc. of the printing apparatus from the data request message. The control apparatus may determine whether data to be allocated to the printing apparatus is acquired on the basis of the acquired information regarding the printing apparatus.

The determining of whether a predetermined condition is satisfied may denote that the control apparatus restricts the channel duration time of the communication channel when the control apparatus receives the data request message a reference number of times or more while the control apparatus receives the data request message from the printing apparatus multiple times.

The controlling of the channel duration time of the communication channel may be understood as being similar to those described in the above embodiments. The controlling of the channel duration time of the communication channel may include closing the communication channel. The closing of the communication channel may be performed by the control apparatus transmitting a communication channel closure request message to the printing apparatus.

A communication channel management method according to an embodiment of the present disclosure may include establishing a communication channel between a control apparatus and a printing apparatus, transmitting, by the control apparatus, a data request message to the printing apparatus, and controlling, by the control apparatus, a channel duration time of the communication channel.

The establishing of a communication channel between a control apparatus and a printing apparatus and the transmitting, by the control apparatus, of a data request message to the printing apparatus may be understood as being similar to those described in the above embodiments. The data request message may include state information items requested from the printing apparatus. The data may include state information of the printing apparatus.

The control apparatus may receive a data acquisition notification message from the printing apparatus and transmit the data request message to the printing apparatus. The control apparatus may transmit the data request message to the printing apparatus multiple times.

The controlling, by the control apparatus, of a channel duration time of the communication channel may include determining whether a predetermined condition is satisfied and restricting the channel duration time of the communication channel when the condition is satisfied.

The determining of whether a predetermined condition is satisfied may denote that the control apparatus determines whether reception of data from the printing apparatus is complete in response to the data request message. When the reception of data from the printing apparatus is complete, the control apparatus may restrict the channel duration time of the communication channel.

The determining of whether a predetermined condition is satisfied may denote that the control apparatus determines whether a certain time has elapsed after the control apparatus transmits the data request message to the printing apparatus. When a reference time has elapsed after the control apparatus transmits the data request message to the printing apparatus, the control apparatus may restrict the channel duration time of the communication channel.

When the control apparatus transmits the data request message to the printing apparatus multiple times, the determining of whether a predetermined condition is satisfied may include the control apparatus determining whether the number of times the control apparatus transmits the data request messages to the printing apparatus exceeds a reference number. When the number of times the control apparatus transmits the data request message to the printing apparatus exceeds the reference number, the control apparatus may restrict the establishment of the communication channel.

The restricting of the channel duration time of the communication channel when the predetermined condition is satisfied may include closing the communication channel. A description of the closing of the communication channel may be understood as being similar to that described in the above embodiment.

A communication channel management method according to an embodiment of the present disclosure may include establishing a communication channel between a control apparatus and a printing apparatus, transmitting, by the control apparatus, a data request message to the printing apparatus, and controlling, by the printing apparatus, a channel duration time of the communication channel.

The establishing of a communication channel between a control apparatus and a printing apparatus and the transmitting, by the control apparatus, of a data request message to the printing apparatus may be understood as being similar to those described in the above embodiments.

The controlling, by the printing apparatus, of a channel duration time of the communication channel may include determining whether a predetermined condition is satisfied and controlling the channel duration time of the communication channel when the condition is satisfied.

The determining of whether a predetermined condition is satisfied may denote that the printing apparatus determines whether data to be transmitted to the control apparatus is acquired on the basis of the data request message received from the control apparatus. When no data to be transmitted to the control apparatus is acquired, the printing apparatus may restrict the channel duration time of the communication channel.

The determining of whether data to be transmitted to the control apparatus is acquired may be performed by determining requested state items from the data request message and determining whether state information of the state items is acquired. The determining of whether data to be transmitted to the control apparatus is acquired may denote determining a requested data type from the data request message and determining whether data of the requested data type is acquired.

The determining of whether a predetermined condition is satisfied may denote that the printing apparatus controls the channel duration time of the communication channel when the printing apparatus receives the data request message from the control apparatus a reference number of times or more while the control apparatus transmits the data request message to the printing apparatus multiple times.

The controlling of the channel duration time of the communication channel may be understood as being similar to those described in the above embodiments. The controlling of the channel duration time of the communication channel may include closing the communication channel.

3.3.2.2 Second System

A communication channel management method according to an embodiment of the present disclosure may be performed by the above-described second system. The communication channel management method may be implemented by a system including a control apparatus, a printing apparatus, and a peripheral apparatus (e.g., a secondary printing apparatus) connected to the printing apparatus.

The communication channel management method according to an embodiment of the present disclosure may include establishing a communication channel between the control apparatus and the printing apparatus, transmitting, by the printing apparatus, a data request message to the control apparatus, and controlling, by the printing apparatus, a channel duration time of the communication channel.

The establishing of a communication channel between the control apparatus and the printing apparatus and the transmitting, by the printing apparatus, of a data request message to the control apparatus may be understood as being similar to those described in the above embodiments. The data request message may include identification information of the peripheral apparatus. The data may be control data for controlling operation of the peripheral apparatus. The data may be print data for controlling operation of the secondary printing apparatus.

The printing apparatus transmitting the data request message to the control apparatus may denote that the printing apparatus acquires the data request message from the peripheral apparatus and transmits the acquired data request message to the control apparatus. In other words, the data request message may be a message that requests data relevant to the operation of the peripheral apparatus. The printing apparatus may transmit the data request message multiple times.

The printing apparatus controlling the channel duration time of the communication channel may include determining whether a predetermined condition is satisfied.

The determining of whether a predetermined condition is satisfied may denote that the printing apparatus determines whether control data for controlling the peripheral apparatus is acquired from the control apparatus. The printing apparatus determining whether control data for controlling the peripheral apparatus is acquired may denote that the printing apparatus performs the determination in consideration of whether information corresponding to identification information of the peripheral apparatus is included in data received from the control apparatus.

The printing apparatus determining whether the control data is acquired may denote that the printing apparatus determines whether the reception of the control data for controlling the peripheral apparatus is complete.

The printing apparatus controlling the channel duration time of the communication channel may include closing the communication channel A detailed description of the closing of the communication channel may be understood as being similar to those described in the above embodiments.

The communication channel management method according to an embodiment of the present disclosure may include establishing a communication channel between the control apparatus and the printing apparatus, transmitting, by the printing apparatus, a data request message to the control apparatus, and controlling, by the control apparatus, a channel duration time of the communication channel.

In the communication channel management method, the establishing of a communication channel between the control apparatus and the printing apparatus and the transmitting, by the printing apparatus, of a data request message to the control apparatus may be understood as being similar to those described in the above embodiments.

The printing apparatus transmitting the data request message to the control apparatus may denote that the printing apparatus acquires the data request message from the peripheral apparatus and transmits the acquired data request message to the control apparatus. In other words, the data request message may be a message that requests data relevant to the operation of the peripheral apparatus.

The control apparatus controlling the channel duration time of the communication channel may include determining whether a predetermined condition is satisfied.

The control apparatus determining whether a predetermined condition is satisfied may denote that the control apparatus determines whether data to be transmitted to the peripheral apparatus connected to the printing apparatus is acquired on the basis of the data request message received from the printing apparatus. When no data to be transmitted to the peripheral apparatus is acquired, the control apparatus may restrict the channel duration time of the communication channel Here, the transmitting of data to the peripheral apparatus may be understood as the transmitting of data through the printing apparatus.

The control apparatus determining whether data to be transmitted to the peripheral apparatus is acquired may denote that the control apparatus acquires identification information of the peripheral apparatus from the data request message and performs the determination in consideration of the identification information of the peripheral apparatus. The control apparatus determining whether data to be transmitted to the peripheral apparatus is acquired may denote that the control apparatus determines a data type requested by the peripheral apparatus from the data request message and determines whether data of the determined data type is acquired.

More specifically, the control apparatus may receive the data request message and acquire identification information, state information, environmental setting information, etc. of the peripheral apparatus from the data request message. The control apparatus may determine whether there is data to be allocated to the peripheral apparatus on the basis of the acquired information regarding the peripheral apparatus.

The controlling of the channel duration time of the communication channel may be understood as being similar to those described in the above embodiments. The controlling of the channel duration time of the communication channel may include closing the communication channel.

A communication channel management method according to an embodiment of the present disclosure may include establishing a communication channel between a control apparatus and a printing apparatus, transmitting, by the control apparatus, a data request message to the printing apparatus, and controlling, by the printing apparatus, a channel duration time of the communication channel.

In the communication channel management method, the establishing of a communication channel between a control apparatus and a printing apparatus and the transmitting, by the control apparatus, of a data request message to the printing apparatus may be understood as being similar to those described in the above embodiments. The data request message may include state information items requested from a peripheral apparatus (e.g., a secondary printing apparatus). The data may include state information of the peripheral apparatus or state information of the secondary printing apparatus.

The controlling, by the printing apparatus, of a channel duration time of the communication channel may include determining whether a predetermined condition is satisfied and restricting the channel duration time of the communication channel when the condition is satisfied.

The determining of whether a predetermined condition is satisfied may denote that the printing apparatus determines whether reception of data from the control apparatus is complete. The determining of whether a predetermined condition is satisfied may denote that the control apparatus determines whether a certain time has elapsed after the control apparatus transmits the data request message to the printing apparatus. The printing apparatus may control the channel duration time of the communication channel when the reception of data from the control apparatus is complete or when a certain time has elapsed after the printing apparatus sends the data request message to the control apparatus. A detailed description thereof will be understood as being similar to those described in the above embodiments.

The determining of whether a predetermined condition is satisfied may denote that the printing apparatus determines whether data to be transmitted to the control apparatus is acquired on the basis of the data request message received from the control apparatus. When no data to be transmitted to the control apparatus is acquired, the printing apparatus may restrict the channel duration time of the communication channel.

The determining of whether data to be transmitted to the control apparatus is acquired may be performed by determining state items of a requested peripheral apparatus from the data request message and determining whether state information of the state items of the peripheral apparatus is acquired. The determining of whether data to be transmitted to the control apparatus is acquired may denote determining whether data corresponding to the data request message is acquired from the peripheral apparatus.

The restricting of the channel duration time of the communication channel when the predetermined condition is satisfied may include closing the communication channel. A description of the closing of the communication channel may be understood as being similar to that described in the above embodiment.

A communication channel management method according to an embodiment of the present disclosure may include establishing a communication channel between a control apparatus and a printing apparatus, transmitting, by the control apparatus, a data request message to the printing apparatus, and controlling, by the control apparatus, a channel duration time of the communication channel.

The establishing of a communication channel between a control apparatus and a printing apparatus and the transmitting, by the control apparatus, of a data request message to the printing apparatus may be understood as being similar to those described in the above embodiments.

The controlling, by the control apparatus, of a channel duration time of the communication channel may include determining, by the control apparatus, whether a predetermined condition is satisfied.

The determining of whether a predetermined condition is satisfied may denote that the control apparatus determines whether data to be transmitted to the peripheral apparatus is acquired on the basis of the data request message received from the printing apparatus.

When no data to be transmitted to the peripheral apparatus is acquired, the control apparatus may restrict the channel duration time of the communication channel.

The control apparatus determining whether data to be transmitted to the peripheral apparatus is acquired may denote that the control apparatus acquires identification information of the peripheral apparatus from the data request message and performs the determination in consideration of the identification information of the peripheral apparatus. More specifically, the control apparatus may receive the data request message and acquire identification information, state information, environmental setting information, etc. of the peripheral apparatus from the data request message. The control apparatus may determine whether there is data to be allocated to the peripheral apparatus on the basis of the acquired information regarding the peripheral apparatus.

The controlling, by the control apparatus, of a channel duration time of the communication channel may include closing the communication channel when the condition is satisfied.

3.3.3 Operation of Each Apparatus

3.3.3.1 Control Apparatus

The communication channel management according to an embodiment of the present disclosure may be performed by a control apparatus. The control apparatus may be understood as being similar to the external control apparatus in the above-described first and second systems.

The control apparatus may have a communication unit to communicate with an external apparatus. The control apparatus may have a user input unit to acquire a user input.

The control apparatus may have a control unit. The control apparatus may manage a communication channel by means of the control unit.

The control unit may control a channel duration time of the communication channel. The control unit controlling the channel duration time of the communication channel may include determining whether a predetermined condition is satisfied. A detailed description of the predetermined condition may be understood as being similar to that described of the communication channel management of the system.

The control unit controlling the channel duration time of the communication channel may include restricting the channel duration time of the communication channel when the condition is satisfied. The restricting of the channel duration time of the communication channel may be performed by determining a closing time of the communication channel.

The controlling of the channel duration time of the communication channel may be performed by a channel duration time control unit included in the control apparatus.

The communication channel management method of the control apparatus will be described below. The following communication channel management method may be performed by the control unit by means of the communication unit or the like.

The communication channel management of the control apparatus method according to an embodiment of the present disclosure includes establishing a communication channel with an external apparatus, acquiring a data request message from the external apparatus, and controlling a channel duration time of the communication channel.

The external apparatus may be a printing apparatus. The printing apparatus may be a hub printing apparatus to which at least one peripheral apparatus is connected. The peripheral apparatus may be a secondary printing apparatus for performing a printing operation.

The control apparatus acquiring a data request message from the external apparatus may denote that the control apparatus acquires a data request message generated by the external apparatus. The acquiring of a data request message from the external apparatus may denote that the control apparatus acquires a data request message generated by a peripheral apparatus connected to the external apparatus.

The controlling of a channel duration time of the communication channel may include the control apparatus determining whether data to be transmitted to the external apparatus is acquired. The determining of whether data to be transmitted to the external apparatus is acquired may denote determining whether control data for controlling the external apparatus or the peripheral apparatus is acquired.

The controlling, by the control apparatus, of a channel duration time of the communication channel may include restricting the channel duration time of the communication channel when no data to be transmitted to the external apparatus is acquired. The controlling, by the control apparatus, of a channel duration time of the communication channel may include restrict the channel duration time of the communication channel when data to be transmitted to the external apparatus is not acquired.

The controlling, by the control apparatus, of a channel duration time of the communication channel may include, when data to be transmitted to the external apparatus is acquired, transmitting the acquired data to the external apparatus, determining whether the transmission is complete, and when the transmission is complete, restricting a channel duration time of the communication channel.

The controlling, by the control apparatus, of a channel duration time of the communication channel may include determining whether a predetermined condition is satisfied and restricting the channel duration time of the communication channel when the predetermined condition is satisfied.

The control apparatus determining whether a predetermined condition is satisfied may include determining whether data for controlling the external apparatus or the peripheral apparatus is acquired. When the data is not acquired, the control apparatus may restrict the channel duration time of the communication channel.

When the data for controlling the external apparatus or the peripheral apparatus is acquired, the control apparatus determining whether a predetermined condition is satisfied may include transmitting the data to the external apparatus and determining whether the transmission of the data is complete. When the transmission of the data is complete, the control apparatus may restrict the channel duration time of the communication channel.

The restricting of the channel duration time of the communication channel may be implemented by closing the communication channel. The restricting of the channel duration time of the communication channel may be implemented by closing the communication channel when a predetermined time has elapsed after the condition is satisfied. The restricting of the channel duration time of the communication channel may be implemented by closing the communication channel during a predetermined time when the condition is satisfied.

The closing of the communication channel may be performed by the control apparatus transmitting a channel closing message of closing the websocket communication channel to the external apparatus.

A communication channel management method of the control apparatus according to an embodiment of the present disclosure includes establishing a communication channel with an external apparatus, transmitting a data request message to the external apparatus, and controlling a channel duration time of the communication channel.

The external apparatus may be a printing apparatus. The printing apparatus may be a hub printing apparatus to which at least one peripheral apparatus is connected. The peripheral apparatus may be a secondary printing apparatus for performing a printing operation.

The control apparatus transmitting a data request message to the external apparatus may denote that the control apparatus transmits a data request message that requests data to the external apparatus or the peripheral apparatus.

The controlling, by the control apparatus, of a channel duration time of the communication channel may include the control apparatus determining whether data is received from the external apparatus. The control apparatus determining whether data is received from the external apparatus may denote that the control apparatus determines whether data generated by the external apparatus or the peripheral apparatus is received from the external apparatus.

The control apparatus may restrict the channel duration time of the communication channel when data is received from the external apparatus. The control apparatus may restrict the channel duration time of the communication channel a certain time period after the reception of data is complete.

The control apparatus may restrict the channel duration time of the communication channel when no data is received from the external apparatus. Here, receiving no data, by the control apparatus, from the external apparatus, can be understood as to include receiving data generally associated with formation or maintenance of the channel. In other words, receiving no data, by the control apparatus, from the external apparatus, can be understood as receiving no meaningful data. Receiving no data from the external apparatus, by the control apparatus, may refer to receive no desired data from the external apparatus. When a certain time has elapsed after the control apparatus transmits the data request message to the external apparatus or when no data is received while control apparatus transmits the data request message a predetermined number of times, the control apparatus may determine that no data is received from the external apparatus.

The controlling, by the control apparatus, of a channel duration time of the communication channel may include determining, by the control apparatus, whether a predetermined condition is satisfied and restricting, by the control apparatus, the channel duration time of the communication channel when the predetermined condition is satisfied.

The determining of whether a predetermined condition is satisfied may denote that the control apparatus determines whether the data is received from the external apparatus. The determining of whether the data is received from the external apparatus may denote determining whether data generated by the external apparatus or the peripheral apparatus is received by the control apparatus from the external apparatus.

When the data is not received from the external apparatus, the control apparatus determining whether a predetermined condition is satisfied may include determining whether a predetermined time has elapsed after the data request message is transmitted.

The restricting of the channel duration time of the communication channel may be implemented by closing the communication channel.

3.3.3.2 Printing Apparatus

The communication channel management according to an embodiment of the present disclosure may be performed by a printing apparatus. The printing apparatus may be a hub printing apparatus to which at least one peripheral apparatus is connected. The printing apparatus may be handled similarly to the printing apparatus in the above-described first and second systems, unless specially stated otherwise.

The printing apparatus may have a communication unit to communicate with an external apparatus. The printing apparatus may have a printing unit to perform a printing operation.

The printing apparatus may have a control unit.

The control unit may control a channel duration time of the communication channel. The control unit controlling the channel duration time of the communication channel may include determining whether a predetermined condition is satisfied.

The control unit controlling the channel duration time of the communication channel may include restricting the channel duration time of the communication channel when the predetermined condition is satisfied. The restricting of the channel duration time of the communication channel may be performed by determining a closing time of the communication channel.

The control unit may determine whether a predetermined condition associated with an acquisition of print data is satisfied and may control a channel duration time of a websocket communication channel by means of the communication unit.

The controlling of the channel duration time of the communication channel may be performed by a channel duration time control unit included in the printing apparatus. The channel duration time control unit may determine the channel duration time. The channel duration time control unit may determine the channel closure timing. The channel duration time control unit may determine the channel open and closure period.

The communication channel management method of the printing apparatus will be described below. The following communication channel management method may be performed by the control unit by means of the communication unit or the like.

The communication channel management method of the printing apparatus according to an embodiment of the present disclosure includes establishing a communication channel with an external apparatus, transmitting a data request message to the external apparatus, and controlling a channel duration time of the communication channel.

The external apparatus may be an external control apparatus configured to transmit control data to the printing apparatus.

The printing apparatus transmitting a data request message to the external apparatus may denote that the printing apparatus transmits a data request message generated by the printing apparatus or a data request message acquired from the peripheral apparatus to the external apparatus.

The controlling of a channel duration time of the communication channel may include the printing apparatus determining whether data is received from the external apparatus through the communication channel.

The printing apparatus may determine whether data is received and restrict the channel duration time of the communication channel when the data is received. The restricting of the channel duration time of the communication channel when the data is received may denote that the printing apparatus restricts the channel duration time of the communication channel within a predetermined time period after the reception of data is complete.

When no data is received, the printing apparatus determines whether a certain time has elapsed after the data request message is transmitted. When the time has elapsed, the printing apparatus may restrict the channel duration time of the communication channel.

The controlling of the channel duration time of the communication channel may include the printing apparatus determining whether a predetermined condition is satisfied. The printing apparatus may restrict the channel duration time of the communication channel when the predetermined condition is satisfied.

The determining of whether a predetermined condition is satisfied may include determining whether data is received through the communication channel.

The determining of whether a predetermined condition is satisfied may include determining whether a certain time has elapsed after the data request message is transmitted when no data is received.

The restricting of the channel duration time of the communication channel may be implemented by closing the communication channel. The restricting of the channel duration time of the communication channel may be implemented by closing the communication channel when a predetermined time has elapsed after the condition is satisfied. The restricting of the channel duration time of the communication channel may be implemented by closing the communication channel during a predetermined time when the condition is satisfied.

The closing of the communication channel may be performed by the control apparatus transmitting a channel closing message of closing the websocket communication channel to the external apparatus.

The communication channel management method of the printing apparatus according to an embodiment of the present disclosure may include establishing a communication channel with an external apparatus, receiving a data request message from the external apparatus, and controlling a channel duration time of the communication channel.

The printing apparatus receiving a data request message from the external apparatus may denote that the printing apparatus receives a message that requests the data acquired from the printing apparatus or a message that requests the data acquired from the peripheral apparatus from the external apparatus.

The controlling of a channel duration time of the communication channel may include the printing apparatus determining whether data to be transmitted to the external apparatus is acquired. Whether there is data to be transmitted to the external apparatus may be determined on the basis of the data request message received from the external apparatus.

The printing apparatus may determine whether data to be transmitted to the external apparatus is acquired and may restrict the channel duration time of the communication channel when the data is not received. When the data is not acquired and a predetermined time has elapsed after the data request message is received, the printing apparatus may restrict the channel duration time of the communication channel.

The printing apparatus may determine whether data to be transmitted to the external apparatus is acquired and may transmit the data to the external apparatus when the data is acquired. When the transmission procedure of the data is complete, the printing apparatus may restrict the channel duration time of the communication channel.

The controlling of the channel duration time of the communication channel may include the printing apparatus determining whether a predetermined condition is satisfied. The printing apparatus may restrict the channel duration time of the communication channel when the predetermined condition is satisfied.

The determining of whether a predetermined condition is satisfied may denote that the printing apparatus performs the determination in consideration of whether the data to be transmitted to the external apparatus is acquired or when the data request message is received.

The restricting of the channel duration time of the communication channel may be implemented by closing the communication channel.

3.3.3.3 Peripheral Apparatus

The communication channel management according to an embodiment of the present disclosure may be performed by a peripheral apparatus connected to the printing apparatus connected with the communication channel. The peripheral apparatus may be handled similarly to the peripheral apparatus in the above-described first and second systems, unless specially stated otherwise.

The peripheral apparatus may have a communication unit to communicate with the printing apparatus.

The peripheral apparatus may have a control unit. The control unit may control a channel duration time of the communication channel.

The control unit controlling the channel duration time of the communication channel may include determining whether a predetermined condition is satisfied. The control unit controlling the channel duration time of the communication channel may include restricting the channel duration time of the communication channel when the predetermined condition is satisfied.

The communication channel management method of the peripheral apparatus will be described below.

The communication channel management method of the peripheral apparatus according to an embodiment of the present disclosure includes transmitting a data request message to the printing apparatus and controlling a channel duration time of the communication channel.

The data request message may be ultimately transmitted to the printing apparatus or an external control apparatus connected to the printing apparatus.

The controlling of a channel duration time of the communication channel may include determining whether data is received by the peripheral apparatus from the printing apparatus. The determining whether data is received from the printing apparatus may denote determining whether data generated by the control apparatus or the printing apparatus is received from the printing apparatus. When the data is received, the peripheral apparatus may restrict the channel duration time of the communication channel.

The restricting of the channel duration time of the communication channel may include determining whether data is received by the peripheral apparatus from the printing apparatus and restricting the channel duration time of the communication channel when the data is not received.

The restricting of the channel duration time of the communication channel may denote closing the communication channel. The peripheral apparatus may transmit a communication channel closing request to the printing apparatus. When the communication channel closing request is transmitted to the printing apparatus, the printing apparatus may transmit a channel closing request message to the external control apparatus to close the communication channel.

The communication channel management method of the peripheral apparatus according to an embodiment of the present disclosure includes receiving a data request message from the printing apparatus and controlling a channel duration time of the communication channel.

The data request message may be generated by the printing apparatus or an external control apparatus connected to the printing apparatus.

The controlling of a channel duration time of the communication channel may include determining whether data to be transmitted to the printing apparatus is acquired. The determining of whether data to be transmitted to the printing apparatus is acquired may denote that the printing apparatus performs the determination on the basis of the data request message received from the printing apparatus. When the data is acquired, the peripheral apparatus may transmit the data to the printing apparatus. When the transmission is complete, the peripheral apparatus may restrict the channel duration time of the communication channel.

The peripheral apparatus may determine whether data to be transmitted to the printing apparatus is acquired and may restrict the channel duration time of the communication channel when the data is not received.

The restricting of the channel duration time of the communication channel may be implemented by closing the communication channel.

3.3.3.4 Secondary Printing Apparatus

The communication channel management according to an embodiment of the present disclosure may be performed by a secondary printing apparatus connected to the printing apparatus connected with the communication channel.

The secondary printing apparatus may have a communication unit to communicate with the printing apparatus. The secondary printing apparatus may have a printing unit to perform a printing operation. The secondary printing apparatus may have a control unit to acquire control data from the printing apparatus or transmit data to the printing apparatus. The control unit may control a channel duration time of the communication channel.

The communication channel management of the secondary printing apparatus may be performed similar to the above-described communication channel management of the peripheral apparatus.

For the communication channel management of the secondary printing apparatus, the data acquired by the secondary printing apparatus from the printing apparatus may be print data for controlling a printing operation of the secondary printing apparatus.

For the communication channel management of the secondary printing apparatus, the data transmitted to the printing apparatus may be printing operation state information of the secondary printing apparatus.

3.4 Control of Peripheral Apparatus

3.4.1 Control Process

In the printing method or the like according to the present disclosure, a method of remotely controlling an apparatus will be described below. According to the present disclosure, one apparatus may control another apparatus as well as a peripheral apparatus connected to the other apparatus through a duplex asynchronous communication channel. Here, the controlling of an apparatus is defined as a concept that covers registering the apparatus to be connected to a system, controlling operation of the apparatus, disconnecting the apparatus from the system, etc.

A method of controlling another apparatus through the duplex asynchronous communication channel, for example, a websocket communication channel and a method of controlling a peripheral apparatus connected to the other apparatus will be described below.

3.4.2 System Operation

An apparatus control method according to the present disclosure may be implemented by a system including a control apparatus, a hub printing apparatus, and at least one peripheral apparatus connected to the hub printing apparatus. Here, the control apparatus, the hub printing apparatus, and the peripheral apparatus may be handled similarly to those of the above-described first and second systems, unless specially stated otherwise.

The apparatus control method of the control apparatus according to an embodiment of the present disclosure may include acquiring a control tool for controlling the peripheral apparatus, establishing a communication channel with the hub printing apparatus, and controlling the peripheral apparatus using the control tool and the communication channel.

The control tool can be understood as a tool to configure a target apparatus, a target module, target software, etc. The control tool can be understood as a tool to set an environmental settings for a target apparatus, a target module, a target software, etc.

The control apparatus acquiring a control tool may be understood as the control apparatus acquiring a web page or a web application that provides a control function for the peripheral apparatus by means of a web browser installed in the control apparatus. The acquiring of the web page or the like may include that a control function provided thereby is activated. The web page, the web application, etc. (hereinafter, all of them are regarded as included in the web application) may be connected to the hub printing apparatus through the communication channel.

The web application may be provided by a web server included in the hub printing apparatus. The web application may be provided by a web server included in a separate server apparatus.

The control apparatus may control the peripheral apparatus not only by the web application but also through a built-in application that is pre-installed in the control apparatus.

The control apparatus establishing a communication channel with the hub printing apparatus may be understood as being similar to those described in the above embodiments. The communication channel may be a duplex asynchronous communication channel. The communication channel may be a websocket communication channel.

The control apparatus controlling the peripheral apparatus may include the control apparatus acquiring control data for controlling the peripheral apparatus.

The control data may include registration information for identifying and/or managing the peripheral apparatus. For example, the control data may include information regarding a network setting, a network IP address of the peripheral apparatus, initial settings of the peripheral apparatus, a command format of the peripheral apparatus, etc. The control data may be apparatus information for adding the peripheral apparatus to a peripheral apparatus database managed by the control tool or apparatus information for removing the peripheral apparatus from the database.

According to an embodiment of the present disclosure, the controlling, by the control apparatus, of the peripheral apparatus may include acquiring, by the control apparatus, control data of the peripheral apparatus and transmitting, by the control apparatus, the control data to the hub printing apparatus by means of the control tool. In this case, the above-described websocket channel may be used to transmit the control data to the hub printing apparatus.

The apparatus control method according to an embodiment of the present disclosure may further include acquiring, by the control tool, a response message regarding the transmission of the control data through the communication channel.

In the apparatus control method according to this embodiment, the response message may include result information of the printing apparatus acquiring the control data, identifying the peripheral apparatus on the basis of the control data, and registering the identified peripheral apparatus.

In the apparatus control method according to this embodiment, the response message may include state data indicating a change in state of the peripheral apparatus due to the transmission of the control data.

The apparatus control method according to this embodiment may further include displaying, by the control tool, a control result to a user on the basis of the acquired response message. In other words, the acquired response message regarding the transmission of data or the state data included in the response message may be displayed by the control apparatus. The user may check the displayed state and determine whether the control or state change of the peripheral apparatus is successfully performed.

The controlling, by the control apparatus, of the peripheral apparatus may include transmitting, by the control apparatus, the control data to the printing apparatus, transmitting, by the printing apparatus, the control data to the peripheral apparatus, acquiring, by the printing apparatus, a response message corresponding to the transmission of the control data from the peripheral apparatus, and transferring, by the printing apparatus, the response message to the control apparatus.

The control data may be control command for controlling operation of the peripheral apparatus. For example, the control data may include an input command for instructing the peripheral apparatus to acquire an external input, an output command for instructing the peripheral apparatus to output data, a printing command for instructing the peripheral apparatus to perform a printing operation, etc.

Since the websocket communication channel may be used to handle the above-described control data and response message, the control data and the response message may be associated in real time in terms of occurrence and/or transfer thereof. Accordingly, when the peripheral apparatus is controlled using a websocket channel, it is possible to quickly transfer a control command of a user and confirm a result of operating the peripheral apparatus according to the control command.

3.4.3 Operation of Each Apparatus

3.4.3.1 Operation of Control Apparatus

The apparatus management method according to an embodiment of the present disclosure may be performed by a control apparatus. The control apparatus may be handled similarly to the external control apparatus in the above-described first and second systems, unless specially stated otherwise.

The apparatus management method of the control apparatus may include acquiring, by the control apparatus, a control tool, establishing, by the control apparatus, a communication channel with an external apparatus, and controlling, by the control apparatus, the external apparatus by means of the control tool.

The control apparatus acquiring a control tool may be understood as acquiring a web application or the like that is provided by a web server included in the external apparatus. The control apparatus acquiring a control tool may denote that a control tool pre-installed in the control apparatus is activated.

The control tool may acquire a control input from a user and transmit the acquired control input to the external apparatus through the communication channel. The control tool may convert the control input into control data and transmit the control data to the external apparatus. The control data may include registration information of the external apparatus or operational control information of the external apparatus in order to control the external apparatus.

The control tool may receive a response message from the external apparatus in response to transmitting the control data. The response message may include state data indicating a change in state of the external apparatus due to the transmission of the control data. The response message may include registration state information, operational state information, or the like of the external apparatus.

The control apparatus establishing the communication channel with the external apparatus may include the control apparatus and the external apparatus not only being directly connected through the communication channel but also being indirectly connected to each other. Specifically, even when the control apparatus establishes the communication channel with a predetermined hub apparatus and the external apparatus is directly connected with the hub apparatus, the control apparatus may be understood as establishing the communication channel with the external apparatus.

The control apparatus controlling the external apparatus by means of the control tool may include transmitting control data to the external apparatus through the communication channel by means of the control tool. The controlling of the external apparatus may include receiving a response message regarding the transmission of the control data from the external apparatus through the communication channel.

The apparatus management method may further include displaying, by the control apparatus, a result of the transmission of the control data. The control apparatus may acquire state information of the external apparatus from the response message received in response to transmitting the control data and display the acquired state information.

The control apparatus may include a communication unit, a user input unit, a control tool unit, and a control unit. The control apparatus may be implemented as a POS host in the above-described POS system. The external apparatus may be implemented as a POS peripheral apparatus in the above-described POS system.

The communication unit may control the external apparatus through a websocket channel. The communication unit may acquire a web application or the like through a web browser pre-installed in the control apparatus.

The user input unit may receive control information from a user and transmit the control information to the control tool unit. The control information may be registration information for managing the external apparatus or control command information for controlling operation of the external apparatus.

The control tool unit may acquire a control tool and process the control data or state data.

The control unit may perform the above-described apparatus management by means of the communication unit, the control tool unit, etc. The control unit may acquire the control tool by means of a control tool management unit, establish the communication channel by means of the communication unit, and control an external apparatus by means of the control tool management unit and the communication unit.

The control apparatus may optionally have a display unit. The display unit may display a control state or a control result of the peripheral apparatus on the basis of the response message acquired from the external apparatus.

3.4.3.2 Operation of Hub Apparatus

The apparatus management method according to an embodiment of the present disclosure may be performed by a hub apparatus. The hub apparatus may be handled similarly to the hub printing apparatus in the above-described first and second systems, unless specially stated otherwise.

The apparatus management method of the hub apparatus may include establishing a communication channel with an external apparatus, acquiring control data from the external apparatus, and controlling a peripheral apparatus using the control data.

The communication channel established between the hub apparatus and the external apparatus may be a websocket communication channel. The hub apparatus may acquire the control data from the external apparatus through the websocket communication channel.

The hub apparatus controlling the peripheral apparatus using the control data may denote that the hub apparatus registers the peripheral apparatus using identification information of the peripheral apparatus included in the control data. The controlling of the peripheral apparatus may denote that the hub apparatus controls operation of the peripheral apparatus using operation control data included in the control data. The controlling of a peripheral apparatus may denote that the hub apparatus deregisters the peripheral apparatus using the identification information of the peripheral apparatus.

The apparatus management method of the hub apparatus may further include providing a web application to the external apparatus.

The hub apparatus providing a web application may be implemented by the external apparatus providing a web control apparatus for managing a peripheral apparatus connected to the hub apparatus. The hub apparatus may have a web server to provide a web application stored in the web server to the external apparatus.

The providing of a web application to the external apparatus may be performed before or after the establishing of a communication channel.

A peripheral apparatus management method according to an embodiment of the present disclosure may include establishing a first websocket channel for communicating with a peripheral apparatus control tool provided to an external apparatus; acquiring peripheral apparatus management data including peripheral apparatus identification information and peripheral apparatus registration information from the peripheral apparatus control tool provided to the external apparatus through the first websocket channel, and registering a peripheral apparatus identified on the basis of the peripheral apparatus identification information together with the peripheral apparatus management data.

In this case, the peripheral apparatus management method may further include providing, by a hub apparatus, the peripheral apparatus control tool to the external apparatus before or after the establishing of a first websocket channel. The peripheral apparatus control tool provided to the external apparatus may be a peripheral apparatus control tool provided by the hub apparatus.

Figure 11:
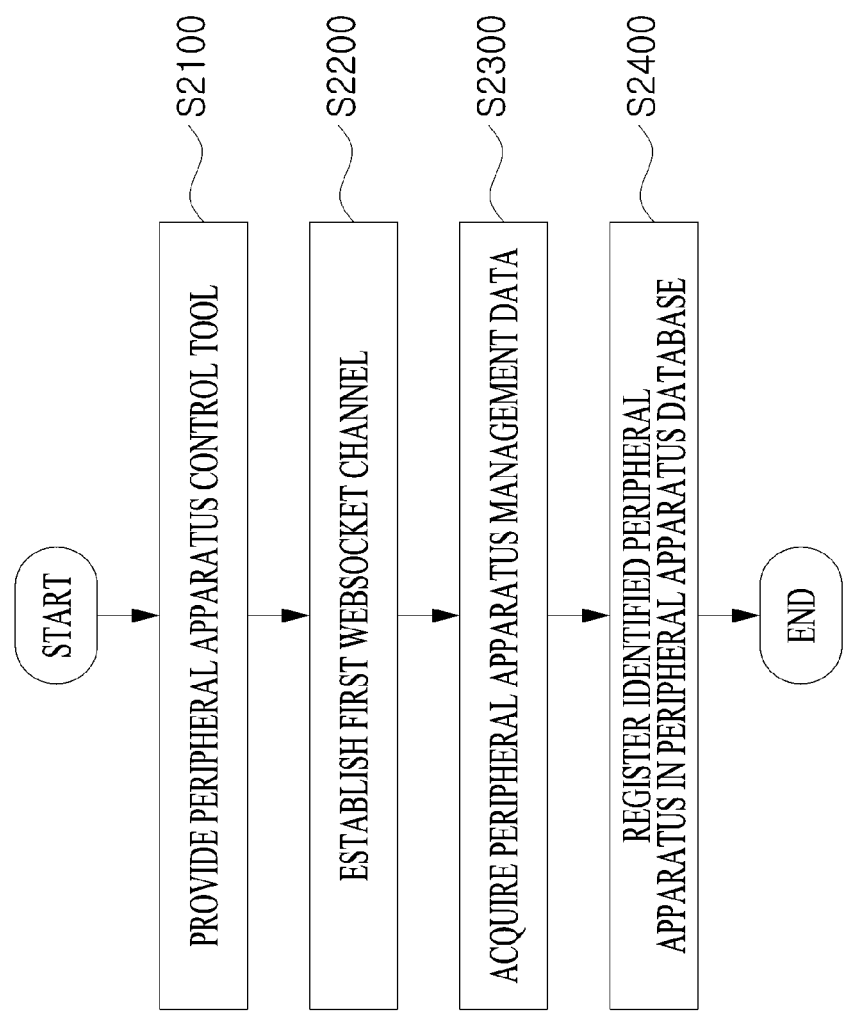
FIG. 11 is a flowchart showing a peripheral apparatus management method according to an embodiment of the present disclosure.

FIG. 11 is a flowchart showing a peripheral apparatus management method according to an embodiment of the present disclosure. Referring to FIG. 11, a peripheral apparatus management method of a hub apparatus according to an embodiment of the present disclosure may include providing a peripheral apparatus control tool to an external apparatus (S2100), establishing a first websocket channel (S2200), acquiring peripheral apparatus management data (S2300), and registering an identified peripheral apparatus in a peripheral apparatus database (S2400). When the peripheral apparatus is registered in the database, the peripheral apparatus may be controlled by control data transmitted from the hub apparatus.

The hub apparatus providing a peripheral apparatus control tool (S2100) may denote that the hub apparatus provides a web application for controlling the peripheral apparatus to the external apparatus.

The hub apparatus establishing a first websocket channel (S2200) may denote that the hub apparatus establishes the first web socket channel with the peripheral apparatus control tool provided to the external apparatus.

The hub apparatus acquiring peripheral apparatus management data (S2300) may denote that the hub apparatus acquires peripheral apparatus management data including peripheral apparatus identification information for identifying a peripheral apparatus connectable with the hub apparatus and peripheral apparatus registration information for connecting to the peripheral apparatus and registering the peripheral apparatus from the peripheral apparatus control tool provided to the external apparatus through the first websocket channel. The peripheral apparatus identification information may be a network IP address of the peripheral apparatus. The peripheral apparatus identification information may be information regarding a port to which the peripheral apparatus is connected. The peripheral apparatus identification information may be information regarding a function executable by the peripheral apparatus.

The hub apparatus registering an identified peripheral apparatus in a peripheral apparatus database (S2400) may denote that the hub apparatus registers a peripheral apparatus identified on the basis of the peripheral apparatus identification information in a peripheral apparatus database provided in advance together with the peripheral apparatus management data.

The registering of the peripheral apparatus in the peripheral apparatus database may include matching identification information of the peripheral apparatus to any one of a command format specific to the peripheral apparatus for controlling the peripheral apparatus and an environmental setting value of the peripheral apparatus and registering the matched identification information in the peripheral apparatus database.

Figure 12:
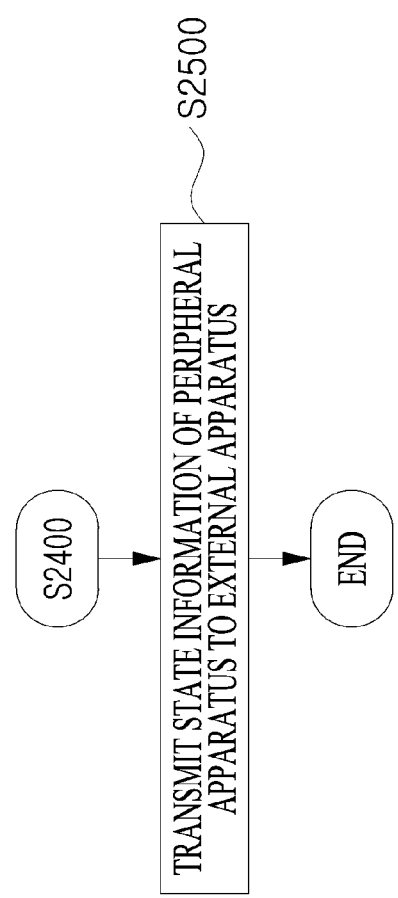
FIG. 12 is a flowchart showing a peripheral apparatus management method according to another embodiment of the present disclosure.

FIG. 12 is a flowchart showing a peripheral apparatus management method according to another embodiment of the present disclosure. Referring to FIG. 12, the peripheral apparatus management method according to an embodiment of the present disclosure may further include transmitting state information of the peripheral apparatus to the external apparatus (S2500) after the registering of an identified peripheral apparatus in a peripheral apparatus database (2400).

The transmitting of state information of the peripheral apparatus to the external apparatus (S2500) may denote registering the peripheral apparatus and transmitting state information of the registered peripheral apparatus such as a network connection state, executable function information, and the presence of an operation being performed to the external apparatus.

Figure 13:
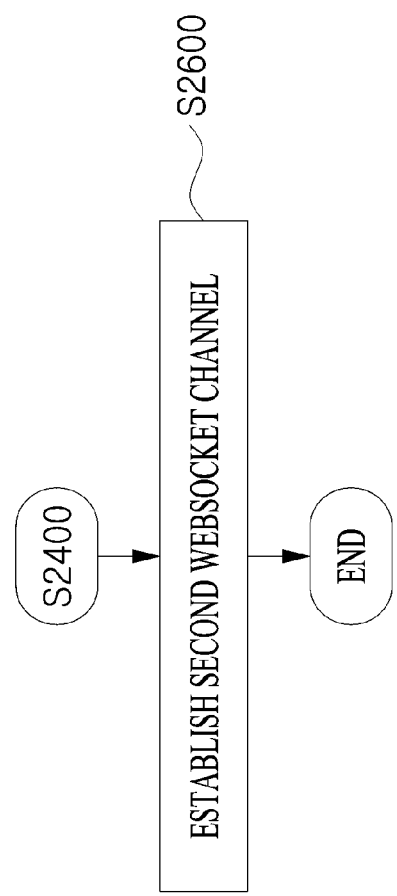
FIG. 13 is a flowchart showing a peripheral apparatus management method according to another embodiment of the present disclosure.

FIG. 13 is a flowchart showing a peripheral apparatus management method according to another embodiment of the present disclosure. Referring to FIG. 13, the peripheral apparatus management method according to an embodiment of the present disclosure may further include establishing a second websocket channel with the external apparatus (S2600) after the registering of an identified peripheral apparatus in a peripheral apparatus database (2400). The peripheral apparatus management method may establish the second websocket channel in addition to the first websocket channel.

When control data for controlling the registered peripheral apparatus is generated by the external apparatus, the second websocket channel may acquire the control data from the external apparatus.

The second websocket channel may be interrupted when a predetermined event associated with the acquisition of the control data occurs. In this case, the predetermined event may be an event in which the acquisition of the control data is complete.

Figure 14:
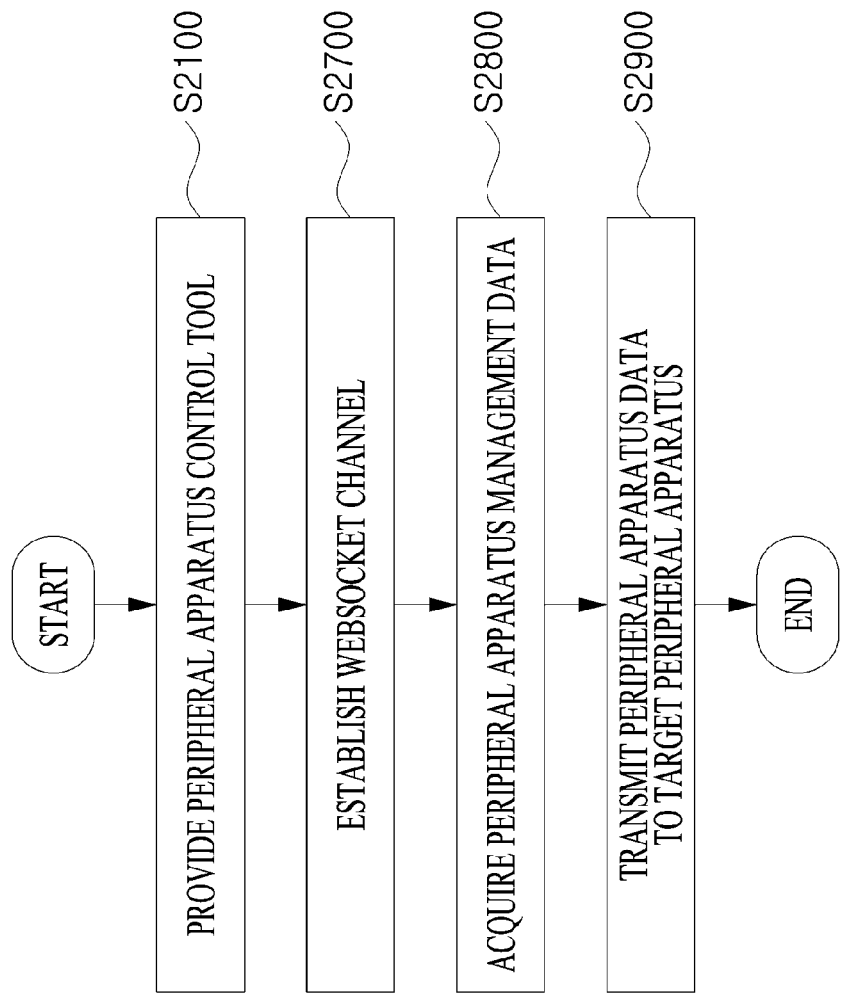
FIG. 14 is a flowchart illustrating a peripheral apparatus management method according to still another embodiment of the present disclosure.

FIG. 14 is a flowchart illustrating a peripheral apparatus management method according to still another embodiment of the present disclosure. Referring to FIG. 14, a peripheral apparatus management method of a hub apparatus may include providing a peripheral apparatus control tool to an external apparatus (S2100), establishing a websocket channel for communicating with the peripheral apparatus control tool provided to the external apparatus (S2700), acquiring peripheral apparatus data (S2800), and transmitting the peripheral apparatus data to a target peripheral apparatus (S2900).

The hub apparatus acquiring peripheral apparatus data (S2800) may denote that the hub apparatus acquires peripheral apparatus control data including peripheral apparatus selection information for selecting at least one peripheral apparatus connected to the hub apparatus and control command information for controlling the selected peripheral apparatus from the peripheral apparatus control tool provided to the external apparatus through the websocket channel. The control command information may denote to a command information for targeting and controlling the selected peripheral apparatus. In other words, The control command information may denote to a command information for controlling the selected peripheral apparatus as a target peripheral apparatus.

In this case, the control command information may be generated by the external apparatus and may have a format interpretable by the target peripheral apparatus. The control command information may be transmitted from the hub apparatus to the target peripheral apparatus without format conversion. The control command information may have a command format specific to the target peripheral apparatus and may be interpreted by the target peripheral apparatus without format conversion.

The hub apparatus transmitting the peripheral apparatus data to a target peripheral apparatus (S2900) may denote that the hub apparatus determines the target peripheral apparatus on the basis of the peripheral apparatus selection information and transmits the peripheral apparatus control data to the determined target peripheral apparatus.

The determining of the target peripheral apparatus on the basis of the peripheral apparatus selection information may include acquiring peripheral apparatus registration information corresponding to the peripheral apparatus selection information from a peripheral apparatus database, which is provided in advance in the hub apparatus and that includes identification information of at least one peripheral apparatus connected to the hub apparatus, and determining an address to which the control data from the peripheral apparatus registration information is to be transmitted.

The determining of the target peripheral apparatus on the basis of the peripheral apparatus selection information may denote acquiring an apparatus characteristic condition required for an apparatus to which the peripheral apparatus control data from the peripheral apparatus selection information is to be transmitted and determining a peripheral apparatus satisfying the apparatus characteristic condition from among peripheral apparatuses connected to the hub apparatus as the target peripheral apparatus.

In this case, the characteristic condition may include a printing characteristic of the apparatus, and the peripheral apparatus satisfying the characteristic condition may refer to a peripheral printing apparatus satisfying the printing characteristic. More specifically, the characteristic condition may refer to a printing attribute condition of the printing apparatus, such as a printable paper type, a printable paper size, a printable font, and a printable color.

The characteristic condition may be a condition for a function executable by the apparatus. The characteristic condition may be a condition for executability of a printing operation, a voice output operation, an image display operation, a user input acquisition operation, etc. of the apparatus.

According to an embodiment of the present disclosure, the hub apparatus may include a communication unit, a memory unit, and a control unit.

The hub apparatus may have the communication unit to transmit the control data to the outside or acquire state data from the outside by means of the communication unit.

The hub apparatus may have the memory unit to store data.

The control unit may perform the above-described apparatus management. The control unit may establish a communication channel with an external apparatus by means of the communication unit, acquire control data from the external apparatus by means of the communication unit, and control the peripheral apparatus on the basis of the control data by means of the communication unit.

The control unit may provide a peripheral apparatus control tool to an external apparatus, The control unit may store peripheral apparatus database including peripheral apparatus management data for identifying and registering the peripheral apparatus by means of the memory unit. The control unit may acquire the peripheral apparatus control data from the external apparatus by means of the communication unit. The control unit may determine a target peripheral apparatus to which the peripheral apparatus control data is to be transmitted by means of the database. The control unit may transmit the peripheral apparatus control data to the target peripheral apparatus by means of the communication unit.

The peripheral apparatus management data may include peripheral apparatus identification information for identifying a peripheral apparatus connected to the hub apparatus and peripheral apparatus registration information for registering the peripheral apparatus.

In this case, the peripheral apparatus control data may include peripheral apparatus identification information for identifying at least one peripheral apparatus and control command information for controlling the identified peripheral apparatus as a target peripheral apparatus. The control command information may be transmitted from the hub apparatus to the target peripheral apparatus without format conversion.

According to an embodiment of the present disclosure, the hub apparatus may optionally include a server unit. The server unit may have a web server to provide a control tool to the external apparatus. The providing of a control tool to the external apparatus may be implemented by the external apparatus providing a web page, a web application, etc. to control the peripheral apparatus.

In this case, the control unit may provide a peripheral apparatus control tool to the external apparatus by means of the server unit.

3.4.3.3 Operation of Peripheral Apparatus

The apparatus management method according to an embodiment of the present disclosure may be performed by a peripheral apparatus. The peripheral apparatus may be a secondary printing apparatus. In the above-described POS system, the peripheral apparatus may be a POS peripheral apparatus, such as a card reader, a barcode reader, etc. The peripheral apparatus may be a secondary printing apparatus placed at a sales office to which the POS system is applied.

According to an embodiment of the present disclosure, an apparatus management method of the peripheral apparatus may include acquiring control data from the external apparatus and transmitting a response message to the external apparatus.

The control data may be operational control data for controlling operation of the peripheral apparatus. The control data may be print data for controlling a printing operation.

The response message may include state data. The state data may indicate a change in operational state of the peripheral apparatus due to the control data.

According to an embodiment of the present disclosure, the peripheral apparatus may include a communication unit and a control unit.

The communication unit may communicate with an external apparatus.

The control unit may acquire control data from the external apparatus by means of the communication unit. The control unit may transmit state data to the external apparatus by means of the communication unit.

3.4.3.4 Operation of Server Apparatus

The apparatus management method according to an embodiment of the present disclosure may be performed by a server apparatus.

According to an embodiment of the present disclosure, an apparatus management method of the server apparatus may include acquiring a control tool request signal from a control apparatus and providing the control tool to the control apparatus.

The server apparatus may have a communication unit to communicate with the control apparatus.

The server apparatus may have a server unit to provide a control tool by which the control apparatus controls other apparatuses. The server unit providing a control tool may be understood as the server unit providing a web server configured to provide a web application functioning as the control tool.

The control tool may acquire a control command and transmit the control command to an apparatus to which the control command is applied.

3.5 Embodiment of Communication Channel Management

According to an embodiment of the present disclosure, a websocket channel established between a control apparatus and a printing apparatus may be handled differently depending on processed data.

Specifically, when data processed by the websocket channel is print data relevant to a printing operation, whether establishment of the websocket channel is maintained may be determined by conditions associated with communication of the print data. When the data processed by the websocket channel is control data irrelevant to a printing operation, an establishment duration time of the websocket channel may be determined regardless of transmission and reception of the control data.

According to an embodiment of the present disclosure, a plurality of websocket channels may be established between the control apparatus and the printing apparatus. The plurality of websocket channels may include a first websocket channel and a second websocket channel. The first websocket channel and the second websocket channel may be determined to handle different types of data handled thereby.

According to an embodiment of the present disclosure, the first websocket channel may be a communication channel for handling print data so that the printing apparatus or a secondary printing apparatus connected to the printing apparatus performs a printing operation. The first websocket channel may be interrupted when a predetermined condition associated with the reception or transmission of the print data is satisfied.

In this embodiment, the second websocket channel may be a communication channel for handling data for changing or indicating a state of the printing apparatus or the secondary printing apparatus. For example, the second websocket channel may handle state data that changes an on/off state, a network connection state, an operation state, or the like of the printing apparatus or the secondary printing apparatus. The second websocket channel may indicate a change in the any of above-mentioned states. The second websocket channel may be set to prevent data communication from being interrupted and perform continuous data communication. In some cases, an establishment duration time of the second websocket channel may be controlled on the basis of a predetermined condition. For example, a channel duration time may be controlled when transmission or reception of the data handled through the second websocket channel is complete.

The duration time of the first websocket channel and the second websocket channel may be both controlled on the basis of a predetermined condition. The condition on which the duration time of the first websocket channel depending and the condition on which the duration time of the second websocket channel depending may be implemented differently.

However, the data transmitted and received through the second websocket channel is not limited to the above-described state data. It should be appreciated that all data except for the print data handled by the first websocket channel may be handled by the second websocket channel.

According to another embodiment, the first websocket channel may be established to perform communication of data relevant to the printing apparatus. In this case, the second websocket channel may be established to perform communication of data relevant to a peripheral apparatus of the printing apparatus. Here, data relevant to a predetermined apparatus may refer to data of which a final destination is the apparatus.

According to still another embodiment, a first websocket channel and a second websocket channel may be established between the printing apparatus and the control apparatus, and the first websocket channel may be used only for communication of print data. In other words, a channel through which print data is requested and a channel through which print data is transmitted may be distinguished from each other. In this case, the print data may be requested through the second websocket channel and may be transmitted through the first websocket channel in response to the request through the second websocket channel. More specifically, when the control apparatus is requested by the printing apparatus to provide print data through the second websocket channel, the first websocket channel may be established. In this case, the control apparatus may transmit the print data to the printing apparatus through the first websocket channel. Here, the first websocket channel may be established by the control apparatus or the printing apparatus. The control apparatus may determine whether there is print data to be transmitted to the printing apparatus and may initiate the establishment of the first websocket channel when there is print data to be transmitted to the printing apparatus. Alternatively, when the printing apparatus requests the control apparatus to provide the print data through the second websocket channel, the control apparatus may initiate the establishment of the first websocket channel in response to the request for the print data. The printing apparatus may receive a message indicating that the print data can be transmitted from the control apparatus through the second websocket channel and initiate the establishment of the first websocket channel in response to the reception.

When a channel through which print data is requested and a channel through which print data is transmitted are separately established as described in the above embodiment, a websocket channel through which print data is transmitted may be established only when the print data is required to be transmitted. Thus, it is possible to prevent waste resources due to unnecessary establishment of a communication channel. Also, the second websocket channel may be maintained regardless of transmission of print data so that the control apparatus may quickly respond to a request for the print data through the second websocket channel.

A websocket channel management method of a printing apparatus according to an embodiment of the present disclosure may include establishing a first websocket channel and a second websocket channel for communicating with an external apparatus, acquiring print data for controlling a printing operation of the printing apparatus from the external apparatus through the first websocket channel, acquiring control data for controlling a state of the printing apparatus from the external apparatus through the second websocket channel, and restricting a channel duration time of the first websocket channel.

The control data may include peripheral apparatus registration information so that the printing apparatus may control a peripheral apparatus connected to the printing apparatus.

The restricting of the channel duration time of the first websocket channel may include determining a closing time of the first websocket channel. The restricting of the channel duration time of the first websocket channel may include interrupting the first websocket channel within a predetermined time period after the print data is acquired.

Figure 15:
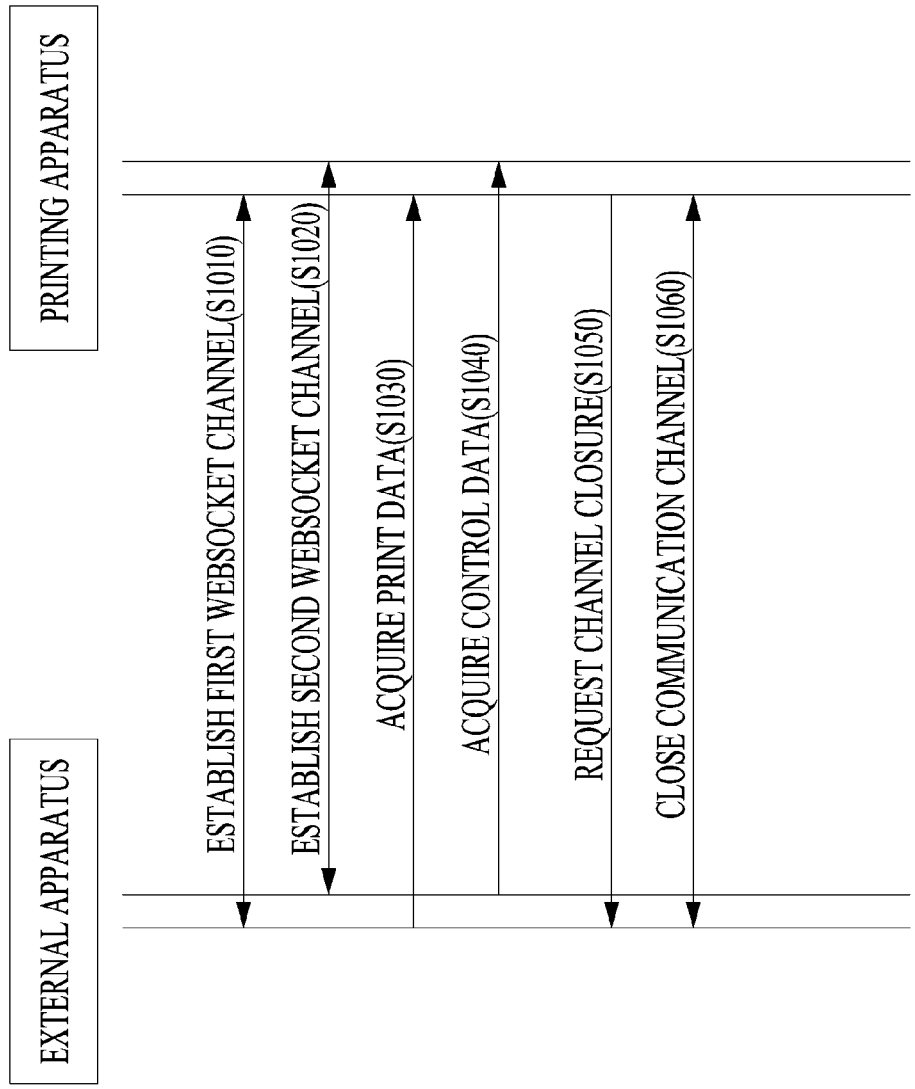
FIG. 15 shows a flowchart illustrating a websocket channel management method in detail according to an embodiment of the present disclosure.

FIG. 15 shows a flowchart illustrating a websocket channel management method in detail according to an embodiment of the present disclosure. Referring to FIG. 15, the websocket channel management method of the printing apparatus according to an embodiment of the present disclosure may include establishing a first websocket channel for communicating with an external apparatus (S1010), establishing a second websocket channel for communicating with the external apparatus (S1020), acquiring print data from the external apparatus through the first websocket channel (S1030), acquiring control data from the external apparatus through the second websocket channel (S1040), transmitting a request for closing the first websocket channel to the external apparatus (S1050), and closing the first websocket channel (S1060). The external apparatus may be the external control apparatus described herein.

4. Second Process: Online Order Printing 4.1 Performing Printing Operation According to Second Process As another example of the printing process disclosed herein, a system, method, and apparatus for performing a printing operation using the above-described communication channel will be described below. Specifically, a system, method, and apparatus for acquiring data allocated to an apparatus using the websocket communication channel will be described below.

A printing method according to the second process may be implemented by a server for storing print data to be printed. The server may collect print data from a plurality of printing consumer and appropriately allocate and transfer the collected print data to a plurality of printing suppliers. Such a server serving as a stopping point of the print data is hereinafter referred to as a data distribution server. Data transferred from the printing consumer to the printing supplier by the data distribution server is not limited to the above-described print data and may be handled similarly to any data relevant to a printing operation.

The data distribution server may be a cloud server. In this case, the printing method according to the second process may be a cloud printing method. Here, the cloud server, which is designed by cloud computing, may refer to a type of server implemented to control applications or store files through a web browser or the like.

4.1.1 System 4.1.1.1 Third System

The printing method according to the present disclosure may be implemented by a third system including a user terminal, a data distribution server, and a printing apparatus. The third system may be understood as a POS system for processing data used for a product or service sale. In particular, the third system may be applied as an online order system when a physical area where a product or service is being sold is far away from a position where the product or the like is ordered and a consumer is purchasing the product or the like online. In this case, a POS system in which an online order is relayed by a data distribution server is hereinafter referred to as a cloud POS system.

Figure 16:
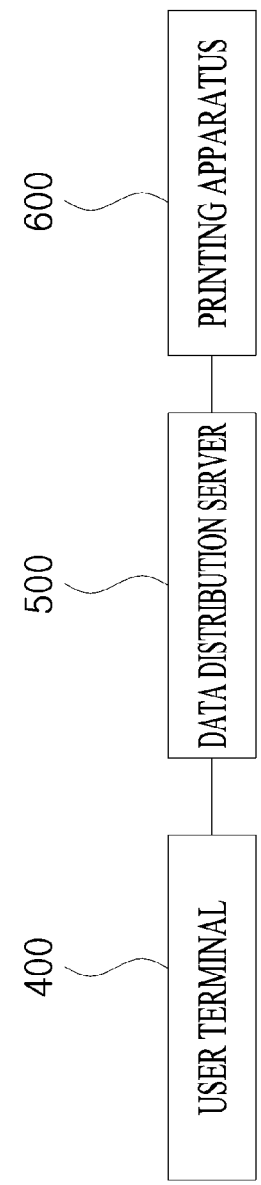
FIG. 16 briefly shows a third system according to an embodiment of the present disclosure.

FIG. 16 briefly shows a third system according to an embodiment of the present disclosure. Referring to FIG. 16, the third system may include a user terminal 400, a data distribution server 500, and a printing apparatus 600.

The user terminal 400 may receive information from a user. The user terminal 400 may generate data on the basis of the information received from the user.

The user terminal 400 may generate the data. The data may be print data. The data may include a control command written in a command format for controlling the printing apparatus 600. The data may include destination information understandable by the data distribution server 500. The data may include online order details. For example, the data may include identification information of a business provider that receives an order, identification information of a product or service ordered, etc. The data may include any one of the product or ordered service name, the business provider name, the store name in which the product or the service is provided and the store location.

The user terminal 400 may communicate with an external apparatus. The user terminal 400 may communicate with the data distribution server 500 to transmit data to the data distribution server 500.

In the above-described POS system, the user terminal 400 may be a user terminal 400 of a customer who wants to order a product or the like online.

The data distribution server 500 may communicate with an external apparatus. The data distribution server 500 may acquire data from the external apparatus or transmit data to the external apparatus. The data distribution server 500 may transmit data to the user terminal 400 or the printing apparatus 600.

The data distribution server 500 may establish a communication channel with the external apparatus. The data distribution server 500 may establish a communication channel with the printing apparatus 600. The data distribution server 500 may establish a communication channel with a plurality of external apparatuses.

The data distribution server 500 may store data acquired from the outside. The data distribution server 500 may store data acquired from the user terminal 400 or the printing apparatus 600. The data distribution server 500 may acquire data from a plurality of user terminals 400 or the printing apparatus 600 and store the acquired data.

The data distribution server 500 may distribute the data. The data distribution server 500 may determine an external apparatus to which the acquired data is to be transmitted and may transmit the data to the determined external apparatus.

The data distribution server 500 may establish a communication channel with the plurality of external apparatuses and may transmit the acquired data to some of the plurality of external apparatuses.

In some cases, the data distribution server 500 may process the data. The data distribution server 500 may relay the data to the external apparatus without processing the data. The data distribution server 500 may perform format conversion on the acquired data or modify or combine the acquired data.

In the above-described online order system, the data distribution server 500 may be understood as a cloud server configured to acquire data such as an order list from the user terminal of the customer and transfer the acquired data to each shop. In the above-described online order system, the data distribution server 500 may acquire data from the plurality of user terminals 400 and may be connected with a plurality of printing apparatuses 600 to distribute the acquired data.

The printing apparatus 600 may establish a communication channel with an external apparatus. The printing apparatus 600 may establish a communication channel with the data distribution server 500.

The printing apparatus 600 may request data from the external apparatus. The printing apparatus 600 may request print data from the data distribution server 500.

The printing apparatus 600 may acquire data from the external apparatus or transmit data to the external apparatus. The printing apparatus 600 may acquire data from the data distribution server 500 or transmit data to the data distribution server 500.

The printing apparatus 600 may perform a printing operation. The printing apparatus 600 may perform a printing operation on the basis of the data acquired from the external apparatus. The printing apparatus 600 may be handled similarly to the printing apparatus described in the first process, unless specially stated otherwise.

Figure 17:
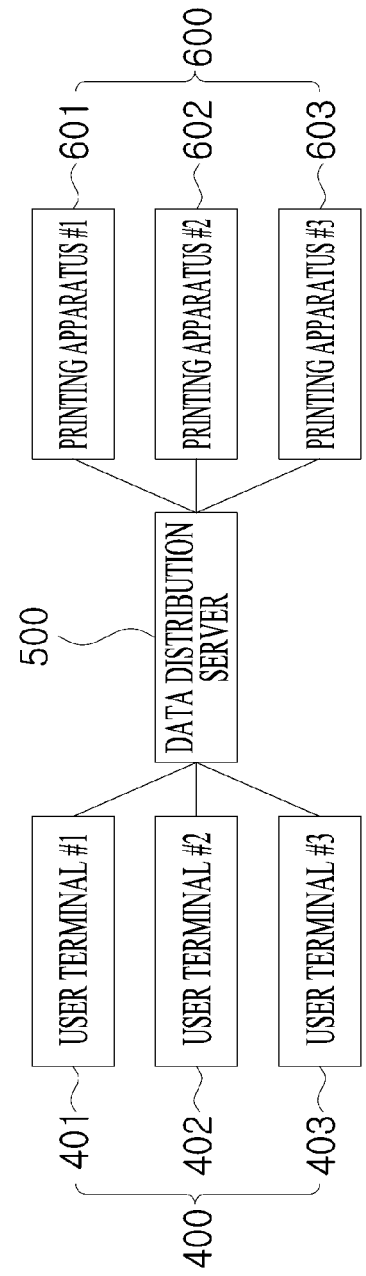
FIG. 17 briefly shows a third system according to another embodiment of the present disclosure.

FIG. 17 briefly shows a third system according to another embodiment of the present disclosure. Referring to FIG. 17, the third system may include a plurality of user terminals 400, a data distribution server 500, and a plurality of printing apparatuses 600.

The third system may include a plurality of user terminals. The plurality of user terminals 400 may include a first user terminal 401, a second user terminal 402, and a third user terminal 403.

The first user terminal 401 and the second user terminal 402 may communicate with the data distribution server 500. The first user terminal 401 and the second user terminal 402 may transmit data to the data distribution server 500.

The data distribution server 500 may store data acquired from the first user terminal 401 and the second user terminal 402. The data distribution server 500 may store data acquired from the first user terminal 401 together with identification information of the first user terminal 401. The data distribution server 500 may store data acquired from the second user terminal 402 together with identification information of the second user terminal 402.

The plurality of printing apparatuses 600 may include a first printing apparatus 601, a second printing apparatus 602, and a third printing apparatus 603.

The first printing apparatus 601 and the second printing apparatus 602 may communicate with the data distribution server 500. The first printing apparatus 601 and the second printing apparatus 602 may establish a websocket communication channel with the data distribution server 500. The data distribution server 500 may distribute the data acquired from the plurality of user terminals 400 to the plurality of printing apparatuses 600. The data distribution server 500 may transmit data allocated to the first printing apparatus 601 to the first printing apparatus 601. The data distribution server 500 may transmit data allocated to the second printing apparatus 602 to the second printing apparatus 602.

4.1.1.2 Fourth System

The third system has been described above as including a user terminal, a data distribution server, and a printing apparatus, but may further include a peripheral apparatus, for example, a secondary printing apparatus, which is connected to the printing apparatus. Hereinafter, the third system further including the peripheral apparatus will be referred to as a fourth system. A printing method implemented by the fourth system is a little different from the printing method implemented by the third system, but rather can be easily inferred from the description of the first printing process by those skilled in the art.

4.1.2 System Operation

Here, a method of the above-described third system and fourth system performing a printing operation according to a second printing process will be described. However, the printing operation according to the second printing process may be implemented not only by the third system and the fourth system, but may be applied to a system to which another apparatus is added or from which some apparatuses are removed.

4.1.2.1 Operation of Third System

The second printing process described herein may be performed by the above-described third system. The second printing process of the third system may include transmitting, by a user terminal, data to a data distribution server, determining, by the data distribution server, a printing apparatus to which the data is to be transmitted, and transferring, by the data distribution server, the data to the determined printing apparatus.

The user terminal may transmit data to a data distribution server over a network such as a public Internet network, a private network, a wide area Internet network, or the like. The user terminal transmitting data to a data distribution server may denote that the user terminal transmits print data for printing online order details.

The data distribution server determining a printing apparatus to which the data is to be transmitted may denote that the data distribution server acquires reference information included in the data and performs the determination in consideration of the reference information. For example, the reference information may be identification information of a printing apparatus to which the data is to be acquired.

The data distribution server may transmit the data to the determined printing apparatus. The data server may establish a websocket channel with the printing apparatus and may transmit the data to the printing apparatus through the websocket channel.

4.1.2.2 Operation of Fourth System

The second printing process described herein may be performed by the above-described fourth system. The second printing process of the fourth system may include transmitting, by a user terminal, data to a data distribution server, identifying, by the data distribution server, the data, transferring, by the data distribution server, the data to a printing apparatus, and transferring, by the printing apparatus, the data to a peripheral apparatus or a secondary printing apparatus.

The second printing process of the fourth system may be carried out almost similarly to the above described printing process of the third system. An example of differences between the second printing process of the fourth system and the printing process of the third system will be described below.

For the second printing process of the fourth system, the data distribution server may consider the peripheral apparatus when the data distribution server determines a destination to which the data is to be transmitted. Also, the data transmitted to the printing apparatus may be ultimately transmitted to the peripheral apparatus.

4.1.3 Operation of Each Apparatus

Here, the apparatuses constituting the above-described third system and fourth system and operation performed by the apparatuses will be described. However, the printing method or the like of the present disclosure is performed not only by the apparatuses, which will be described below, but each of the apparatuses may be replaced with other electronic apparatuses for performing a function thereof, similar functions, or a combination thereof.

4.1.3.1 Operation of User Terminal

According to the present disclosure, a user terminal may acquire an order list from a user and transmit order information acquired from the order list to a server. In other words, the user terminal may be understood as acquiring an online order list from the user and transmitting the acquired online order list to an intermediate server configured to collect data.

According to an embodiment of the present disclosure, the data may be processed by the user terminal. The user terminal processing the data may include receiving information from the user, generating data on the basis of the information, and transmitting the data to an external apparatus.

The user terminal may acquire user input information from the user. The user terminal may acquire identification information of a printing apparatus to be controlled from the user. The user terminal may acquire order information such as an ordered item, a payment method, and a shipping address from the user. The user terminal may acquire control information for controlling the printing apparatus, which will be described below, from the user.

The user terminal may generate data. The user terminal may generate data on the basis of the acquired user input information.

The user terminal may generate print data in consideration of order information received from the user. The user terminal may generate print data in a format interpretable by a printing apparatus, which will be described below. The user terminal may generate control data for controlling the printing apparatus in a command format of the printing apparatus on the basis of control information for controlling the printing apparatus.

The user terminal may transmit the data to an external apparatus. The user terminal may transmit the print data or the control data to the external apparatus.

Figure 18:
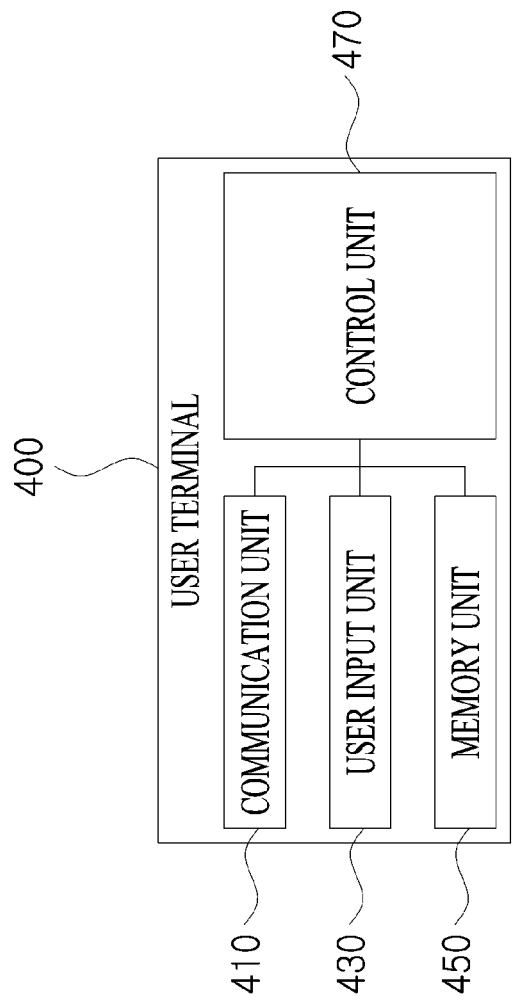
FIG. 18 briefly shows a user terminal according to an embodiment of the present disclosure.

FIG. 18 briefly shows a user terminal according to an embodiment of the present disclosure. Referring to FIG. 18, the user terminal may include a communication unit 410, a user input unit 430, a memory unit 450, and a control unit 470. The user terminal may be an electronic apparatus in which a web browser or the like is executed. The user terminal may be a mobile terminal such as a smartphone, a tablet PC, a laptop, a desktop, a netbook, or the like. The user terminal may be implemented similarly to the above-described external control apparatus.

The communication unit 410 may communicate with an external apparatus. The communication unit 410 may communicate with the data distribution server to acquire data from the server or transmit data to the server. The communication unit 410 may transmit order information to the data distribution sever. The communication unit 410 may acquire order result information from the data distribution server.

The user input unit 430 may acquire a user input. The user input unit 430 may receive order details from a user. The user input unit 430 may acquire user input information from the user.

The control unit 470 may perform the above-described data processing by means of the communication unit 410 and the user input unit 430. The control unit 470 may acquire the user input information from the user, generate the data, and transmit the data to the external apparatus.

4.1.3.2 Operation of Data Distribution Server

According to the present disclosure, a data distribution server may transfer data acquired from a user to an appropriate printing apparatus. Specifically, the data distribution server may be understood as acquiring online order information and relaying the acquired online order information to a POS printer located at an appropriate sales store so that the order information can be printed by the POS printer. However, according to the present disclosure, the handled data is not limited to data relevant to a printing operation, and thus data for changing settings of an apparatus or controlling operations except for printing may also be handled in a similar manner.

The data management according to an embodiment of the present disclosure may be performed by a server apparatus (i.e., the data distribution server). The data management performed by the data distribution server may include acquiring data from an external apparatus, determining a target apparatus to which the acquired data is to be transmitted, and transmitting the data to the target apparatus.

The data distribution server acquiring data from an external apparatus may denote that the data distribution server acquires data from a user terminal. The data distribution server may acquire data from a plurality of user terminals.

The data distribution server determining a target apparatus to which the acquired data is to be transmitted may denote that the data distribution server performs the determination in consideration of reference information included in the data. For example, the reference information may be any one of location information, a data format, a data type, and identification information of the target apparatus. As another example, the reference information may be destination information of the data, condition information of an apparatus controllable by the data, a type of the data, a format of the data, location information of an apparatus to which the data is transmitted, or the like. The location information may be acquired by means of global positioning system (GPS) module.

For example, the data may include location information. The data distribution server may transmit the data to a target apparatus matched to a corresponding location on the basis of the location information. As a detailed example, the data may include location information of the external apparatus to which the data is transmitted. The data distribution server may determine an apparatus having matching location information as the target apparatus in consideration of the location information of the external apparatus and may transmit the data to the target apparatus.

The data may have a format interpretable by the printing apparatus. The data may have a format usable by the printing apparatus without format conversion.

The data distribution server determining a target apparatus to which the data is to be transmitted may denote that the data distribution server determines the target apparatus from among a plurality of candidate apparatuses connected to the data distribution server. The data distribution server may determine the target apparatus using a database provided in advance. The database may store at least one of identification information, characteristic information, and location information of the plurality of candidate apparatuses.

The data distribution server may determine the target apparatus to which the data is to be transmitted in consideration of reference information acquired from the data and with reference to a database in which information of the candidate apparatuses are stored.

When the data distribution server determines the target apparatus to which the data is to be transmitted, the correspondence relationship of the data and the target apparatus may be flexible.

When first data and second data are acquired, the data distribution server may transmit the first data to a first target apparatus and transmit the second data to a second target apparatus, thus achieving a stable matching between the pieces of data and the apparatuses. Alternatively, the data distribution server may determine that the first data corresponds to both of the first target apparatus and the second target apparatus and transmit the data to an apparatus requesting the data first, which is one of the first target apparatus and the second target apparatus.

The data distribution server transmitting the data to the target apparatus may denote that the data distribution server establishes a websocket communication channel with the target apparatus and transmits the data through the websocket communication channel. When the websocket communication channel is established between the data distribution server and the target apparatus, the data distribution server may transmit the data to the target apparatus within a predetermined time period after the communication channel is established.

The data distribution server transmitting the data to the target apparatus may denote that the data distribution server transmits the data in response to a request originating from the target apparatus. When data matched to the target apparatus is requested by the target apparatus, the data distribution server may transmit the data matched to the target apparatus to the target apparatus.

A data management method according to an embodiment of the present disclosure may include acquiring first print data and second print data, establishing a first websocket channel with a first apparatus and transmitting first print data matched to the first apparatus to the first apparatus through the first websocket channel when print data is requested by the first apparatus through the first websocket channel, and establishing a second websocket channel with a second apparatus and transmitting second print data matched to the second apparatus to the second apparatus through the second websocket channel when print data is requested by the second apparatus through the second websocket channel. Here, each of the first apparatus and the second apparatus may be implemented as a printing apparatus, which will be described below in detail with reference to FIG. 19.

Figure 19:
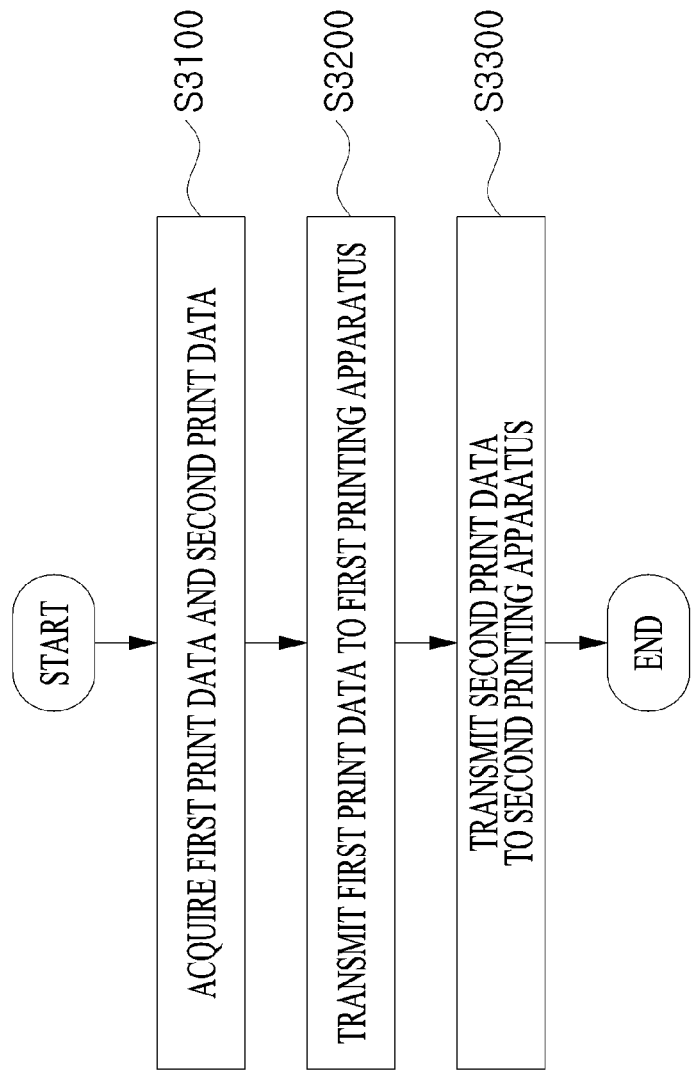
FIG. 19 is a flowchart illustrating a data management method according to an embodiment of the present disclosure.

FIG. 19 is a flowchart illustrating a data management method according to an embodiment of the present disclosure. Referring to FIG. 19, the data management method of the server apparatus may include acquiring first print data and second print data (S3100), transmitting the first print data to a first printing apparatus (S3200), and transmitting the second print data to a second printing apparatus (S3300).

The first print data and the second print data may include different identification information.

The server apparatus transmitting the first print data to a first printing apparatus (S3200) may denote that the server apparatus establishes a first websocket channel with the first printing apparatus and transmits first print data matched to the first printing apparatus to the first printing apparatus through the first websocket channel when print data is requested by the first printing apparatus through the first websocket channel.

The server apparatus transmitting the second print data to a second printing apparatus (S3300) may denote that the server apparatus establishes a second websocket channel with the second printing apparatus and transmits second print data matched to the second printing apparatus to the second printing apparatus through the second websocket channel when print data is requested by the second printing apparatus through the second websocket channel.

In this case, the first print data may correspond to apparatus information of the first printing apparatus, and the second print data may correspond to apparatus information of the second printing apparatus. The first printing apparatus may satisfy a control condition of the first print data, and the second printing apparatus may satisfy a control condition of the second print data. A control condition of a data may refer to a condition need to be satisfied to be controlled by the data.

When the first print data is acquired at a first acquisition time point, the second print data is acquired at a second acquisition time point later than the first acquisition time point, and the second websocket channel is established earlier than the first websocket channel, the second print data may be transmitted to the second printing apparatus before the first print data is transmitted to the first printing apparatus.

When the first print data is acquired at a first acquisition time point, the second print data is acquired at a second acquisition time point later than the first acquisition time point, and requesting for print data through the second websocket channel is performed earlier than requesting for print data through the first websocket channel, the second print data may be transmitted to the second printing apparatus before the first print data is transmitted to the first printing apparatus.

The first print data may be repeatedly requested by the first printing apparatus according to a first request interval, and the second print data may be repeatedly requested by the second printing apparatus according to a second request interval.

When the first printing apparatus satisfies a control condition of the first print data, the first printing apparatus may operate on the basis of the first print data, and also a first control command included in the first print data may be understood by the first printing apparatus without format conversion. In other words, the first apparatus satisfies a control condition may denote that the first apparatus perform operation on the basis of the first print data and the first control command included in the first print data may be understood by the first printing apparatus without format conversion.

The apparatus information of the printing apparatus may include unique identification information of the printing apparatus, and print data corresponding to the printing apparatus may include unique identification information of the printing apparatus.

The apparatus information of the first printing apparatus may include apparatus information of a peripheral apparatus connected to the first printing apparatus, and the first print data may match a peripheral apparatus connected to the first printing apparatus.

The first print data may match a peripheral apparatus connected to the first printing apparatus. When print data is requested by the peripheral apparatus connected to the first printing apparatus through the websocket channel, the first print data may be transmitted to the first printing apparatus through the first websocket channel. The peripheral apparatus connected to the first printing apparatus may satisfy the control condition of the first print data. The first print data may correspond to the apparatus information of the peripheral apparatus connected to the first printing apparatus.

The first print data may correspond to both of the apparatus information of the first printing apparatus and the apparatus information of the second printing apparatus. The first websocket channel may be interrupted when a first duration time has elapsed after the first websocket channel is established. The second websocket channel may be interrupted when a second duration time shorter than the first duration time has elapsed after the second websocket channel is established. In this case, when the first websocket channel remains established and the second websocket channel is interrupted, the first print data may be transmitted to the first printing apparatus through the first websocket channel.

A data management method according to an embodiment of the present disclosure may include establishing a websocket channel with a server configured to store print data, periodically requesting print data from the server through the websocket channel, and acquiring print data matched to an apparatus from the server through the websocket channel Here, the apparatus may be implemented as a printing apparatus, which will be described below in detail with reference to FIG. 20.

Figure 20:
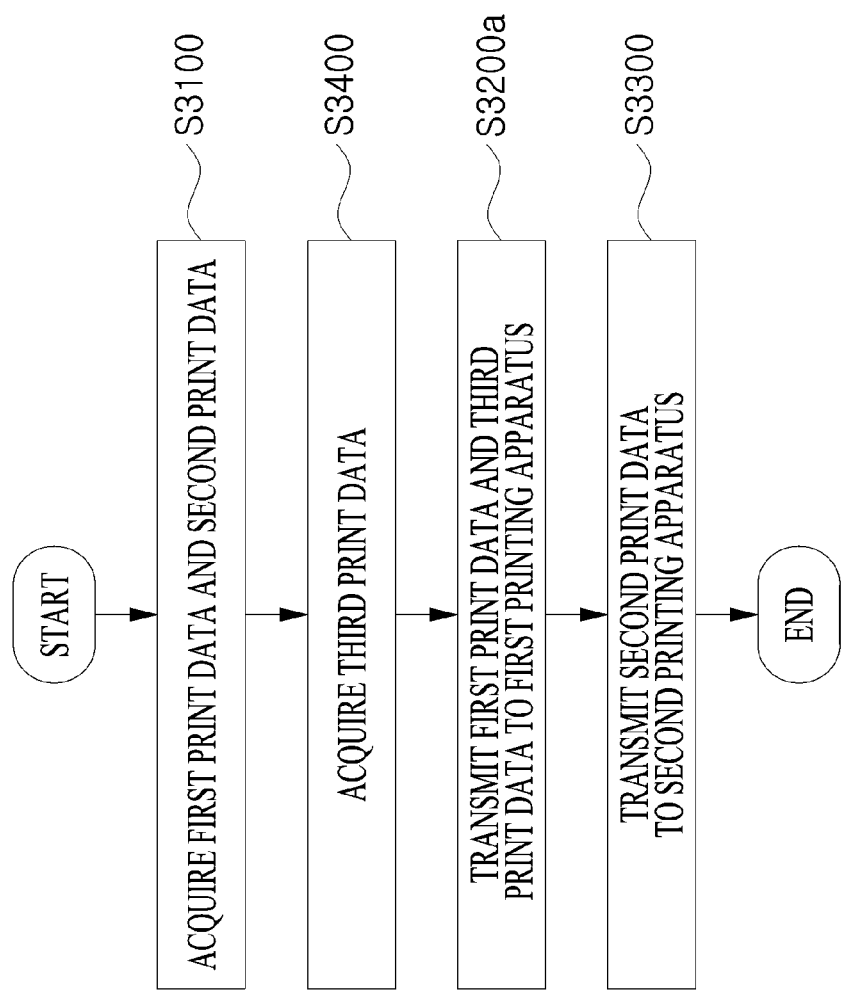
FIG. 20 is a flowchart illustrating a data management method according to an embodiment of the present disclosure.

FIG. 20 is a flowchart illustrating a data management method according to an embodiment of the present disclosure. Referring to FIG. 20, the data management method of the server apparatus, which has been described above with reference to FIG. 19, may further include acquiring third print data corresponding to the apparatus information of the first printing apparatus (S3400) after the acquiring of the first print data and the second print data and before the transmitting of the first print data to the first printing apparatus through the first websocket channel.

The transmitting of the first print data to a first printing apparatus (S3200) may include transmitting both of the first print data and the third print data to the first printing apparatus when the print data is requested through the first websocket channel (S3200a). The first printing apparatus may further satisfy a control condition of the third print data. When the third print data is acquired before the first print data is transmitted, the first print data and the second print data may be transmitted together to the first printing apparatus.

In this case, the transmitting of both of the first print data and the third print data to the first printing apparatus may denote that the server apparatus enables the first print data to have priority over the third print data so that a printing operation for the first print data is earlier performed than a printing operation for the third print data.

Figure 21:
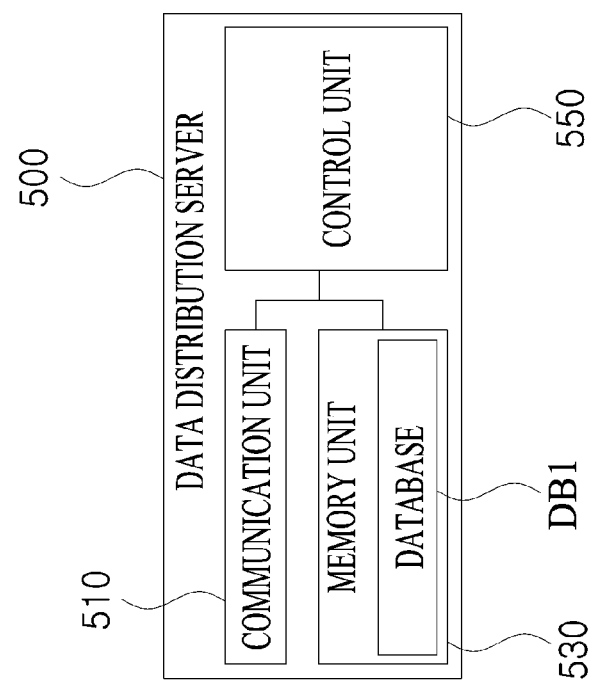
FIG. 21 briefly shows a data distribution server 500 according to an embodiment of the present disclosure.

FIG. 21 briefly shows a data distribution server 500 according to an embodiment of the present disclosure. Referring to FIG. 21, the data distribution server 500 according to an embodiment of the present disclosure may include a communication unit 510, a memory unit 530, and a control unit 550. The data distribution server 500 may be implemented as a cloud server configured to store a large amount of data and transfer the data to an appropriate position. In the above-described cloud POS system, the data distribution server 500 may be implemented as a cloud server configured to connect a customer with a sales system.

The data distribution server 500 may have the communication unit 510 to communicate with an external apparatus. The data distribution server 500 may acquire data and transfer the data to a target apparatus by means of the communication unit 510.

The data distribution server 500 may have the memory unit 530 to store data acquired from the external apparatus. The memory unit 530 may have a database DB1 for managing the external apparatus. The database DB1 may store identification information of an external apparatus, network connection information of an external apparatus, control environment information of an external apparatus, etc.

The data distribution server 500 may have the control unit 550 to perform the above-described data management by means of the communication unit 510 and the memory unit 530. The control unit 550 may acquire data from an external apparatus by means of the communication unit 510, determine a target apparatus to which the data is to be transmitted, and transmit the data to the target apparatus by means of the communication unit 510.

The control unit 550 may acquire first print data and second print data by means of the communication unit 510. The control unit 550 may establish a websocket channel between a first printing apparatus and a second printing apparatus by means of the communication unit 510. The control unit 550 may transmit the first print data, which matches the first printing apparatus, to the first printing apparatus through the websocket channel by means of the communication unit 510 when print data is requested by the first printing apparatus. The control unit 550 may transmit the second print data, which matches the second printing apparatus, to the second printing apparatus through the websocket channel by means of the communication unit 510 when print data is requested by the second printing apparatus.

The printing apparatus illustrated in the above embodiments may correspond to a hub apparatus configured to manage print data and any kind of data processing apparatus other than an apparatus configured to perform a printing operation.

4.1.3.3 Operation of Printing Apparatus

According to the present disclosure, a printing apparatus may perform a printing operation on the basis of data allocated thereto by a server. In the above-described cloud POS system, the printing apparatus may be a POS printer located in a sales store. In the cloud POS system, the printing apparatus may serve to transfer an online order list to the sales office.

A printing method according to an embodiment of the present disclosure may be performed by the printing apparatus. The printing method of the printing apparatus may include requesting data to an external apparatus, acquiring the data from the external apparatus, and performing a printing operation on the basis of the acquired data.

The printing apparatus requesting data from the external apparatus may denote that the printing apparatus requests data allocated to the printing apparatus from the external apparatus. The requesting of data may be performed through a websocket channel. The requesting of data allocated to the printing apparatus, performed by the printing apparatus, may comprise providing apparatus information of the printing apparatus and requesting data corresponding to the apparatus information. The apparatus information may include a location, a function, a state, identification information, or the like of the printing apparatus.

The printing apparatus may request the data repeatedly or periodically. An interval at which the printing apparatus requests data from the external apparatus may be changed. For example, the printing apparatus may request data according to a first interval during a first period and may request data according to a second interval during a second period. In this case, it is possible to prevent waste of resources due to frequent data requests by setting the second interval to be longer than the first interval. The printing apparatus may shorten the data request interval when the data is acquired. That is, the printing apparatus may change the data request interval in consideration of whether the data is acquired.

The printing apparatus requesting the data may denote that the printing apparatus establishes a communication channel with the external apparatus and requests the data. The printing apparatus may establish the communication channel with the external apparatus, request the data, and interrupt the communication channel when no data is acquired. The above-described data request interval may be a period of time for which the communication channel is established, interrupted, and then re-established when the communication channel is repeatedly established and interrupted.

A time of period for which the communication channel is established and then interrupted may be referred to as a duration time of the communication channel. The duration time of the communication channel may be remained constantly. The duration time of the communication channel may be changed. In this case, the duration time of the communication channel may change depending on a data communication environment such as the above-described data request interval.

The printing apparatus receiving the data from the external apparatus may denote that the printing apparatus requests data from the external apparatus and receives the data in response to a request for the data. The printing apparatus may acquire the data from the external apparatus through a websocket communication channel.

The printing apparatus acquiring the data from the external apparatus may denote that the printing apparatus acquires print data transmitted to the printing apparatus.

The printing apparatus performing a printing operation on the basis of the received data may denote that the printing apparatus performs a printing operation on the basis of print data transmitted to the printing apparatus, targeting the printing apparatus, by the external apparatus. The printing apparatus performing a printing operation on the basis of the received data may denote that the printing apparatus performs a printing operation according to a control command for the printing apparatus included in the received data without format conversion of the control command.

A data management method of the printing apparatus according to an embodiment of the present disclosure may include establishing a websocket channel with a server configured to store print data, periodically requesting print data from the server through the websocket channel, and acquiring print data matched to the printing apparatus from the server through the websocket channel in response to the request.

Here, the print data matched to the printing apparatus may correspond to apparatus information of the printing apparatus, and the printing apparatus may satisfy a control condition of the print data.

The requesting of print data may denote that the printing apparatus requests print data for controlling a peripheral apparatus connected to the print apparatus from the server in response to the peripheral apparatus requesting print data. The print data may correspond to apparatus information of the peripheral printing apparatus, and the peripheral printing apparatus may satisfy the control condition of the print data.

When the printing apparatus is a hub printing apparatus, a data management method of the hub printing apparatus may include receiving a request for data from a peripheral apparatus connected to the hub printing apparatus, requesting data from an external apparatus, requesting data allocated to the peripheral apparatus from the external apparatus, and acquiring the data allocated to the peripheral apparatus from the external apparatus.

The requesting of data allocated to the peripheral apparatus from the external apparatus may denote that the hub printing apparatus provides apparatus information of the peripheral apparatus and requests data corresponding to the apparatus information.

The data management method of the hub printing apparatus may include transferring the acquired data to the peripheral apparatus. The transferring of the acquired data to the peripheral apparatus may be performed with reference to destination information of the acquired data.

According to an embodiment of the present disclosure, there may be provided a data management apparatus including a communication unit, a printing unit, and a control unit configured to establish a websocket channel with a server configured to store print data by means of the communication unit, periodically request print data from the server through the websocket channel by means of the communication unit, and acquire print data corresponding to the apparatus from the server through the websocket channel by means of the communication unit in response to the request. According to an embodiment of the present disclosure, the data management apparatus, which is a print data management apparatus, may be implemented as a printing apparatus. This will be described below in detail with reference to FIG. 22.

Figure 22:
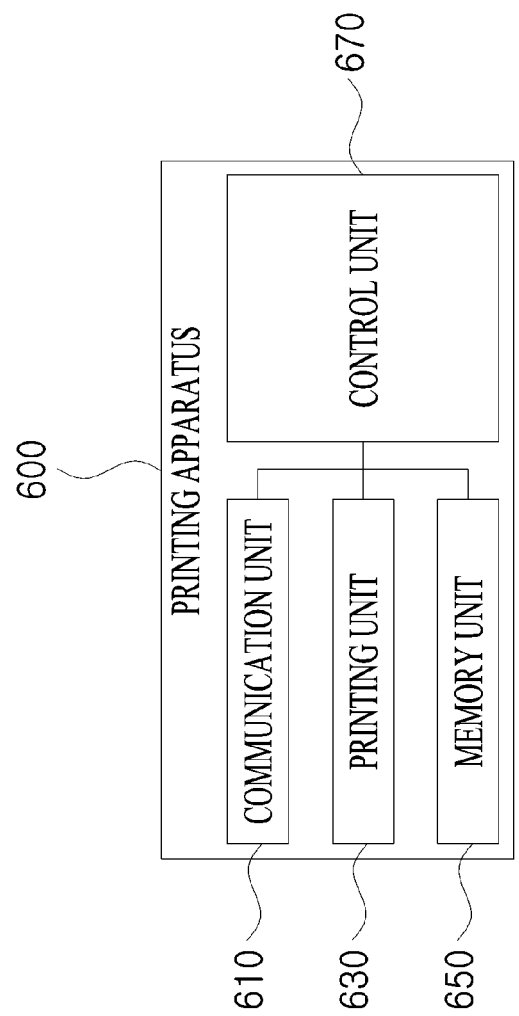
FIG. 22 shows a printing apparatus 600 according to an embodiment of the present disclosure.

FIG. 22 shows a printing apparatus 600 according to an embodiment of the present disclosure. Referring to FIG. 22, the printing apparatus 600 according to an embodiment of the present disclosure may include a communication unit 610, a printing unit 630, a memory unit 650, and a control unit 670.

The printing apparatus 600 may have the communication unit 610 to acquire data from an external apparatus or transmit data to the external apparatus. The communication unit 610 may acquire print data from the external apparatus.

The printing apparatus 600 may have the printing unit 630 to perform a printing operation. The printing unit 630 may perform the printing operation on the basis of the print data.

The memory unit 650 may store print data acquired from an external apparatus. The memory unit 650 may store connection information of an external apparatus, connection information of a peripheral apparatus connected to the printing apparatus 600, etc.

The printing apparatus 600 may have the control unit 670 to perform the above-described printing operation. The control unit 670 may acquire control data from an external apparatus by means of the communication unit 610 and may perform the printing operation on the basis of the control data by means of the printing unit 630.

The control unit 670 may establish a websocket channel with a server configured to store print data by means of the communication unit 610, periodically request print data from the server through the websocket channel by means of the communication unit 610, and acquire print data corresponding to the printing apparatus from the server through the websocket channel by means of the communication unit 610 in response to the request.

4.2 Establishment of Connection Channel

When a printing operation is performed according to the second process, there is an issue with respect to a process of establishing connection between the data distribution server and the printing apparatus. When the printing operation is performed according to the second process, a user is usually placed far from the data distribution server, and thus a general user other than a professional technician may have difficulty in establishing a connection channel between the printing apparatus and the data distribution server. A solution allowing a user to experience more convenient apparatus optimization will be described below.

4.2.1 Connection Process

When a data communication channel is intended to be established between a first apparatus and a second apparatus, the first apparatus may request that the second apparatus establishes a communication channel first. In this case, in order for the first apparatus to request the second apparatus to establish a channel, connection information of the second apparatus may be required. A channel manager may be used to provide the connection information of the second apparatus to the first apparatus.

The channel manager may acquire identification information of the first apparatus from the first apparatus. The channel manager may determine a second apparatus matched to the first apparatus using identification information of the first apparatus. The channel manager may transmit connection information of the second apparatus matched to the first apparatus to the first apparatus.

The first apparatus may be a printing apparatus, and the second apparatus may be a data distribution server. Alternatively, the first apparatus may be a data distribution server, and the first apparatus may be a printing apparatus.

4.2.2 System Operation

Here, a data management method for establishing a websocket channel between a printing apparatus and a data distribution server in order to perform a printing operation according to the second printing process of the present disclosure will be described.

According to an embodiment of the present disclosure, the data management for establishing the websocket channel may be performed by a communication channel management application configured to mediate between the data distribution server and the printing apparatus. The communication channel management application may be broadly understood as a concept that encompasses a web application, a program, a web page, a user interface, etc. for performing a communication channel management function, which will be described below as well as an application running on an operating system.

In order to establish the websocket channel between the printing apparatus and the data distribution server, the printing apparatus and the data distribution server may be required to recognize each other. To this end, information of the printing apparatus may be transmitted to the data distribution server, or information of the data distribution server may be transmitted to the printing apparatus. Embodiments in which the information of the printing apparatus may be transmitted to the data distribution server and in which the information of the data distribution server may be transmitted to the printing apparatus, in order to establish a communication channel between the printing apparatus and the data distribution server will be described below.

A data management method according to the present disclosure may include acquiring unique identification information of the printing apparatus, acquiring connection information of a data distribution server matched to the printing apparatus, and transmitting connection information of the data distribution server to the printing apparatus.

The acquiring of unique identification information of the printing apparatus may include acquiring shop identification information of a shop at which the printing apparatus is placed. For example, the shop identification information may include a name, an address, location information, a network IP address, or the like of the shop.

The unique identification information of the printing apparatus may include a unique serial number or the like assigned to the printing apparatus. When the printing apparatus is a hub printing apparatus, the unique identification information may be unique identification information assigned to a peripheral apparatus.

The acquiring of unique identification information of the printing apparatus may denote acquiring the unique identification information by performing wireless communication with the printing apparatus. The acquiring of unique identification information of the printing apparatus may denote acquiring the unique identification information by performing communication, such as Near Field Communication (NFC), WiFi communication, Radio-frequency identification (RFID) communication, and Bluetooth communication, with the printing apparatus. The acquiring of unique identification information of the printing apparatus may denote acquiring the unique identification information by performing communication after recognizing the printing apparatus and automatically establishing a communication connection with the printing device.

The acquiring of unique identification information of the printing apparatus may be performed by recognizing an identifier placed at the printing apparatus. For example, the acquiring of unique identification information of the printing apparatus may be performed by recognizing a mark image, such as a barcode and a QR code, attached to the printing apparatus.

The acquiring of connection information of a data distribution server matched to the printing apparatus may be performed using a database provided in advance. The database may be a database prestored in the data distribution server and configured to match connection information of a plurality of data distribution servers to characteristic information of the plurality of data distribution servers and store the matched connection information. The acquiring of connection information of a data distribution server using the database may denote determining a data distribution server corresponding to identification information of the printing apparatus from the database and acquiring connection information of the determined data distribution server.

The acquiring of connection information of a data distribution server matched to the printing apparatus may be performed by a separate manager application. The manager application may store connection information of at least one data distribution server and provide the stored connection information to the channel management apparatus if necessary. The manager application includes a program, a source code, or the like executed by a manager terminal.

The connection information of the data distribution server may be understood as information required to establish a websocket channel with the data distribution server. The connection information of the data distribution server may be information required to transmit a handshake message for establishing a websocket channel to the data distribution server. For example, the connection information of the data distribution server may be an IP address, a domain name, etc. of the data distribution server.

The transmitting of connection information of the data distribution server to the printing apparatus may denote transmitting the connection information over a local network, a wide area Internet network, or the like.

The data management method according to this embodiment may further include establishing, by the printing apparatus, a websocket channel with the data distribution server.

The data management method may further include transmitting, by the printing apparatus, a response message to the channel management application. The response message may have a purpose of indicating that the printing apparatus has acquired the connection information of the data distribution server. The response message may have a purpose of indicating that the printing apparatus establishes a websocket channel with the data distribution server.

In the data management method according to the present disclosure, as described above, the printing apparatus may send a communication channel signal to the data distribution server by transferring the information of the data distribution server to the printing apparatus. Alternatively, the data server may establish a communication channel by transferring the information of the printing apparatus to the data distribution server. An example in which the data distribution server acquires connection information of the printing apparatus and establishes a communication channel will be described below.

Another data management method according to the present disclosure may include acquiring connection information of a data distribution apparatus, acquiring unique identification information of a printing apparatus matched to the data distribution apparatus, and transmitting the unique identification information of the printing apparatus to the data distribution apparatus.

The acquiring of connection information of a data distribution apparatus may denote acquiring the connection information using a database provided in advance. The acquiring of connection information of a data distribution apparatus may denote acquiring the connection information from a manager terminal configured to manage a plurality of data distribution apparatuses or an application running on the manager terminal.

The acquiring of unique identification information of the printing apparatus may denote acquiring the unique identification information through the above-described communication channel management application. The acquiring of unique identification information of a printing apparatus may denote determining a printing apparatus corresponding to the data distribution apparatus using the database and transmitting unique identification information of the determined printing apparatus.

The transmitting of the unique identification information of the printing apparatus to the data distribution apparatus includes the data distribution apparatus transmitting network connection information required to establish a websocket communication channel with the printing apparatus.

Figure 23:
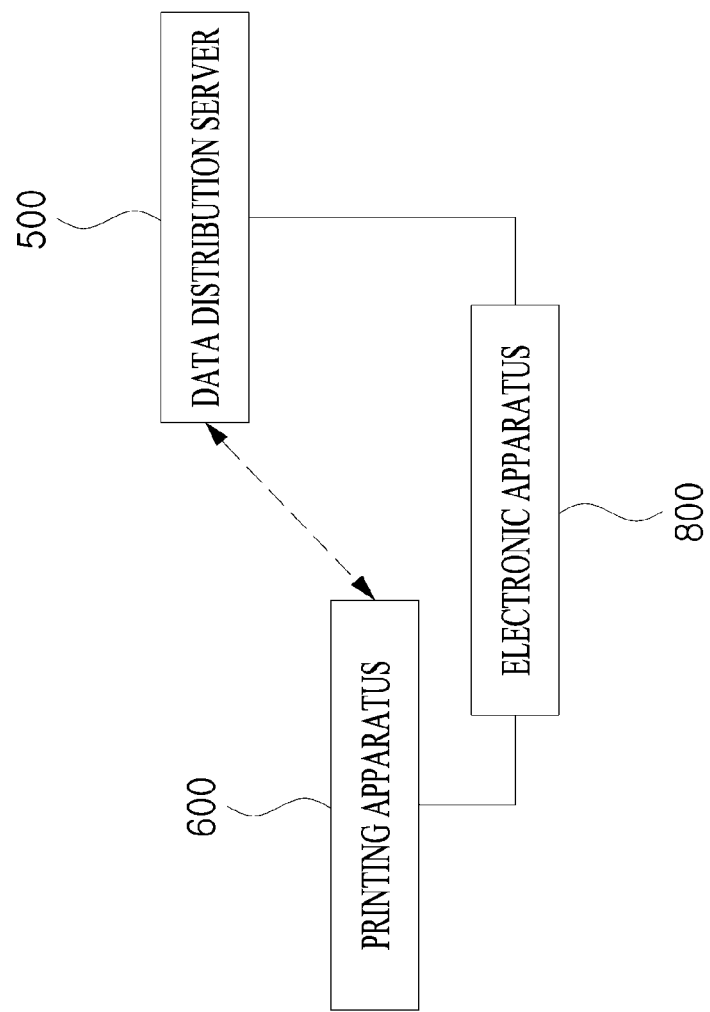
FIG. 23 shows a channel establishment system according to an embodiment of the present disclosure.

FIG. 23 shows a channel establishment system according to an embodiment of the present disclosure. The establishment of a communication channel according to an embodiment of the present disclosure may be performed by the channel establishment system shown in FIG. 23. Referring to FIG. 23, the channel establishment system according to an embodiment of the present disclosure may include a printing apparatus 600, a data distribution server 500, and an electronic apparatus 800.

The electronic apparatus 800 may be an apparatus on which the above-described communication channel management application is running. The electronic apparatus 800 may be an electronic apparatus controlled to perform a communication channel management function.

The electronic apparatus 800 may be connected to the printing apparatus 600 and the data distribution server 500 to mediate the establishment of a communication channel between the printing apparatus 600 and the data distribution server 500. The electronic apparatus 800 may assist in establishing a websocket communication channel between the printing apparatus 600 and the data distribution server 500.

4.2.3 Operation of Each Apparatus 4.2.3.1 Communication Channel Manager

A data management method according to the present disclosure, which is performed by the above-described communication channel manager, may include acquiring unique identification information of a printing apparatus, acquiring connection information of a data distribution server matched to the printing apparatus, and transmitting connection information of the data distribution server to the printing apparatus.

Another data management method of the above-described communication channel manager according to the present disclosure may include acquiring unique identification information of a data distribution server, acquiring connection information of a printing apparatus matched to the data distribution server, and transmitting connection information of the printing apparatus to the data distribution server.

The communication channel manager may acquire information associated with channel establishment from a user and provide channel related information to the user. The communication channel manager may be implemented as an application installed on a user terminal, a web application running on the user terminal, a user interface built in the printing apparatus, etc.

The communication channel manager may acquire identification information of a first apparatus, determine a second apparatus matched to the first apparatus on the basis of the identification information of the first apparatus, and provide connection information of the second apparatus to the first apparatus.

The communication channel manager may acquire identification information of a printing apparatus, determine a data distribution server matched to the printing apparatus, and transfer connection information of the data distribution server to the printing apparatus.

The communication channel manager may acquire identification information of a data distribution server, determine a printing apparatus matched to the data distribution server, and transfer connection information of the printing apparatus to the data distribution server.

The communication channel manager may provide an interactive interface. The communication channel manager may provide an interactive interface and receive the identification information from a user through the interactive interface. The interactive interface may display a message that requests the identification information to a user and may receive the identification information from the user in the state of a natural language in response to the displayed message. The interactive interface may display a result of establishing the websocket channel between the printing apparatus and the data distribution server in response to receiving the identification information.

The printing apparatus according to the present disclosure may be implemented as a POS printing apparatus. Embodiments in which the printing apparatus is a POS printing apparatus will be described below with reference to the drawings.

Figure 24:
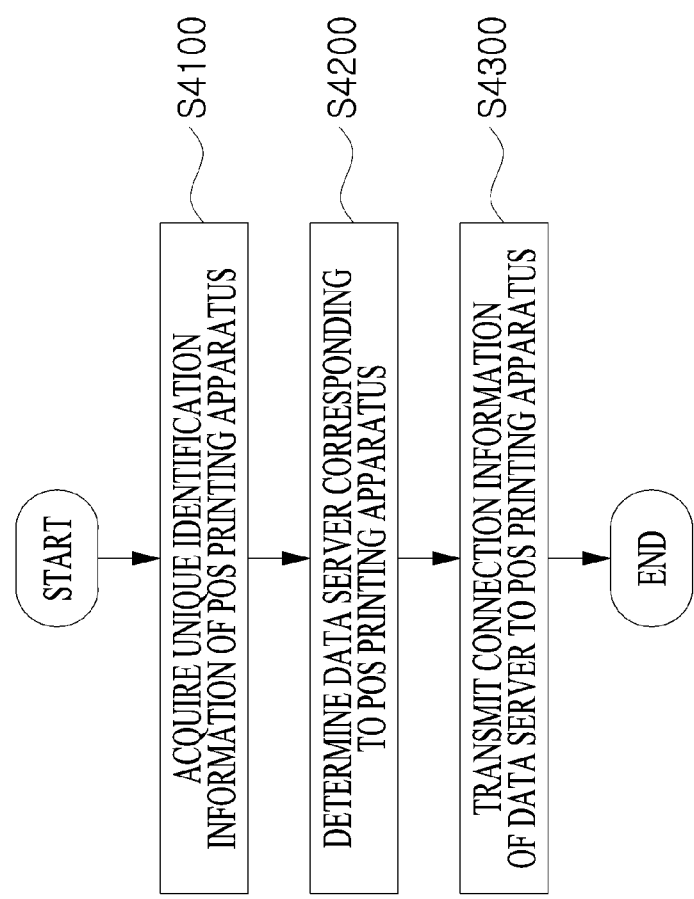
FIG. 24 shows an electronic apparatus control method according to an embodiment of the present disclosure.

FIG. 24 shows an electronic apparatus control method according to an embodiment of the present disclosure. In this embodiment, the electronic apparatus control method may refer to a method of controlling an electronic apparatus in order to assist in establishing a communication channel between a POS printing apparatus and a data server configured to provide data to the POS printing apparatus. The electronic apparatus may be an electronic apparatus configured to provide a communication channel manager.

Referring to FIG. 24, the control apparatus control method according to an embodiment of the present disclosure may include acquiring, by the electronic apparatus, unique identification information of a POS printing apparatus (S4100), determining, by the electronic apparatus, a data server corresponding to the POS printing apparatus (S4200), and transmitting, by the electronic apparatus, connection information of the data server to the POS printing apparatus (S4300).

The electronic apparatus acquiring unique identification information of a POS printing apparatus (S4100) may denote that the electronic apparatus recognizes and acquires a unique identification mark placed at the POS printing apparatus, and the unique identification mark may be an identification mark for identifying the POS printing apparatus using any one of a barcode, a QR code, an RFID tag, and an NFC sensor.

The acquiring of unique identification information of a POS printing apparatus (S4100) may include acquiring unique identification information of a user of the POS printing apparatus.

The acquiring of unique identification information of a POS printing apparatus (S4100) may denote providing an interactive interface and acquiring the unique identification information of the POS printing apparatus from the user of the POS printing apparatus through the interactive interface.

The providing of the interactive interface may include displaying a query message that requests the identification information of the POS printing apparatus.

The acquiring of the unique identification information through the interactive interface may denote receiving the identification information of the POS printing apparatus in the state of a natural language, performing syntax analysis of the received identification information having the state of a natural language, and acquiring the unique identification information of the POS printing apparatus in response to displaying the query message to request the identification information.

The electronic apparatus control method may further include displaying a message indicating an establishment state of the websocket communication channel through the interactive interface in response to transmitting connection information of the data server to the POS printing apparatus.

The electronic apparatus determining a data server corresponding to the POS printing apparatus (S4200) may denote that the electronic apparatus determines a data server corresponding to the POS printing apparatus using a database configured to store connection information of at least one data server configured to store print data interpretable by the POS printing apparatus when connection information of the data server corresponding to the POS printing apparatus is requested by the POS printing apparatus.

The electronic apparatus transmitting connection information of the data server to the POS printing apparatus (S4300) may denote that the electronic apparatus transmits the connection information through Bluetooth communication.

An electronic apparatus control method according to another embodiment of the present disclosure may include acquiring unique identification information of a POS printing apparatus, determining a data server corresponding to the POS printing apparatus using a database configured to store connection information of a plurality of data servers configured to store print data interpretable by the POS printing apparatus wherein the connection information is required by the POS printing apparatus to establish a websocket communication channel with the data server, and transferring connection information of the determined data server to the POS printing apparatus when the connection information of the data server corresponding to the POS printing apparatus is requested by the POS printing apparatus.

In this case, the unique identification information of the POS printing apparatus may be a serial number that is individually assigned to the POS printing apparatus. The connection information of the data server may be any one of a domain name and an IP address of the data server. The communication channel may be a websocket communication channel.

Figure 25:
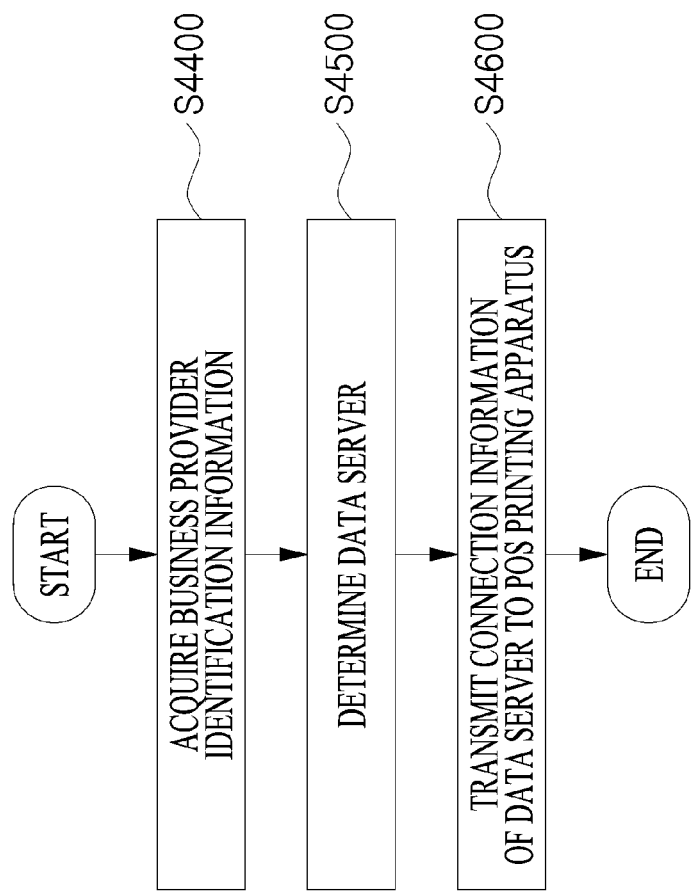
FIG. 25 shows an electronic apparatus control method according to an embodiment of the present disclosure.

FIG. 25 shows an electronic apparatus control method according to an embodiment of the present disclosure. Referring to FIG. 25, the electronic apparatus control method according to an embodiment of the present disclosure may include acquiring business provider identification information (S4400), determining a data server (S4500), and transmitting connection information of the data server to a POS printing apparatus (S4600).

The electronic apparatus acquiring business provider identification information (S4400) may denote that the electronic apparatus acquires business provider identification information of a store in which the POS printing apparatus is installed. The business provider identification information of a store may refer to information corresponding to the store for identifying the store. The business provider identification information may be a name of a business provider or a name of a shop at which the POS printer apparatus is installed.

The business provider identification information may include identification information of a shop in which the POS printing apparatus is used, and the acquiring of the identification information of the shop may denote providing an information request interface and receiving the identification information from a user through the information request interface.

The electronic apparatus determining a data server (S4500) may denote that the electronic apparatus determines a data server configured to store at least one piece of order information to be transmitted to the POS printing apparatus on the basis of the business provider identification information when connection information of a data server matched to the POS printing apparatus is requested by the POS printing apparatus. The order information to be transmitted to the POS printing apparatus may denote that order information corresponding to at least to the POS printing apparatus. The order information may be corresponding to two or more POS printing apparatuses The connection information of the data server may be connection information used by the POS printing apparatus to transmit a websocket connection handshake to the data server.

When the connection information of the data server is transmitted to the POS printing apparatus, a websocket communication channel may be established between the POS printing apparatus and the data server, and order information stored in the data server may be transmitted to the POS printing apparatus through the websocket communication channel.

The channel connection management may include an identification information input unit, a matching unit, and a communication unit.

The communication channel manager may have an identification information input unit to acquire identification information of a first apparatus. The identification information input unit may have a camera module to recognize an identification tag, such as a barcode and a QR code, of the first apparatus. The identification information input unit may have a wireless communication module to identify the first apparatus through an NFC tag, RFID, Bluetooth, or the like. The identification information input unit may provide a user interface to acquire the identification information of the first apparatus from a user.

The communication channel manager may have a matching unit and may determine a second apparatus matched to the first apparatus using the identification information of the first apparatus. The matching unit may acquire characteristic information of the first apparatus from the identification information of the first apparatus and determine that a second apparatus corresponding to the characteristic information of the first apparatus matches the first apparatus. The matching unit may determine the second apparatus matched to the first apparatus using a database, which will be described below. The matching unit may determine that the second apparatus matches the first apparatus on basis of more than two pieces of characteristic information of the first apparatus.

The communication channel manager may further have a memory unit. The memory unit may store a database configured to store the identification information of the first apparatus in association with identification information of the second apparatus. The database may further store communication channel connection information of the second apparatus. The database may be a database configured to store identification information of a printing apparatus and identification information of a data distribution server, which are associated with each other. The database may be a database configured to store the identification information of the data distribution server and the identification information of the printing apparatus, which are associated with each other.

Figure 26:
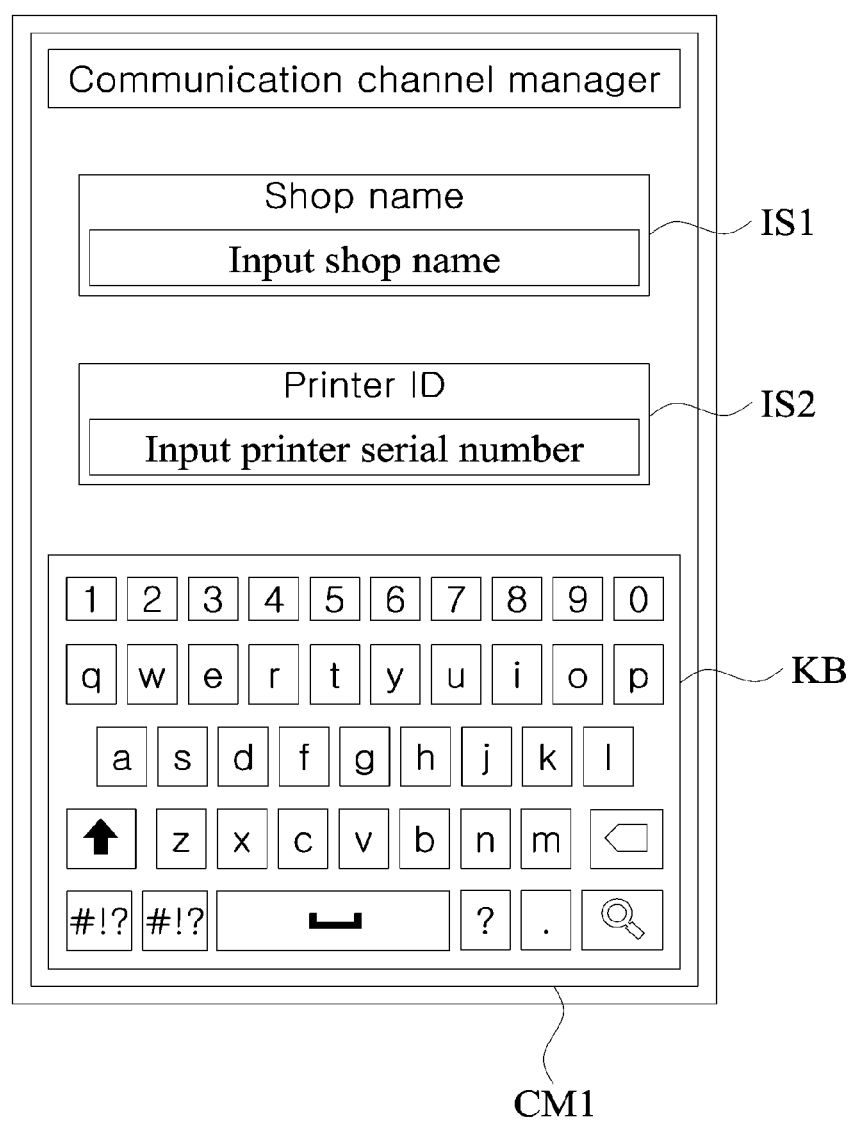
FIG. 26 shows a communication channel manager according to an embodiment of the present disclosure.

FIG. 26 shows a communication channel manager according to an embodiment of the present disclosure. Referring to FIG. 26, a communication channel manager CM1 according to an embodiment of the present disclosure may have a first identification information input section IS1, a second identification information input section IS2, and a keyboard KB.

The first identification information input section IS1 may receive first identification information from a user. The first identification information may be identification information of the user. For example, the first identification information may be identification information of a shop corresponding to a printing apparatus (e.g., a shop where the printing apparatus is installed), business information of a business office to which the printing apparatus belongs, or the like. As shown in FIG. 26, a shop name may be received from the user.

The second identification information input section IS2 may receive second identification information from the user. The second identification information may be identification information of the printing apparatus. For example, the second identification information may be a unique serial number of the printing apparatus.

The keyboard KB may be a touch keyboard configured to recognize a touch input. The keyboard KB is not an essential element, and the present disclosure may be implemented differently depending on the type of an electronic apparatus on which the communication channel manager is running. For example, the communication channel manager CM1 may have a voice recognition unit in place of the keyboard KB to acquire voice information from the user. Alternatively, the communication channel manager CM1 may have an image recognition unit in place of the keyboard KB to acquire an image.

Figure 27:
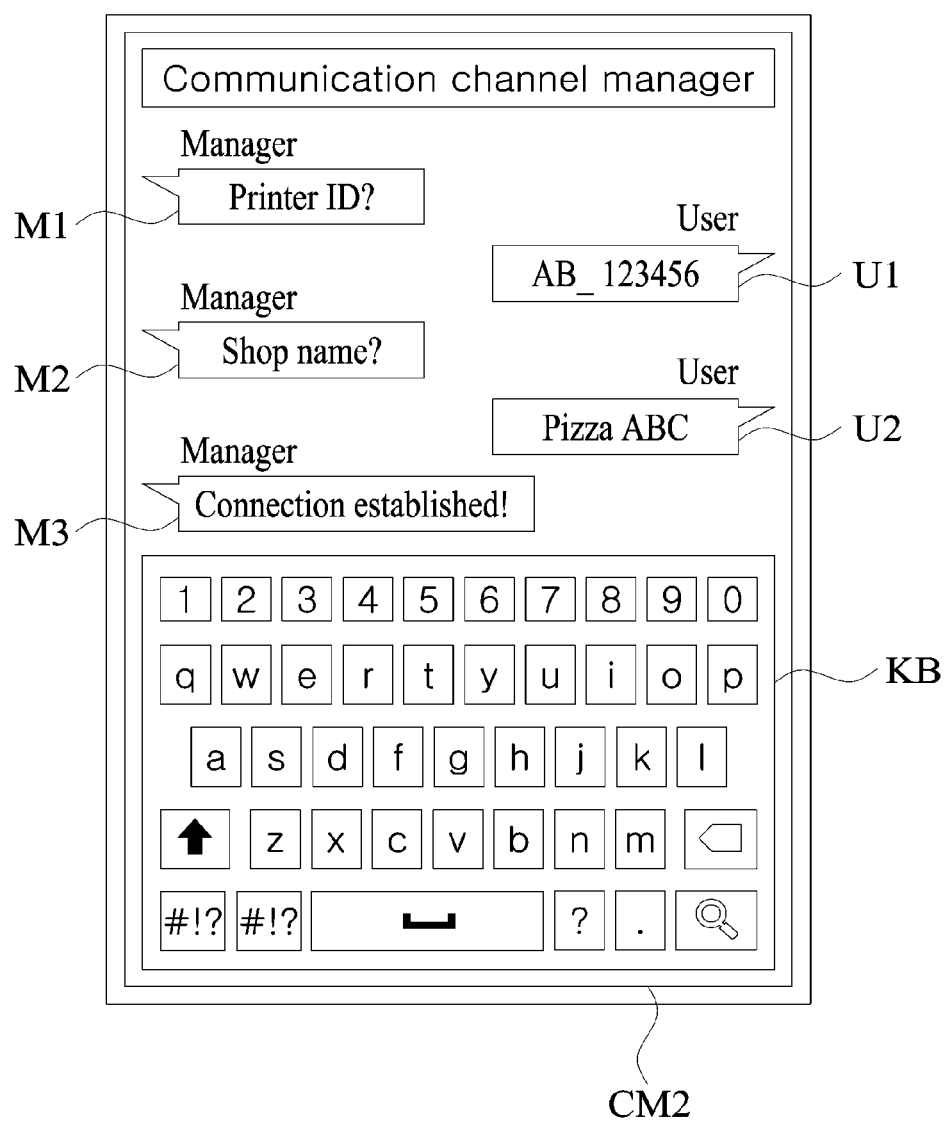
FIG. 27 shows a communication channel manager according to another embodiment of the present disclosure.

FIG. 27 shows a communication channel manager according to another embodiment of the present disclosure. Referring to FIG. 27, a communication channel manager CM2 according to an embodiment of the present disclosure may be implemented as an interactive interface. The communication channel manager CM2 according to this embodiment may display a query message to a user and request information needed for channel establishment. The communication channel manager CM2 may acquire a response message from the user to acquire the information needed for channel establishment.

As a detailed example, the communication channel manager CM2 may display a query message M1 for requesting printing apparatus identification information. The communication channel manager CM2 may acquire a message U1 that is received from the user in response to the query message and may acquire the printing apparatus identification information. As shown in FIG. 27, "AB_123456," which is a serial number of the printing apparatus received from the user, may be acquired using the communication channel manager CM2.

The communication channel manager CM2 may display a query message M2 that requests shop identification information. The communication channel manager CM2 may acquire a message U2 received from the user in response to the query message and may acquire the shop identification information. As shown in FIG. 27, "Pizza ABC," which is shop identification information received from the user, may be acquired through the communication channel manager CM2.

Also, when a communication channel is established between a printing apparatus and a server, the communication channel manager CM2 may display a notification message M3 indicating that the communication channel is established.

According to this embodiment, the communication channel manager, which provides an interactive interface, may be used not only to acquire information for establishing a communication channel from as user, as described above, but also to give and take information to and from a user. For example, the communication channel manager may also be used to control a server apparatus, a printing apparatus, or the like or acquire state information from a user.

The above embodiments of the communication channel manager are merely an example. Accordingly, an element, such as an input section, of the communication channel manager may change, and it will be appreciated that modification of the embodiments can be easily made by those skilled in the art.

4.2.3.2 Operation of Server Apparatus

A server apparatus may control establishment of a communication channel. The server apparatus may provide connection information of the server apparatus to an external apparatus and establish a data communication channel with a receiving apparatus matched by the external apparatus. The server apparatus may provide identification information of the server apparatus to the external apparatus and establish a data communication channel with a receiving apparatus matched on the basis of the identification information.

The server apparatus may provide an application for managing establishment of a communication channel. The server apparatus may provide the application, acquire identification information of a receiving terminal through the application, acquire connection information of a data server apparatus matched to the receiving terminal, and transmit the connection information of the data server apparatus to the receiving terminal. In this case, the server apparatus that provides the application may be a data server apparatus matched to the receiving terminal.

The server apparatus may provide the application, provide the identification information of the server apparatus through the application, acquire connection information of a receiving terminal matched to the server apparatus, and establish a communication channel with the receiving terminal.

The server apparatus may have a communication unit, a database unit, and a control unit.

The server apparatus may have the communication unit to acquire identification information or connection information of a receiving apparatus from an external apparatus. The server apparatus may transmit identification information or connection information of the server apparatus to the external apparatus by means of the communication unit.

The server apparatus may have the database unit to store a database storing the identification information of the receiving apparatus and the connection information of the server apparatus, which are associated with each other. The database unit may store a database storing the identification information of the server apparatus and the connection information of the receiving apparatus, which are associated with each other.

The server apparatus may have the control unit to control the above-described establishment of the communication channel.

The server apparatus may further have a channel management unit. The channel management unit may store the above-described channel application and manage the communication channel. The channel management unit may include a user interface used to manage the communication channel and provide the user interface to a user terminal through the communication unit.

4.2.3.3 Operation of Printing Apparatus

A printing apparatus may control establishment of a communication channel. The printing apparatus may provide identification information of the printing apparatus to an external apparatus and establish a data communication channel with a server apparatus matched on the basis of the identification information. The printing apparatus may provide connection information of the printing apparatus to the external apparatus and establish a data communication channel with a server apparatus matched to the external apparatus.

The printing apparatus may include a communication unit, a memory unit, a printing unit, and a control unit.

The printing apparatus may have the communication unit to communicate with an external apparatus. The printing apparatus may have the communication unit to acquire identification information or connection information of the external apparatus from the outside. The printing apparatus may transmit the identification information or the connection information of the printing apparatus to the external apparatus by means of the communication unit.

The printing apparatus may have the memory unit. The memory unit may store a database. The database may be a database configured to store the identification information of the printing apparatus and the identification information of the server apparatus, which are associated with each other.

The memory unit may store a channel management application. The printing apparatus may provide an application, acquire the identification information of the printing apparatus through the application, acquire the connection information of the server apparatus, and establish a data communication channel with the server apparatus.

The printing apparatus may provide an application, acquire the identification information of the server apparatus through the application, provide the connection information of the printing apparatus, and establish a data communication channel with the server apparatus.

The printing apparatus may have the printing unit to perform a printing operation on the basis of print data acquired through the communication channel.

The printing apparatus may have the control unit. The printing apparatus may perform an operation of controlling the above-described establishment of the communication channel by means of the communication unit.

The printing apparatus may provide a user interface.

The printing apparatus may use the user interface to request information required to establish the communication channel from a user.

The printing apparatus may use the user interface to acquire unique identification information of the printing apparatus. The printing apparatus may use the user interface to acquire reference information for determining a server apparatus matched to the printing apparatus. For example, the printing apparatus may use the user interface to acquire business provider identification information or the like of a sales store to which the printer apparatus belongs.

The printing apparatus may use the user interface to display a status of the establishment of the communication channel to a user. The user interface may provide a result of establishing the communication channel, whether the establishment is interrupted, or the like to a user.

4.2.4 Embodiments

A method of establishing a communication channel between a printing apparatus and a server apparatus according to some embodiments of the present disclosure will be described below.

According to an embodiment of the present disclosure, a method of establishing a communication channel between a printing apparatus and a server apparatus may include storing, by a channel management application, identification information of the server apparatus, acquiring, by the channel management application, identification information of the printing apparatus, and transferring, by the channel management application, identification information of a printing apparatus corresponding to the server apparatus to the server apparatus using the identification information of the printing apparatus and the identification information of the server apparatus. In this case, when the identification information of the printing apparatus is transferred to the server apparatus, the server apparatus may establish a communication channel with the printing apparatus.

The acquiring of identification information of the printing apparatus may be performed by recognizing an identification mark, such as a barcode and a photo, attached to the printing apparatus by means of a camera module of a terminal on which the application is installed. The acquiring of identification information of the printing apparatus may include acquiring shop identification information of a shop at which the printing apparatus is installed. The acquiring of shop identification information may denote receiving a name of the shop from the user through a user interface of the application.

According to another embodiment of the present disclosure, a method of establishing a communication channel between a printing apparatus and a server apparatus may include acquiring, by a channel management application, information of the server apparatus that is acquired using a manager application, transmitted to a manager server, and transmitted by the manager server, storing, by the channel management application, the information of the server apparatus, acquiring, by the channel management application, user input information from a user, and transmitting, by the channel management application, information of the server apparatus corresponding to the user input information to the printing apparatus.

The manager application may be executed by a manager who manages the server application. The information of the server apparatus acquired through the manager application may be identification information of the manager who manages the server apparatus, a domain name of the server apparatus, an IP address of the server apparatus, or the like.

The user input information may include shop identification information, manager identification information, printing apparatus identification information, etc.

The method of establishing a communication channel may further include transmitting, by the printing apparatus, a message indicating that the communication channel is established to the channel management application when the communication channel is established between the printing apparatus and the server apparatus.

According to still another embodiment of the present disclosure, a method of establishing a communication channel between a printing apparatus and a server apparatus may include acquiring, by a channel management application, connection information of the server apparatus and manager information of a manager associated with the server apparatus, acquiring, by the channel management application, identification information of a printing apparatus attempting to connect to the server apparatus and identification information of a user who uses the printing apparatus, transmitting, by the channel management application, the connection information of the server apparatus and the manager information to the printing apparatus, and receiving, by the channel management application, a notification indicating that the communication channel is established between the printing apparatus and the server apparatus from the printing apparatus. The channel management application acquiring the connection information of the server apparatus and the manager information may denote that the channel management application acquires the connection information and the manager information from a database prestored in the channel management application.

The communication channel establishment method according to the present disclosure is not limited to the above embodiments, and various embodiments may be implemented to assist in establishing a websocket channel between the server apparatus that transmit the data and the printing apparatus.

4.3 Control Tool

The control tool that has been described with regard to the first printing process may also be implemented for the second printing process. Specifically, the apparatus control method using the control tool may also be applied to the third system including a user terminal, a data distribution server, and a printing apparatus.

An apparatus control method according to an embodiment of the present disclosure may include acquiring, by a user terminal, a control tool for controlling a printing apparatus, establishing a websocket communication channel between the user terminal and the printing apparatus, and controlling, by the user terminal, the printing apparatus using the control tool and the websocket communication channel.

The user terminal acquiring a control tool may denote that the user terminal acquires a control tool provided by a data distribution server. The acquiring of the control tool may denote acquiring a control tool provided by the data distribution server using a web browser running on the user terminal.

The establishing of a websocket communication channel between the user terminal and the printing apparatus may include a case in which the websocket communication channel is established between the user terminal and the data distribution server and the printing apparatus is networked to the data distribution server and a case in which the websocket communication channel is established between the data distribution server and the printing apparatus and the user terminal is networked to the data distribution server. The websocket communication channel may be simultaneously established between the user terminal and the data distribution server and between the data distribution server and the printing apparatus.

The user terminal controlling the printing apparatus using the control tool and the websocket communication channel includes the user terminal acquiring registration information for identifying and managing the printing apparatus and providing the acquired registration information to the data distribution server.

The apparatus management method using the control tool may also be applied to the fourth system including a user terminal, a data distribution server, a hub printing apparatus, and a peripheral apparatus connected to the hub printing apparatus.

An apparatus control method according to an embodiment of the present disclosure may include acquiring, by a user terminal, a control tool for controlling a printing apparatus, establishing a websocket communication channel between the user terminal and the printing apparatus, and controlling, by the user terminal, a peripheral apparatus connected to the printing apparatus using the control tool and the websocket communication channel.

The user terminal controlling a peripheral apparatus includes providing registration information for controlling the peripheral apparatus and transmitting control data for controlling operation of the peripheral apparatus.

As a detailed example, the apparatus management method using the control tool may include activating, by the printing apparatus, the data distribution server and a printing mode corresponding to a second process and providing, by the data distribution server, a control tool for a peripheral apparatus to the user terminal when a websocket communication channel is established between the printing apparatus and the data distribution server. When the user terminal acquires the control tool, the user terminal may transmit a websocket handshake to the data distribution server and may establish a websocket communication channel with the data distribution server when a handshake response is received from the data distribution server.

In this case, the user terminal may provide identification information of the printing apparatus and registration information (or control information) for controlling the peripheral information to the data distribution server. The printing apparatus may acquire the registration information and register and control the peripheral apparatus on the basis of the registration information of the peripheral apparatus.

The printing apparatus may register the peripheral apparatus and transmit a notification message indicating a registration status of the peripheral apparatus to the data distribution server. The data distribution server may transmit the notification message to the user terminal.

5. Complex Embodiment

The above-described first printing process and second printing process may not be independently performed. Both of the first printing process and the second printing process may be initiated by a single relevant system. Also, the data or communication channel management methods described with regard to the first printing process and the data or communication channel management methods described with regard to the second printing process may be performed together.

Some embodiments in which the spirits that have been described with regard to the system encompassing the first process and the second process and with regard to the first process and the second process are implemented in a complex manner will be described below.

5.1 Fifth System

Figure 28:
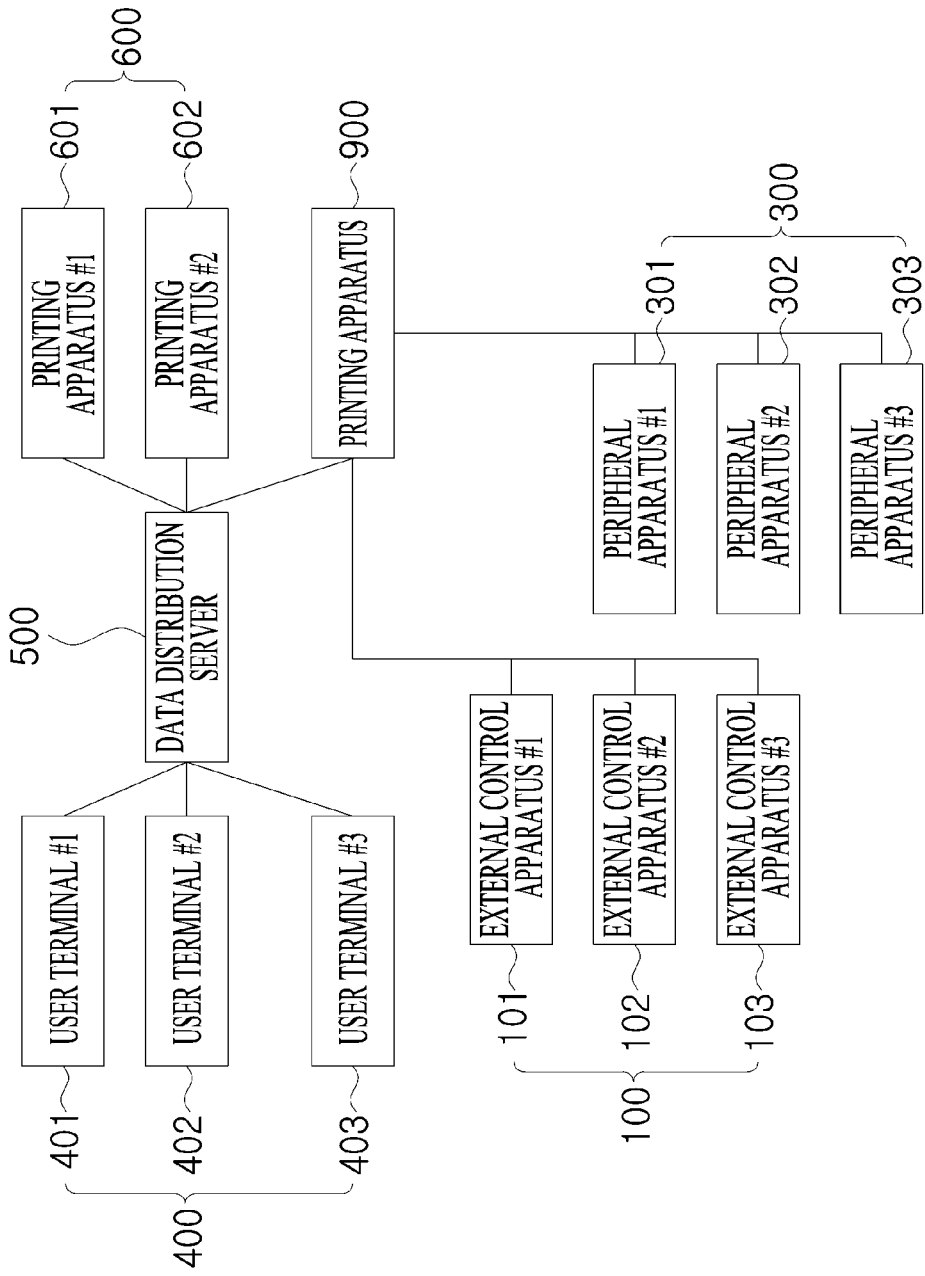
FIG. 28 shows a printing system according to an embodiment of the present disclosure.

FIG. 28 shows a printing system according to an embodiment of the present disclosure. Referring to FIG. 28, a printing system according to an embodiment of the present disclosure may include a plurality of user terminals, at least one data distribution server 500, a plurality of printing apparatus 600, a plurality of external control apparatuses 100, and a plurality of peripheral apparatuses 300.

In this case, a printing apparatus 900, which is at least one of the plurality of printing apparatuses, may be connected to both of the data distribution server 500 and the external control apparatus 100.

A printing apparatus connected to both of the data distribution server 500 and the external control apparatus 100 is hereinafter referred to as a complex printing apparatus. In other words, the complex printing apparatus 900 may be understood as a printing apparatus having attributes of both of the printing apparatus 200 corresponding to the above-described first printing process and the printing apparatus 600 corresponding to the above-described second printing process.

The complex printing apparatus 900 may establish a websocket channel with the external control apparatus 100 and may acquire print data from the external control apparatus 100 through the websocket channel A detailed process may be performed as described above with regard to the first printing process.

The complex printing apparatus 900 may establish a websocket channel with the data distribution server 500 and may acquire print data through the websocket channel. A detailed process thereof may be performed as described above with regard to the second printing process.

When the data is acquired from the external control apparatus 100 and the data distribution server 500, it is difficult for the complex printing apparatus 900 to process the data acquired from the external control apparatus 100 and the data distribution server 500. The complex printing apparatus 900 may set priorities for the data acquired from the external control apparatus 100 and the data distribution server 500 before handling the data. The complex printing apparatus 900 may handle the acquired data differently depending on apparatuses by which the data are to be received. The complex printing apparatus 900 may handle the acquired data in order of time received, regardless of the apparatuses by which the data are to be received. The complex printing apparatus 900 may determine a destination of the acquired data to be different depending on the apparatuses by which the data are to be received. For example, the complex printing apparatus 900 may transmit the data acquired from the external control apparatus 100 to a first peripheral apparatus 301 and may transmit the data acquired from the data distribution server 500 to a second peripheral apparatus 302. More specifically, the complex printing apparatus 900 may transmit data acquired from a first external control apparatus 101 to the first peripheral apparatus 301 and may transmit data transmitted from a first user terminal 401 via the data distribution server 500 to a third peripheral apparatus 303.

According to the present disclosure, it is possible to efficiently operate a websocket communication channel.

According to the present disclosure, it is possible to reduce resources required for communication of print data.

According to the present disclosure, it is possible to efficiently operate a space for storing received data.

The advantageous effects of the present disclosure are not limited to the aforementioned advantageous effects, and other advantageous effects which are not described herein should be clearly understood by those skilled in the art from the following detailed description and the accompanying drawings.

The above description is merely illustrative of the technical spirit of the present disclosure, various modifications and changes may be made by those skilled in the art without departing from the subject matter of the present disclosure. Accordingly, the above-described embodiments of the present disclosure may be implemented separately or in combination.

Therefore, the embodiments disclosed herein are intended not to limit but to describe the technical spirit of the present disclosure, and the scope of the present disclosure is not limited to the embodiments. The scope of the invention should be construed by the appended claims, and all technical sprits within the scope of their equivalents should be construed as included in the scope of the invention.

What is claimed is:

1. A data management method performed by a server apparatus, the data management method comprise:
   acquiring first print data and second print data;
   establishing a first websocket channel with a first apparatus and transmitting the first print data matched to the first apparatus to the first apparatus through the first websocket channel in response to a requesting of print data from the first apparatus; and
   establishing a second websocket channel with a second apparatus and transmitting the second print data matched to the second apparatus to the second apparatus through the second websocket channel in response to a requesting of print data from the second apparatus;
   wherein the data management method further comprises controlling a channel duration time of a websocket channel with an apparatus requesting the print data out of the first apparatus and the second apparatus when the print data is requested from at least one of the first apparatus and the second apparatus, and
   wherein the controlling a channel duration time of a websocket channel further comprises:
   when the print data is requested from at least one of the first apparatus and the second apparatus and the number of times the print data is requested exceeds a reference number, closing a websocket channel established with corresponding apparatus.

2. The data management method of claim 1, wherein the controlling a channel duration time of a websocket channel further comprises:
   determining whether the print data to be transmitted to corresponding apparatus is acquired based on apparatus information included in print data request from at least one of the first apparatus and the second apparatus; and
   closing a websocket channel established with corresponding apparatus if the print data to be transmitted to corresponding apparatus is not acquired.

3. The data management method of claim 1, wherein the first print data is usable by the first apparatus without format conversion, and the second print data is usable by the second apparatus without format conversion.

4. The data management method of claim 1, further comprising:
   acquiring third print data matched to the first apparatus after acquiring the first print data and the second print data and before transmitting the first print data to the first apparatus through the first websocket channel,
   wherein the transmitting the first print data to the first apparatus through the first websocket channel further comprises:
   transmitting both of the first print data and the third print data to the first apparatus when the print data is requested from the first apparatus through the first websocket channel.

5. The data management method of claim 4, wherein the transmitting both of the first print data and the third print data to the first apparatus comprises:
   enabling the first print data to have priority over the third print data so that a printing operation for the first print data is performed earlier than a printing operation for the third print data.

6. The data management method of claim 4, further comprising:
   when the first print data is acquired at a first acquisition time point, the second print data is acquired at a second acquisition time point later than the first acquisition time point, and the second websocket channel is established earlier than the first websocket channel, the second print data is transmitted to the second apparatus before the first print data is transmitted to the first apparatus.

7. The data management method of claim 1, further comprising:
   when the first print data is acquired at a first acquisition time point, the second print data is acquired at a second acquisition time point later than the first acquisition time point, and requesting for a print data through the second websocket channel is performed earlier than requesting for print data through the first websocket channel, the second print data is transmitted to the second apparatus before the first print data is transmitted to the first apparatus.

8. The data management method of claim 1, wherein the first print data matches to a peripheral apparatus connected to the first apparatus, and when print data is requested by the peripheral apparatus connected to the first apparatus, the first print data is transmitted to the first apparatus through the first websocket channel, and the peripheral apparatus connected to the first apparatus performs operation based on the first print data.

9. The data management method of claim 1, wherein in case that the first print data matches to both of the first apparatus and the second apparatus, the first websocket channel is closed when a first duration time has elapsed after the first websocket channel is established, and the second websocket channel is closed when a second duration time shorter than the first duration time has elapsed after the second websocket channel is established, when the first websocket channel remains established and the second websocket channel is closed, the first print data is transmitted to the first apparatus through the first websocket channel.

10. A server apparatus, comprising:
    a communication unit;
    a memory unit; and
    a control unit configured to acquire first print data and second print data through the communication unit, transmits the first print data matched to a first apparatus to the first apparatus through a first websocket channel when print data is requested by the first apparatus through the first websocket channel, and transmits the second print data matched to a second apparatus to the second apparatus through a second websocket channel when print data is requested by the second apparatus through the second websocket channel,
    wherein the control unit controls a channel duration time of the websocket channel with an apparatus requesting the print data out of the first apparatus and the second apparatus when the print data is requested from at least one of the first apparatus and the second apparatus and when the print data is requested from at least one of the first apparatus and the second apparatus and the number of times the print data is requested exceeds a reference number, the control unit closes a websocket channel established with corresponding apparatus.

* * * * *